United States Patent
Tuckowski et al.

(10) Patent No.: US 8,931,583 B2
(45) Date of Patent: Jan. 13, 2015

(54) WHEELCHAIR

(75) Inventors: Thomas Tuckowski, Strongsville, OH (US); Traian Mohan, Parma, OH (US); Robert Bekoscke, Medina, OH (US); Damon Jurkiewicz, Cleveland, OH (US); Daniel James Yee, Parma, OH (US); Joseph Spalding, Akron, OH (US); Howard Loewenthal, Hinckley, OH (US)

(73) Assignee: Invacare Corporation, Elyria, OH (US)

( * ) Notice: Subject to any disclaimer, the term of this patent is extended or adjusted under 35 U.S.C. 154(b) by 584 days.

(21) Appl. No.: 13/168,262

(22) Filed: Jun. 24, 2011

(65) Prior Publication Data

US 2011/0316253 A1 Dec. 29, 2011

Related U.S. Application Data

(63) Continuation-in-part of application No. 29/364,464, filed on Jun. 24, 2010, now Pat. No. Des. 642,500, and (Continued)

(51) Int. Cl.
*B62D 61/00* (2006.01)
*H01M 2/10* (2006.01)
*A61G 5/04* (2013.01)
*A61G 5/10* (2006.01)
*A61G 5/12* (2006.01)

(52) U.S. Cl.
CPC .............. *A61G 5/045* (2013.01); *A61G 5/1059* (2013.01); *A61G 5/12* (2013.01); *A61G 2005/1089* (2013.01); *A61G 2005/128* (2013.01); *A61G 2203/14* (2013.01); *A61G 5/1035* (2013.01)
USPC ........................................... 180/65.1; 429/98

(58) Field of Classification Search
CPC ....... A61G 5/045; A61G 5/1059; A61G 5/12; A61G 2005/1089; A61G 2005/128; A61G 2203/14; A61G 5/1035
USPC ................ 180/65.1; 280/250.1, 304.1, 304.3; 296/181.1
See application file for complete search history.

(56) References Cited

U.S. PATENT DOCUMENTS

D231,801 S 6/1974 Pivacek
3,865,427 A 2/1975 Delany
(Continued)

FOREIGN PATENT DOCUMENTS

FR 2845893 4/2004
WO 94/11235 5/1994
(Continued)

OTHER PUBLICATIONS

Office action from U.S. Appl. No. 13/505,630 mailed May 22, 2013.
(Continued)

*Primary Examiner* — Joseph Rocca
*Assistant Examiner* — Jacob Knutson
(74) *Attorney, Agent, or Firm* — Calfee, Halter & Griswold LLP

(57) ABSTRACT

The present application relates generally to conveyances and, more particularly, to wheelchairs. In one embodiment, a wheelchair includes a seat assembly coupled to a chassis. The chassis includes a frame having a rear wheel support member, one or more front wheel support members extending in a forward direction from the rear wheel support member, and a seat support member. The rear wheel support member comprises a central portion and left and right portions extending downward from the central portion. The wheelchair also includes one or more drive wheels for propulsion of the wheelchair, a set of front wheels for supporting the wheelchair, and a shrouding system for at least partially covering the frame and other components of the wheelchair.

21 Claims, 57 Drawing Sheets

Related U.S. Application Data a continuation-in-part of application No. 29/364,463, filed on Jun. 24, 2010, now Pat. No. Des. 642,499, and a continuation-in-part of application No. 29/378,840, filed on Nov. 10, 2010, now Pat. No. Des. 654,408, and a continuation-in-part of application No. 29/378,841, filed on Nov. 10, 2010, now Pat. No. Des. 656,070, and a continuation-in-part of application No. 29/378,834, filed on Nov. 10, 2010.

(60) Provisional application No. 61/358,066, filed on Jun. 24, 2010, provisional application No. 61/412,031, filed on Nov. 10, 2010, provisional application No. 61/412,043, filed on Nov. 10, 2010, provisional application No. 61/412,041, filed on Nov. 10, 2010.

(56) References Cited

U.S. PATENT DOCUMENTS

| | | | |
|---|---|---|---|
| 4,025,112 | A | 5/1977 | Hale |
| 4,037,676 | A | 7/1977 | Ruse |
| 4,643,446 | A | 2/1987 | Murphy et al. |
| 4,961,610 | A | 10/1990 | Reeder et al. |
| 5,018,788 | A | 5/1991 | Cedergreen |
| 5,033,792 | A | 7/1991 | Kanazawa |
| 5,137,102 | A | 8/1992 | Houston, Sr. et al. |
| D333,737 | S | 3/1993 | Adams |
| 5,209,322 | A | 5/1993 | McMahon |
| 5,275,466 | A | 1/1994 | Rentchler, Jr. |
| 5,301,964 | A | 4/1994 | Papac |
| 5,366,037 | A | 11/1994 | Richey |
| 5,382,036 | A | 1/1995 | Counts et al. |
| D365,787 | S | 1/1996 | Peterson et al. |
| 5,480,179 | A | 1/1996 | Peacock |
| 5,495,904 | A | 3/1996 | Zwaan et al. |
| 5,573,260 | A | 11/1996 | Peterson et al. |
| D380,991 | S | 7/1997 | Deming |
| 5,820,221 | A | 10/1998 | Greaves et al. |
| D414,453 | S | 9/1999 | Tsai |
| 5,996,716 | A | 12/1999 | Montiglio et al. |
| 6,003,891 | A | 12/1999 | Broadhead |
| 6,015,190 | A | 1/2000 | Wend |
| 6,092,822 | A | 7/2000 | Salmon |
| 6,095,271 | A | 8/2000 | Dickie et al. |
| 6,206,119 | B1 | 3/2001 | Wu |
| 6,206,393 | B1 | 3/2001 | Mascari et al. |
| 6,352,273 | B1 | 3/2002 | Dickie |
| 6,386,638 | B1 | 5/2002 | Strauch |
| 6,394,476 | B1 | 5/2002 | Molnar |
| D462,639 | S | 9/2002 | Lin |
| 6,459,962 | B2 | 10/2002 | Ulrich et al. |
| D468,669 | S | 1/2003 | Hopely, Jr. |
| D477,261 | S | 7/2003 | Lin |
| 6,669,299 | B2 | 12/2003 | Carlson et al. |
| D486,762 | S | 2/2004 | He |
| 6,699,616 | B2 * | 3/2004 | Wu .................................. 429/98 |
| D491,115 | S | 6/2004 | Taylor |
| D491,494 | S | 6/2004 | Lippert |
| D494,110 | S | 8/2004 | Cheng |
| 6,938,923 | B2 | 9/2005 | Mulhern et al. |
| D521,909 | S | 5/2006 | Gillett et al. |
| 7,040,429 | B2 | 5/2006 | Molnar |
| D523,788 | S | 6/2006 | Jones et al. |
| D524,196 | S | 7/2006 | You |
| D529,844 | S | 10/2006 | Chen et al. |
| D536,187 | S | 2/2007 | Goebert et al. |
| D536,887 | S | 2/2007 | Goebert et al. |
| D540,221 | S | 4/2007 | Cartellone et al. |
| 7,204,556 | B2 | 4/2007 | Schwerdtner et al. |
| 7,229,132 | B2 | 6/2007 | Meeker et al. |
| 7,306,247 | B2 | 12/2007 | Wu |
| D559,741 | S | 1/2008 | Lasher, III |
| 7,341,123 | B2 | 3/2008 | Brendel et al. |
| D569,769 | S | 5/2008 | Chiu et al. |
| 7,370,876 | B2 | 5/2008 | Hsu et al. |
| 7,413,045 | B2 | 8/2008 | Tien |
| 7,472,959 | B1 | 1/2009 | Ratza et al. |
| D585,794 | S | 2/2009 | Lin |
| D589,411 | S | 3/2009 | Brown et al. |
| D590,304 | S | 4/2009 | Kruse |
| D608,550 | S | 1/2010 | Scollberger et al. |
| D614,541 | S | 4/2010 | Storm |
| 7,694,991 | B2 | 4/2010 | Mills et al. |
| D615,461 | S | 5/2010 | Storm |
| 7,766,106 | B2 | 8/2010 | Puskar-Pasewicz et al. |
| D632,229 | S | 2/2011 | Kruse |
| D635,493 | S * | 4/2011 | Art et al. .................. D12/133 |
| 8,297,388 | B2 | 10/2012 | Lindenkamp et al. |
| 2001/0013437 | A1 | 8/2001 | Husted et al. |
| 2003/0006578 | A1 | 1/2003 | Melgarejo et al. |
| 2003/0056329 | A1 | 3/2003 | Coman et al. |
| 2004/0188152 | A1 | 9/2004 | Schaffner |
| 2004/0239169 | A1 | 12/2004 | De Nichilo |
| 2005/0075758 | A1 | 4/2005 | Wakefield |
| 2005/0076436 | A1 | 4/2005 | Hahn et al. |
| 2005/0080518 | A1 | 4/2005 | Wakefield |
| 2005/0279539 | A1 | 12/2005 | Chiou et al. |
| 2006/0082098 | A1 | 4/2006 | Harris |
| 2007/0107963 | A1 | 5/2007 | Chiu |
| 2007/0195081 | A1 | 8/2007 | Fischer |
| 2007/0216131 | A1 | 9/2007 | Potappel |
| 2008/0041282 | A1 | 2/2008 | Goschy et al. |
| 2008/0087481 | A1 | 4/2008 | Gry |
| 2009/0078482 | A1 | 3/2009 | Kylstra |

FOREIGN PATENT DOCUMENTS

| | | |
|---|---|---|
| WO | 9746516 | 12/1997 |
| WO | 03/045299 | 6/2003 |
| WO | 2006/053437 | 5/2006 |
| WO | 2011/060345 | 5/2011 |

OTHER PUBLICATIONS

International Search Report and Written Opinion from PCT/US11/41788 dated Jan. 19, 2012.

Invacare Corporation, Operator and Maintenance Manual, Pronto M5I and M6I with SureStep, 80 pgs., Rev J—Oct. 2008, copyright 2008.

Invacare Corporation, User Manual, FDX Power Wheelchair Base FDX, FDX-CG, FDX-MCG, 96 pgs., Rev A—Apr. 2010, copyright 2010.

Invacare Corporation, product Catalog, copyright 2004, printed Feb. 18, 2011, 14 pgs.

Invacare Corporation, At'm (Take Along Chair), 2 page brochure, copyright 2009.

Invacare Corporation, FDX Front-Wheel Drive Power Wheelchair, 4 page brochure, copyright 2010.

Invacare Corporation, Nutron R51, 2 page brochure, copyright 2006.

Invacare Corporation, P9000 XDT, 2 page brochure, copyright 2007.

Invacare Corporation, Pronto M51, 4 page brochure, copyright 2010.

Invacare Corporation, Pronto M51 with Formula CG Seating, 2 page web printout, printed Feb. 18, 2011.

Invacare Corporation, The New TDX Family, 25 page brochure, copyright 2008.

Invacare Corporation, Storm Series, 16 page brochure, copyright 2010.

International Search Report and Written Opinion for PCT/US2010/05663 dated Jun. 15, 2011.

Office Action in U.S. Appl. No. 13/505,630 dated May 22, 2013.

Examination Report for New Zealand Application 599,921 dated Apr. 29, 2013.

Office action from Australian Application No. 2010-319339 dated Jul. 25, 2013.

* cited by examiner

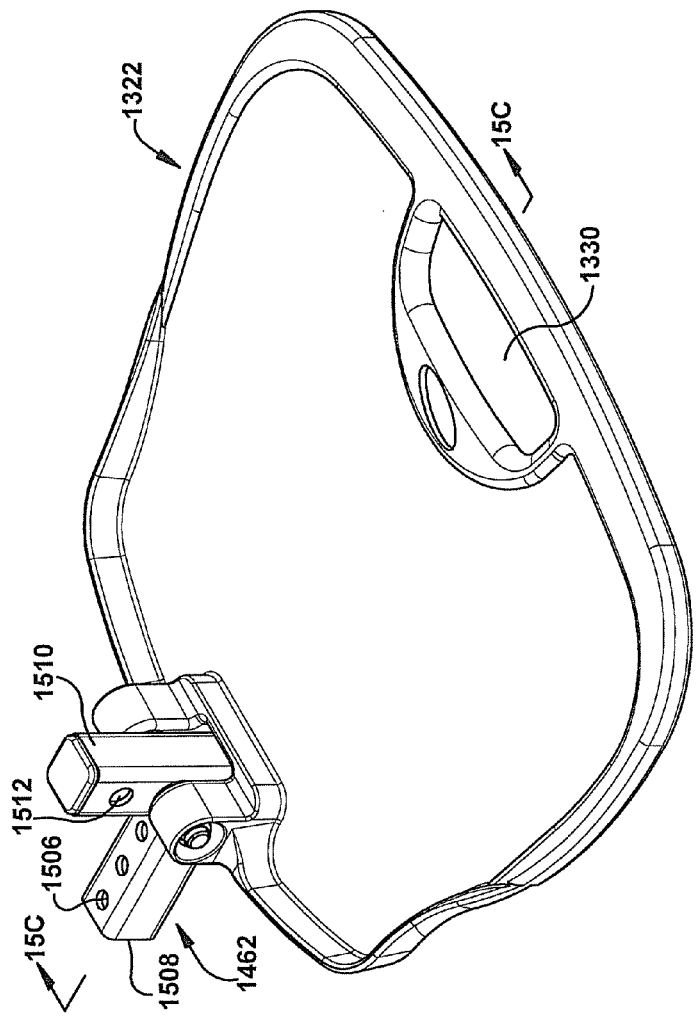
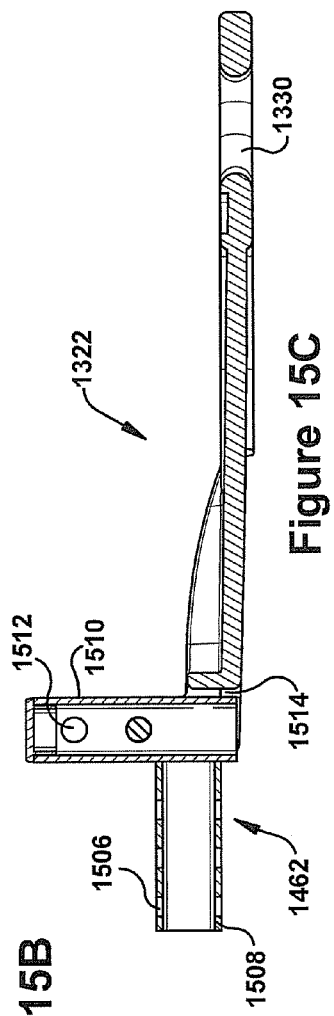

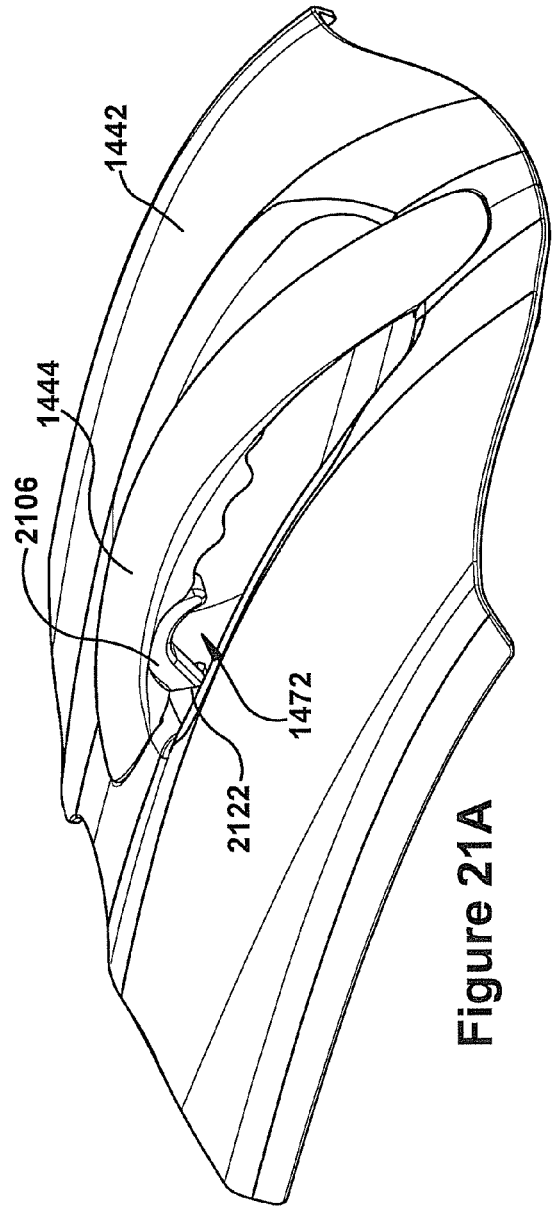
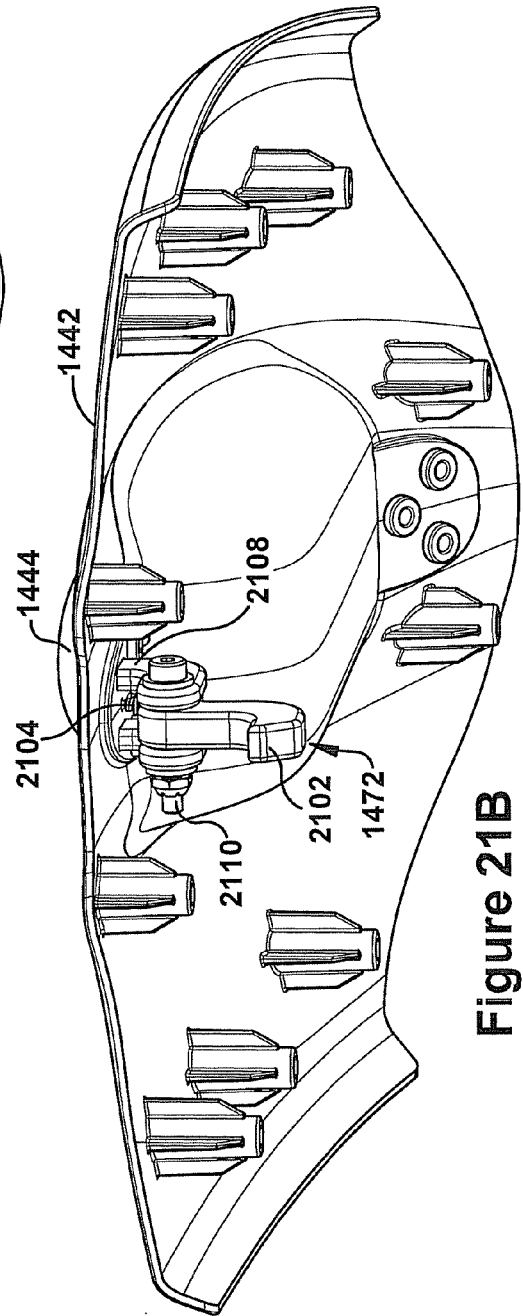
Figure 21A
Figure 21B

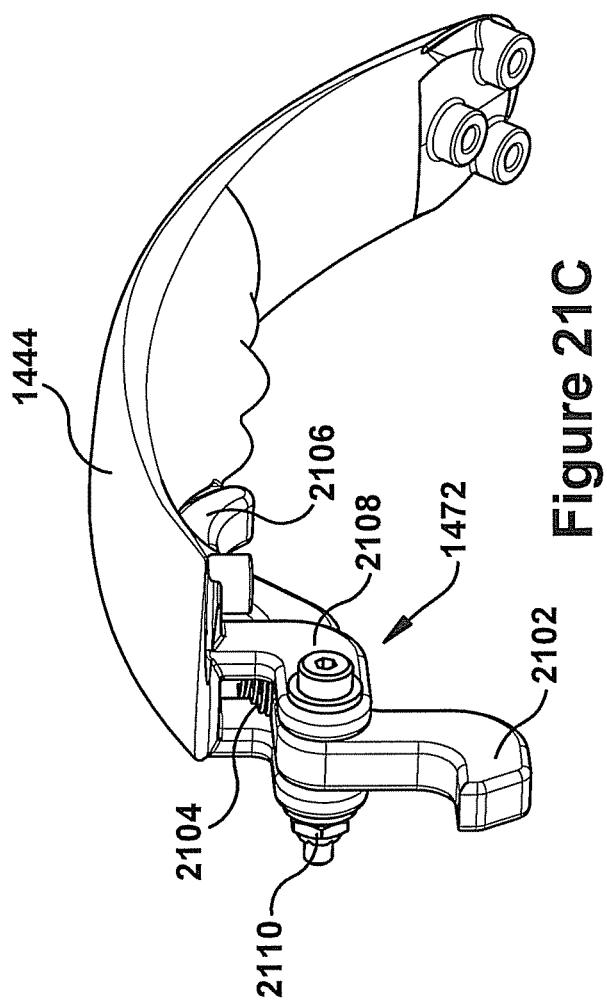

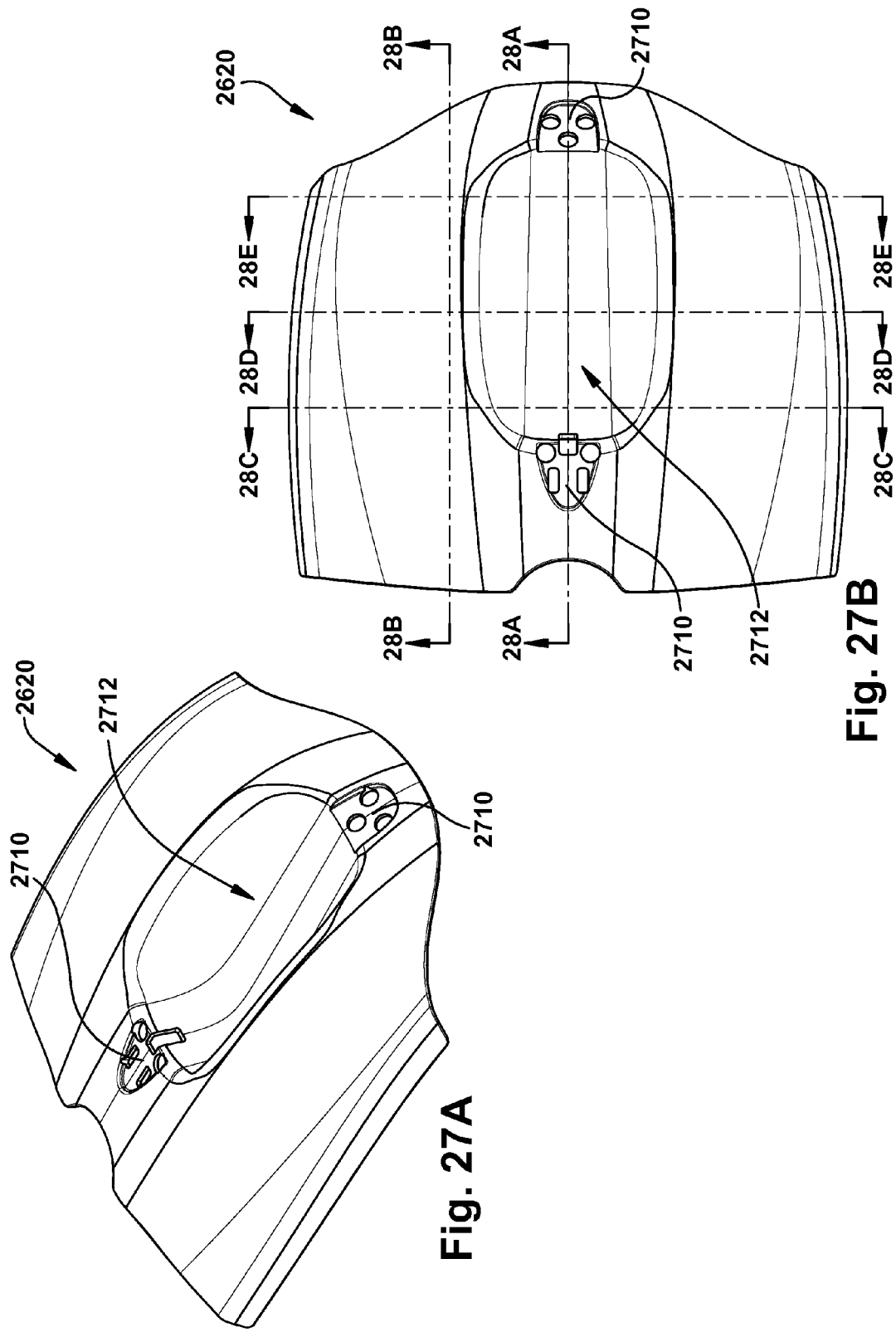

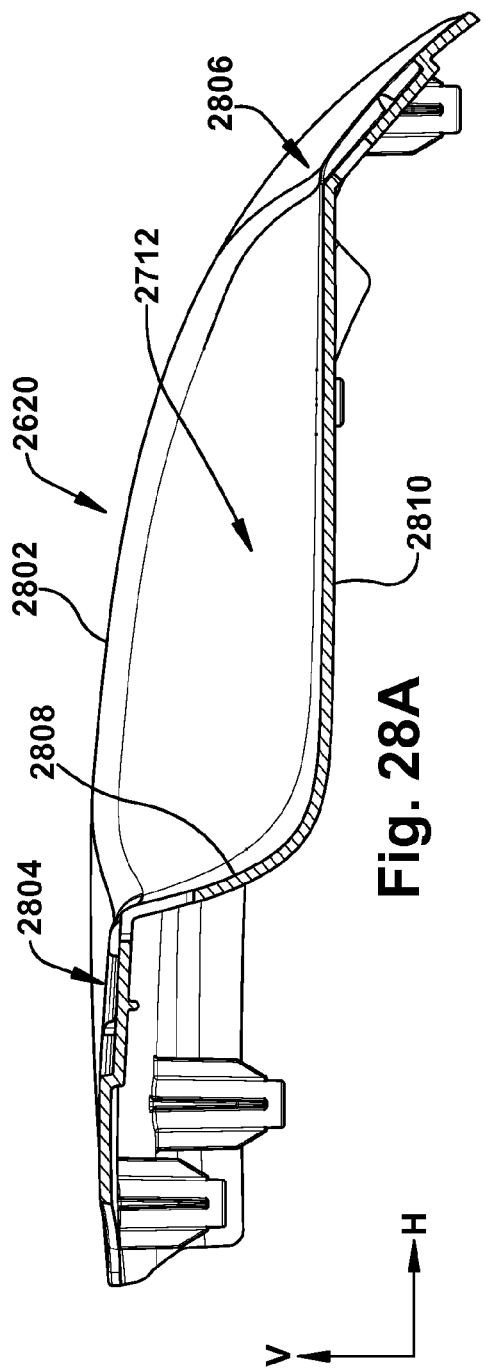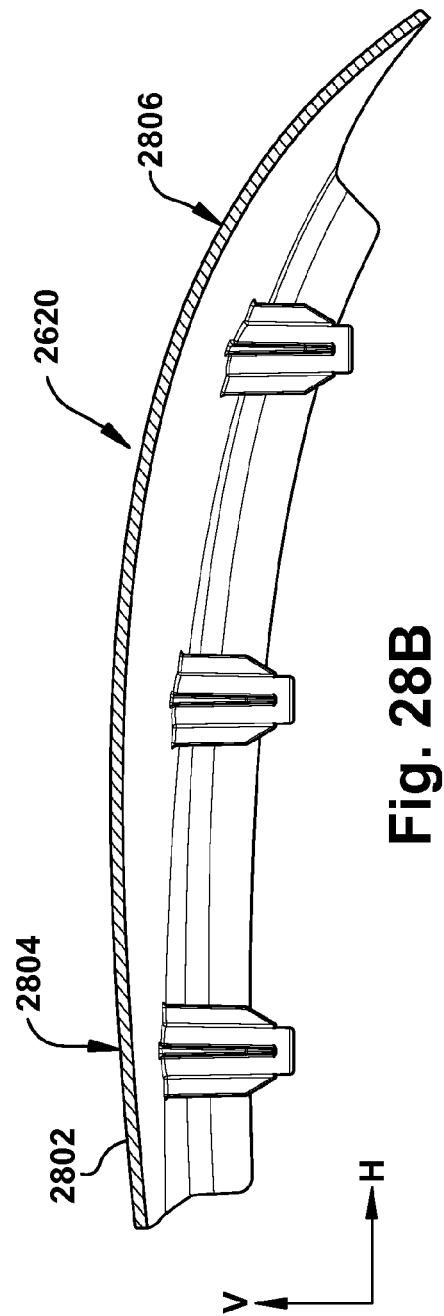

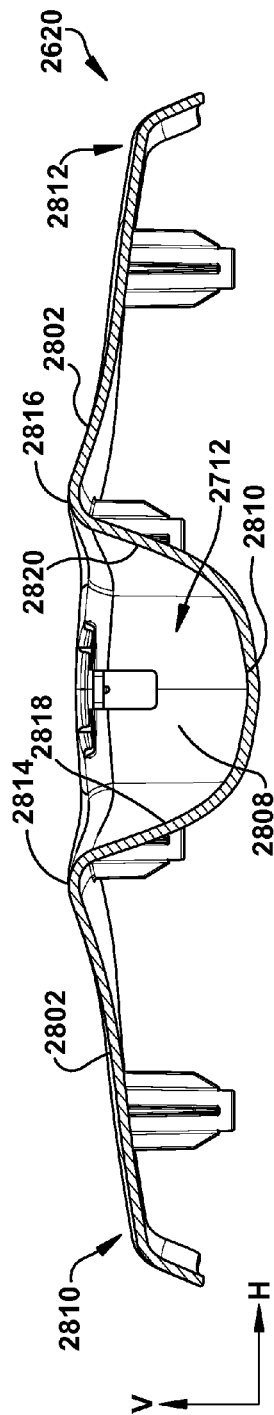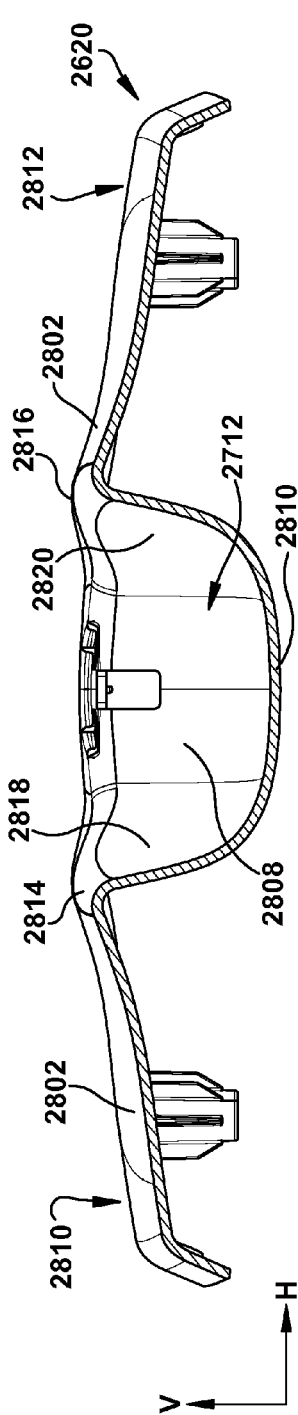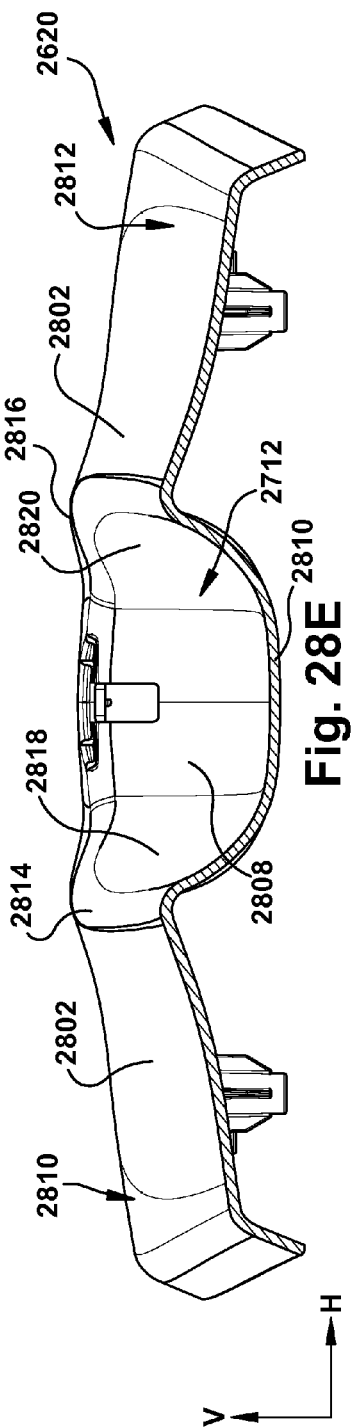

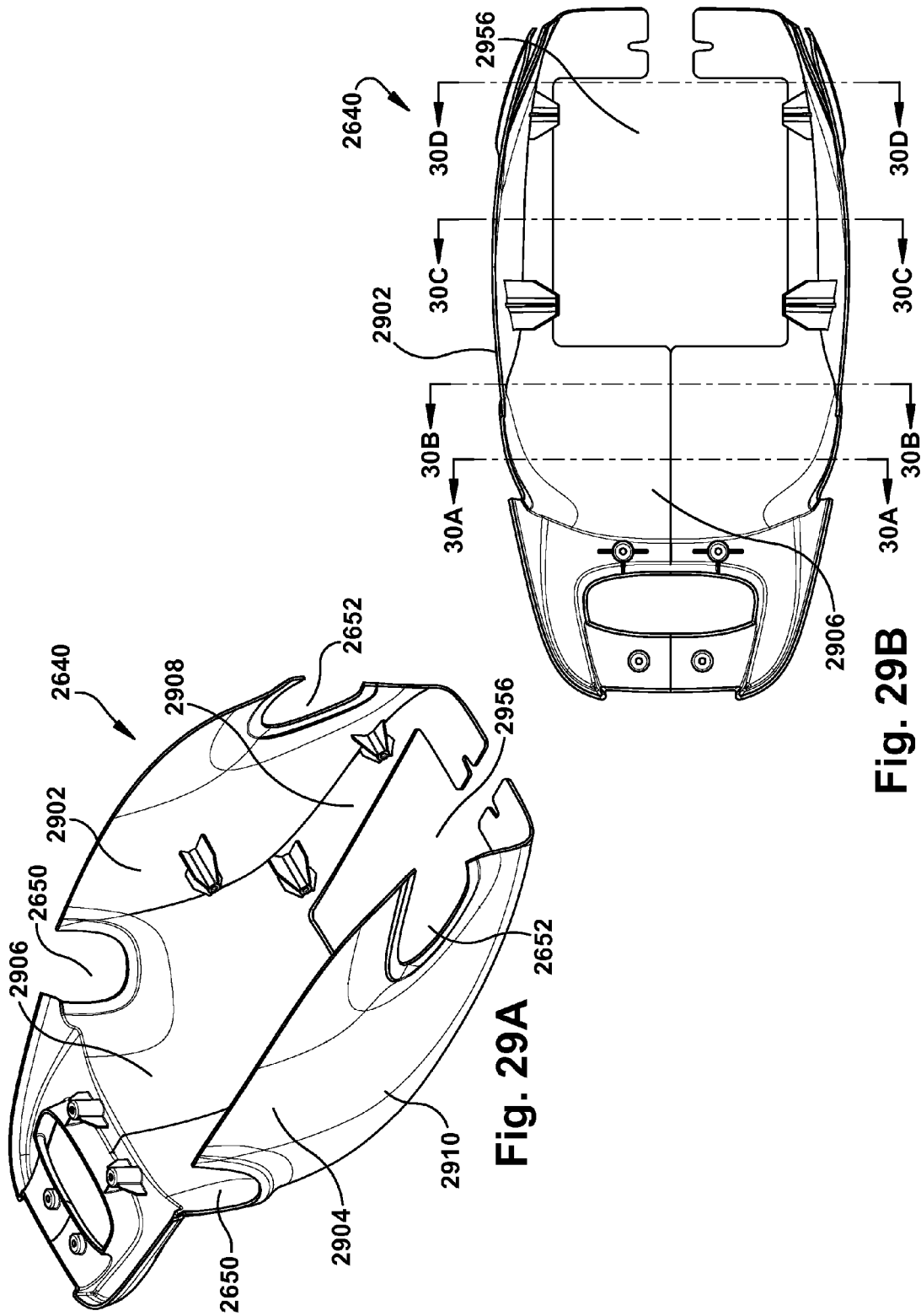

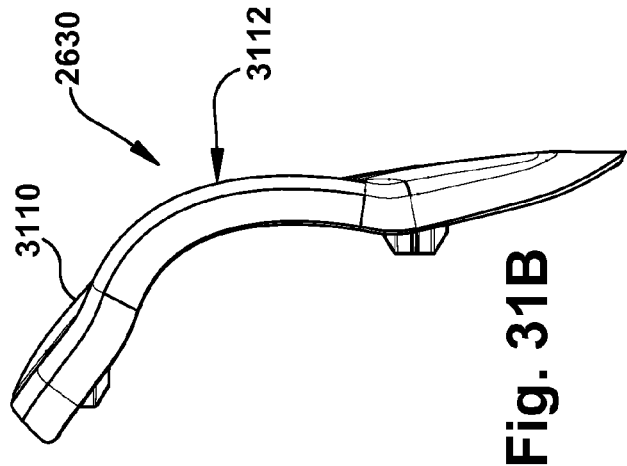
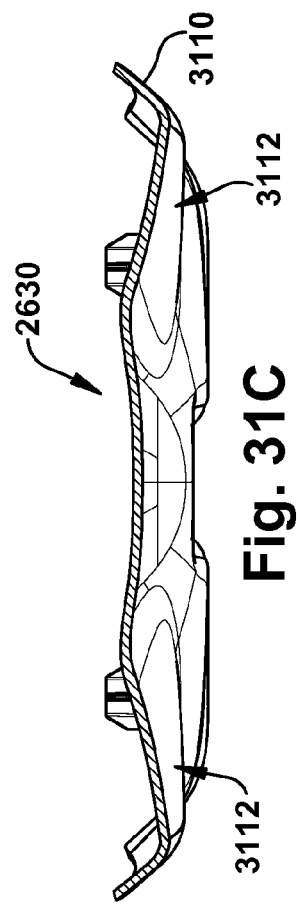
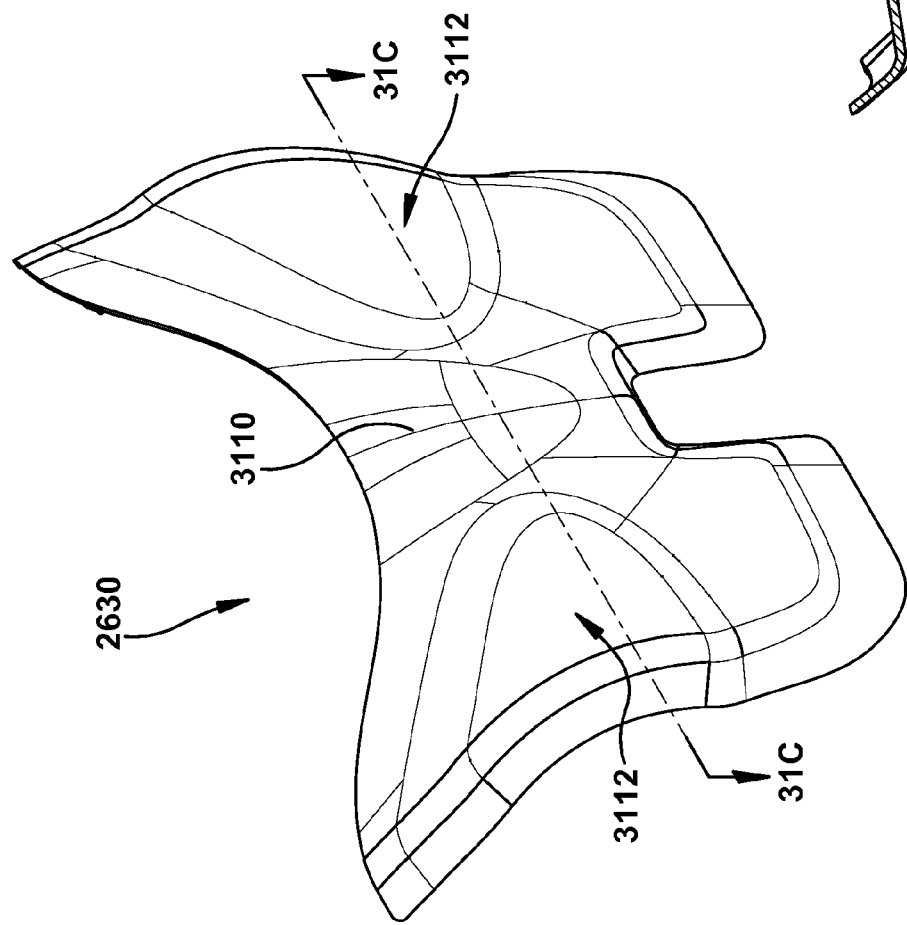

WHEELCHAIR

CROSS REFERENCE TO RELATED APPLICATIONS

This case claims priority to, and any other benefit of, U.S. Provisional Patent Application Ser. No. 61/358,066, filed on Jun. 24, 2010 and entitled WHEELCHAIR, U.S. Provisional Patent Application Ser. No. 61/412,031, filed on Nov. 10, 2010 and entitled WHEELCHAIR, U.S. Provisional Patent Application Ser. No. 61/412,043, filed on Nov. 10, 2010 and entitled WHEELCHAIR SEAT ASSEMBLY, and U.S. Provisional Patent Application Ser. No. 61/412,041, filed on Nov. 10, 2010 and entitled ELECTRIC MOTOR AND BRAKE ASSEMBLY, all of which are hereby incorporated by reference in their entirety.

This case is a continuation in part of U.S. Design patent application Ser. No. 29/364,464, filed on Jun. 24, 2010 and entitled FRAME, which is hereby incorporated by reference in its entirety.

This case is a continuation in part of U.S. Design patent application Ser. No. 29/364,463, filed on Jun. 24, 2010 and entitled WHEELCHAIR, which is hereby incorporated by reference in its entirety.

This case is a continuation in part of U.S. Design patent application Ser. No. 29/378,840, filed Nov. 10, 2010 and entitled WHEELCHAIR FRAME, which is hereby incorporated by reference in its entirety.

This case is a continuation in part of U.S. Design patent application Ser. No. 29/378,841, filed on Nov. 10, 2010 and entitled WHEELCHAIR, which is hereby incorporated by reference in its entirety.

This case is a continuation in part of U.S. Design patent application Ser. No. 29/378,834, filed on Nov. 10, 2010 and entitled WHEELCHAIR SEATING SYSTEM, which is hereby incorporated by reference in its entirety.

BACKGROUND

Wheelchairs and similar conveyances are an important means of transportation for a significant portion of society. Whether manual or powered, wheelchairs provide an important degree of independence for those they assist. Powered wheelchairs often have a seat coupled to a chassis. The chassis of the wheelchair may take a variety of forms.

SUMMARY

In one embodiment, the present application is directed to a conveyance such as a wheelchair that includes a seat assembly coupled to a chassis. The chassis includes a frame having a rear wheel support member, one or more front wheel support members extending in a forward direction from the rear wheel support member, and a seat support member. The rear wheel support member comprises a central portion and left and right portions extending downward from the central portion. The conveyance also includes one or more drive wheels for propulsion of the conveyance, a set of front wheels for supporting the conveyance, and a shrouding system for at least partially covering the frame and other components of the conveyance.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIGS. 15B and 15C are perspective and cross-sectional views of one embodiment of a foot plate.

FIGS. 21A and 21B are perspective views of one embodiment of a top cover.

FIG. 21C is a perspective view of one embodiment of a handle.

FIGS. 27A and 27B are perspective and top plan views, respectively, of one embodiment of a top shroud.

FIGS. 28A-28E are cross-sectional views of one embodiment of the top shroud shown in FIG. 27A.

FIGS. 29A and 29B are perspective and top plan views, respectively, of one embodiment of a lower shroud.

FIGS. 31A-31C are perspective, side elevational, and cross-sectional views, respectively, of one embodiment of a front shroud.

DESCRIPTION OF EMBODIMENTS

Figure 1A:
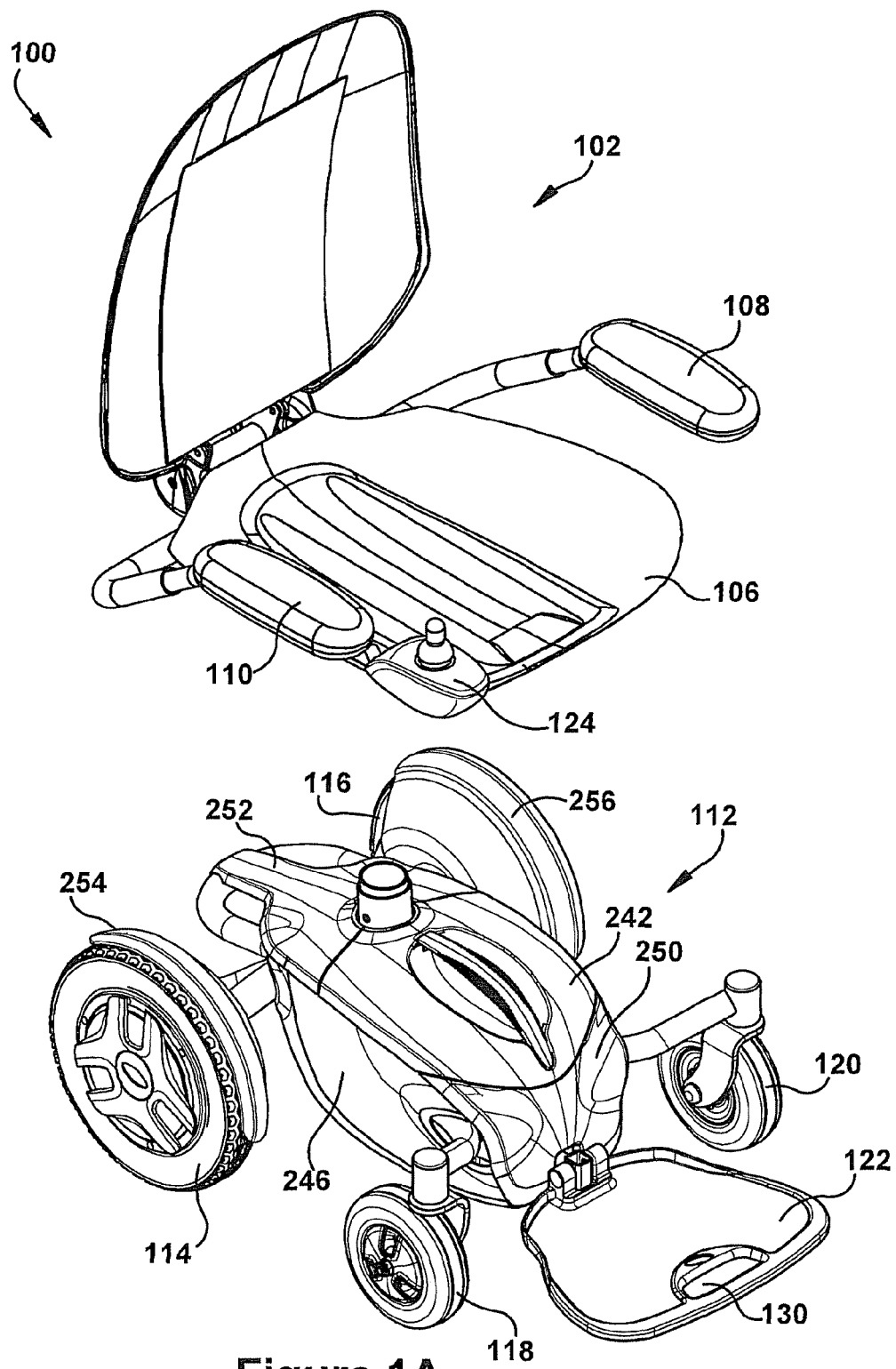
FIG. 1A is a partially exploded perspective view of one embodiment of a conveyance.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements. Furthermore, while the drawings are to relative scale, it is within the disclosure of thus specification to vary the relative size of components to one another.

In one embodiment, the present application is directed to a conveyance such as a wheelchair that includes a seat assembly and a chassis. The chassis comprises a frame that includes portions for connecting to or supporting any one or more of the following: front casters; a seat assembly; drive wheel assemblies; an energy source (e.g., batteries); rear anti-tip wheels; and a foot plate. Optional shrouding may also be supported on the frame or chassis. The frame structurally distributes the weight of the seat assembly (and optionally the weight of the energy source) to the supporting drive wheels and casters. Further, the drive wheels, caster supports, one or more anti-tip supports, and seat support of the wheelchair are all attached to a drive wheel support member of the frame.

In another embodiment, the present application is directed to a shrouding system for a conveyance such as a wheelchair. The shrouding system may include one or more components configured to cover the frame and other components of the conveyance. For example, the shrouding system may include a rear shroud, a top shroud, a front shroud, a left shroud, and a right shroud. The left shroud and the right shroud may form a lower shroud of the shrouding system. The rear shroud, top shroud, and front shroud may be configured to collectively cover a top and front of the frame and other components of the conveyance. Further, the lower shroud may be configured to cover the left and right sides, bottom, and rear of the frame and other components of the conveyance. The shrouding system may also includes openings to permit attachment of wheels, casters, and/or a seat assembly of the conveyance and may include raised and recessed portions and transitions there between acting to catch and focus light providing color tone (e.g., light to dark or vice-versa) to components made from a single color.

In another embodiment, the present application is directed to a frame for a conveyance such as a wheelchair. The frame includes a rear wheel support member, a left front wheel support member, and a right front wheel support member. The frame may also include a seat support member, a left rear mounting plate, a right rear mounting plate, and one or more cross members extending between the left and right front wheel support members. The left and right front wheel support members extend forward and downward from the rear wheel support member and then curve upward and outward to a distal end. The rear wheel support member curves upward when viewed from the front or rear and includes a substantially straight central portion at its apex. Left and right curved portions extend downward and away from the central portion of the rear wheel support in a rearward direction.

In yet another embodiment, the present application is directed to a wire routing system for a conveyance such as a wheelchair. A frame of the conveyance is configured such that the leads or wires emanating from a terminal or junction block are at least partially hidden and unexposed. The frame includes openings in a rear wheel support member for at least partially hiding one or more leads from the terminal to one or more drive wheels. The frame also includes access openings in the shroud and frame components for at least partially hiding one or more leads from the terminal to a joystick. A such, the frame with its entry and exit access opening or ports provides for one or more protected cable or wire runs or passageways within the wheelchair.

Illustrated in FIG. 1A is a partially exploded perspective view of one embodiment of a conveyance such as a wheelchair 100. Wheelchair 100 includes a seat assembly 102 and a chassis 112. As shown, seat assembly 102 is removable from chassis 112. Seat assembly 102 includes a back portion 104, a seat portion 106, and two armrest assemblies 108 and 110. Back portion 104 and seat portion 106 are constructed in such a manner so as to allow the angle there between to be adjusted and to also allow for folding of these components together to facilitate disassembly and transportation of wheelchair 100. A joystick 124 is also provided to allow a user to control the drive system of wheelchair 100.

Figure 1B:
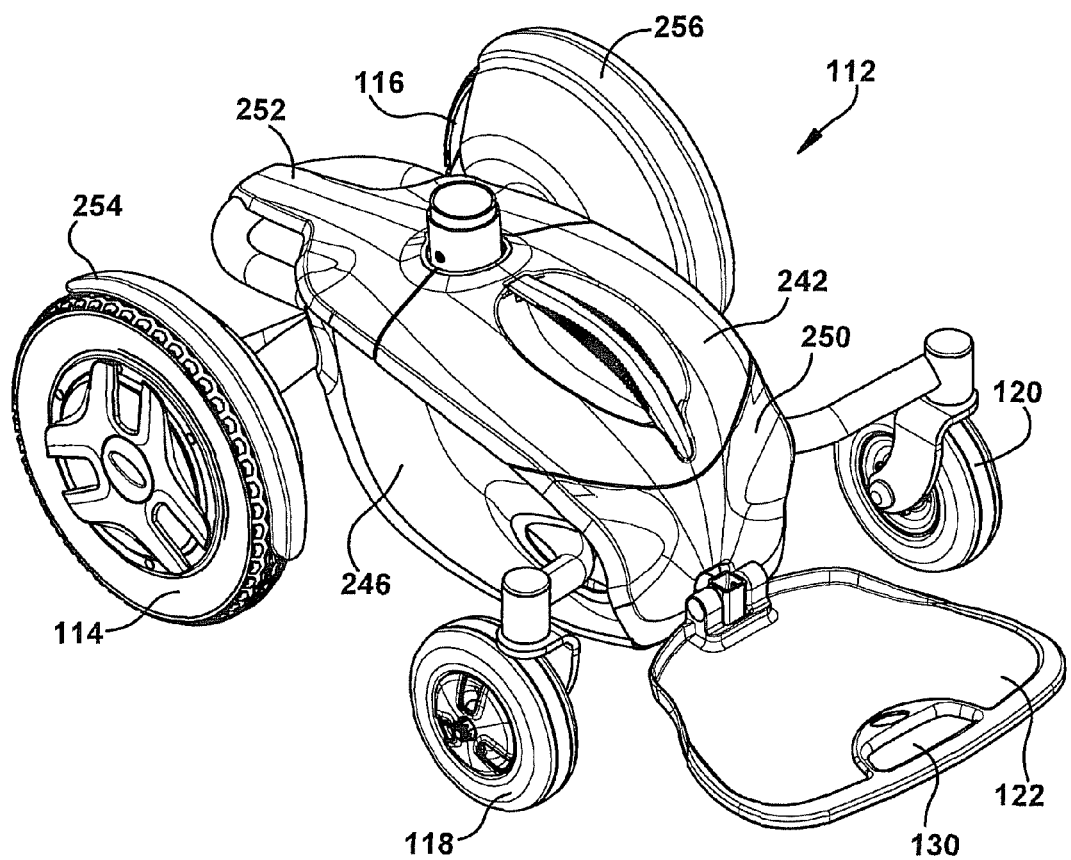
FIG. 1B is a perspective view of one embodiment of the chassis of FIG. 1A.
Figure 1C:
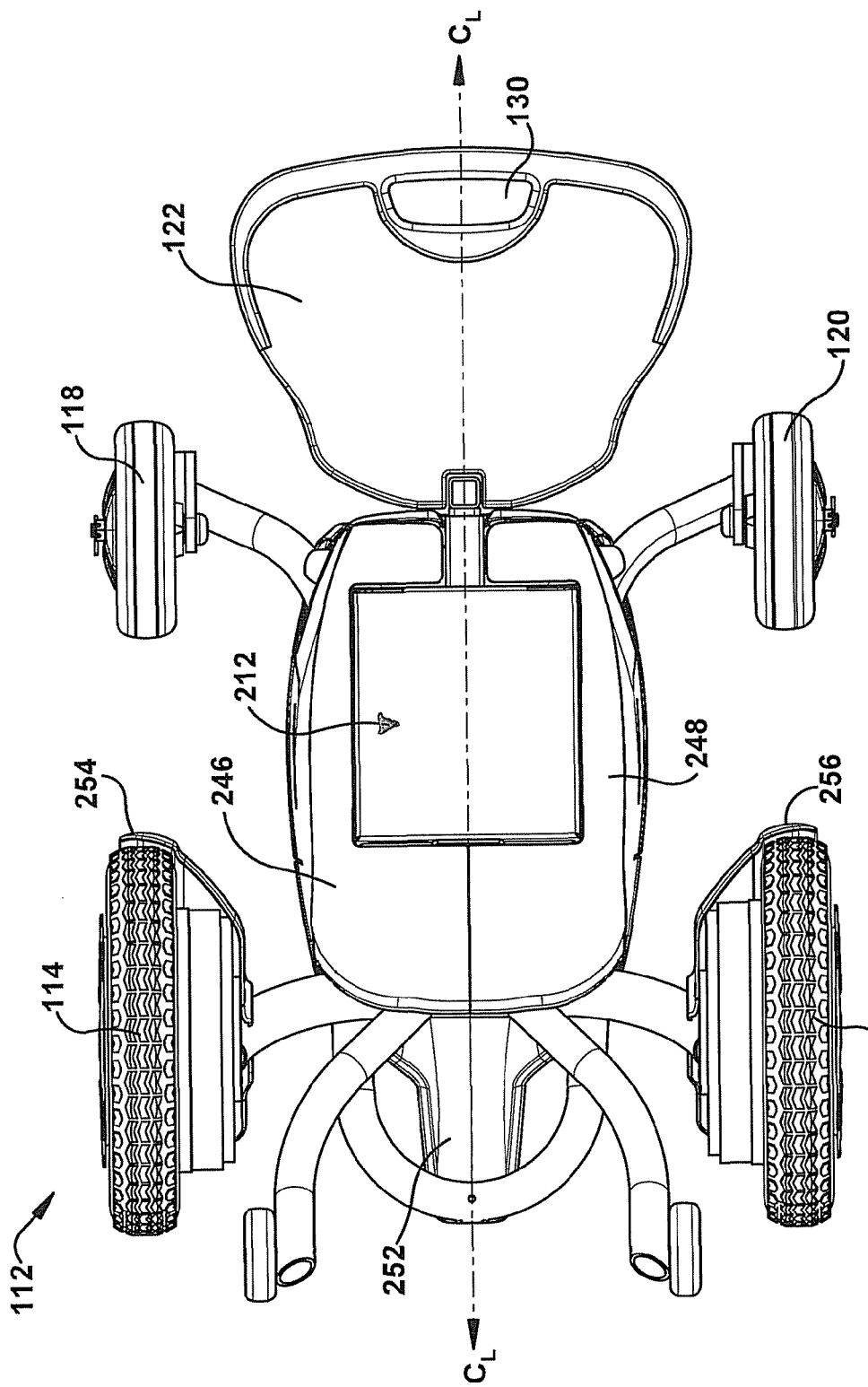
FIG. 1C is a bottom plan view of one embodiment of the chassis of FIG. 1A.

Illustrated in FIGS. 1B and 1C are perspective and bottom plan views of chassis 112. Chassis 112 includes drive wheels 114 and 116 connected thereto for propulsion of wheelchair 100. Drive wheels 114 and 116 may be driven by a plurality of types of drive assemblies including, for example, electric motor and gear combinations or gearless brushless motors such as wheel hub motors. Casters 118 and 120 are also connected to chassis 112 for providing forward support of wheelchair 100. A foot plate 122 having an opening 130 is connected to the front portion of chassis 112 to support the feet of a user. Foot plate 122 is pivotally attached to a foot plate mounting member 262 (FIGS. 2 and 3) by use of a fastener through appropriately aligned apertures in the foot plate and the foot plate mounting member. In other embodiments, footrests such as left and right swing away footrests may be used.

Figure 2:
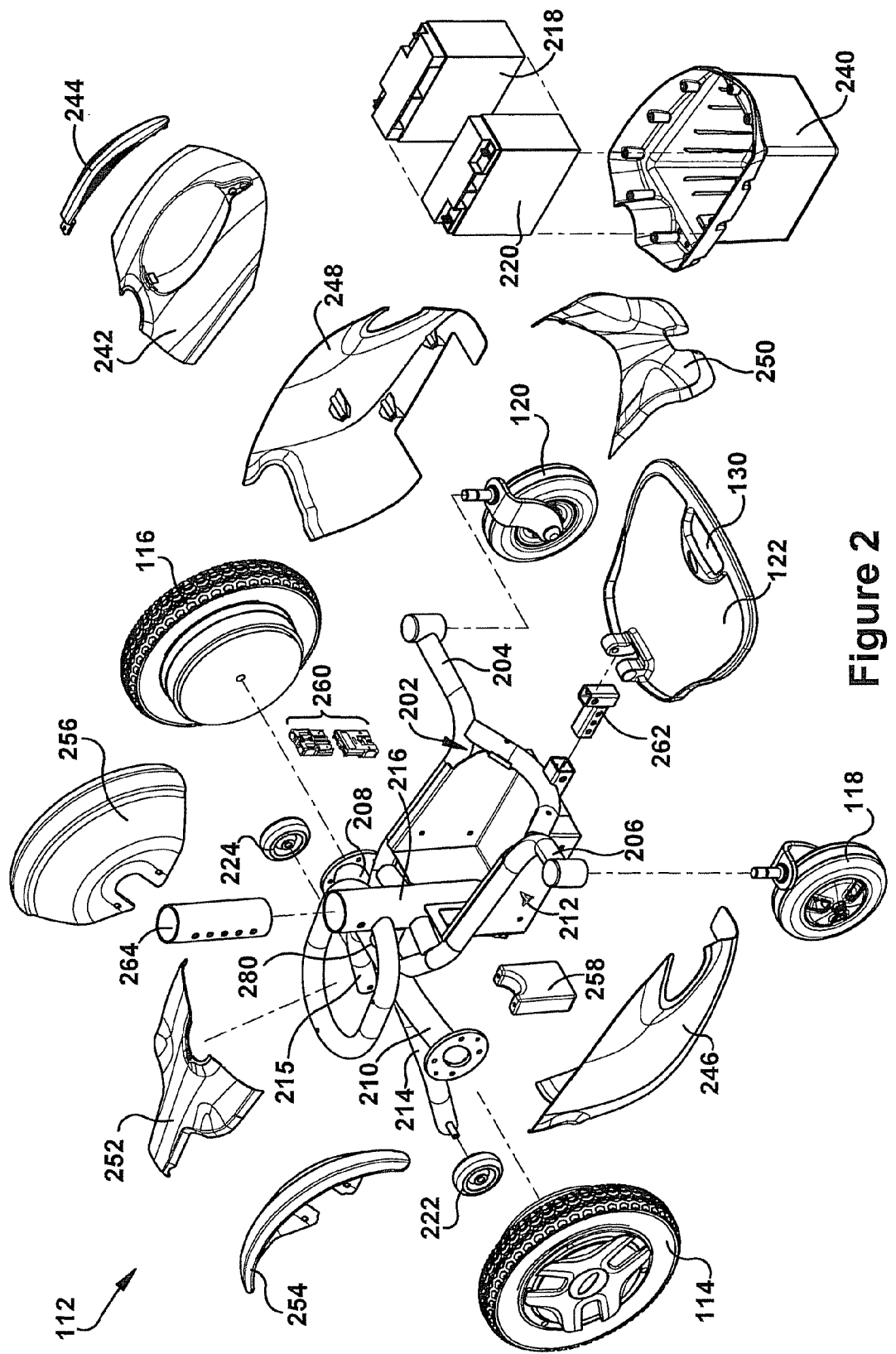
FIG. 2 is an exploded perspective view of one embodiment of the chassis of FIG. 1A.

Illustrated in FIG. 2 is an exploded perspective view of chassis 112. Chassis 112 includes several components for supporting and driving wheelchair 100 and its occupant. Chassis 112 includes a frame 202 disposed substantially about a centerline $C_L$ of wheelchair 100 (FIGS. 1C and 4B; centerline $C_L$ represents the centerline of both chassis 112 and wheelchair 100). As shown, frame 202 includes central member 280, two caster support members 204 and 206, two axle support members 208 and 210, one or more anti-tip support members 214 and 215, and a seat support member 216.

Caster support members 204 and 206 emanate forward from central member 280 and provide for mounting of casters 118 and 120. As shown, casters 118 and 120 each comprise a single fork to support the caster wheel on one side. Axle support members 208 and 210 emanate outwardly and in a slightly rearward direction from central member 280 and provide for mounting of drive wheels 114 and 116. Axle support members 208 and 210 may be extensions or portions of central member 280. In this particular embodiment, drive wheels 114 and 116 are of a wheel hub motor design having the drive motors incorporated into the hub of the wheels. Hub motors permit the use of smaller batteries and eliminate the need for a gearbox such that the drive assembly of the wheelchair requires less space in chassis 112. However, as described above, other types of drive assemblies may be used.

Figure 10A:
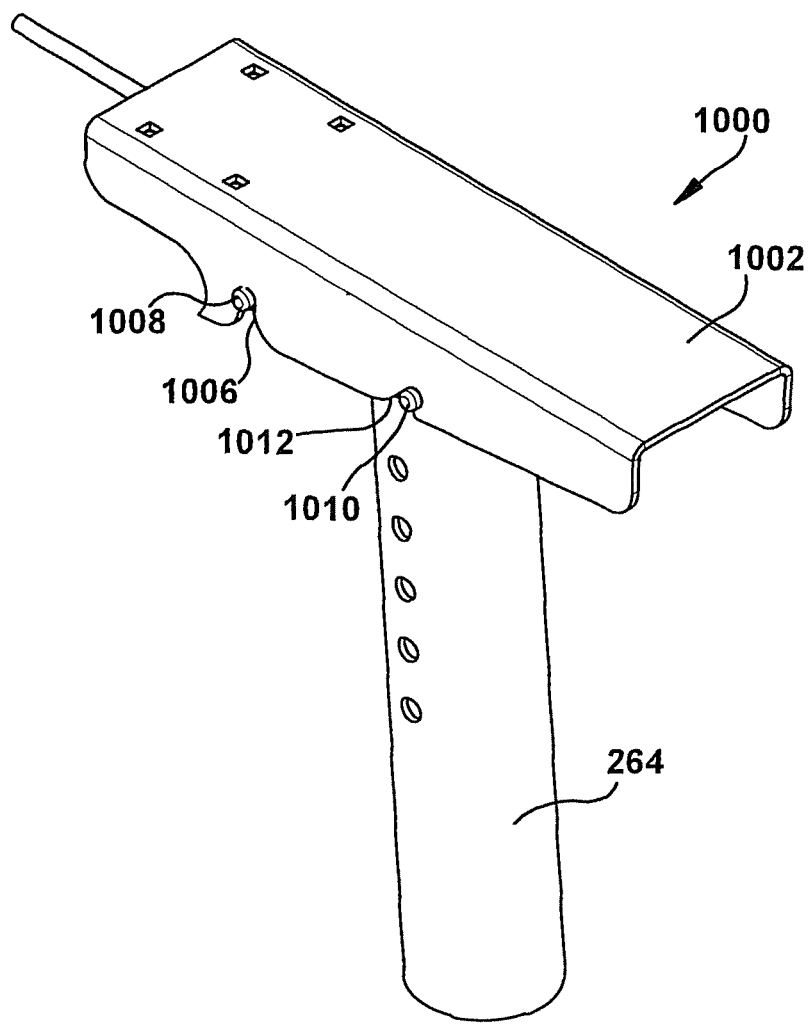
FIGS. 10A-10C are perspective, exploded perspective, and exploded side elevational views of one embodiment of a seat attachment assembly.
Figures 10B, 10C:
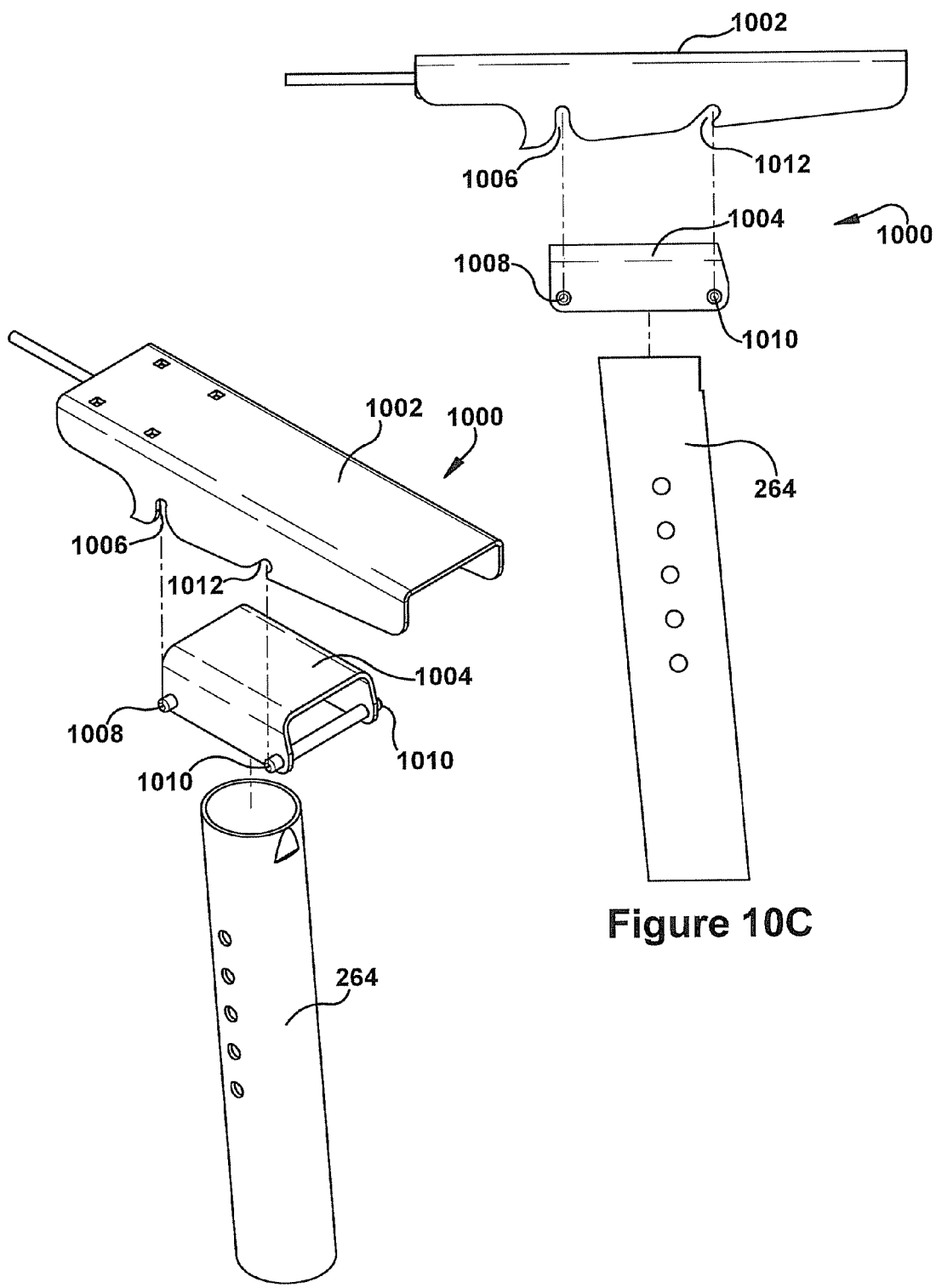

One or more anti-tip support members 214 and 215 emanate rearward from central member 280 and provide for mounting of one or more anti-tip wheels or casters 222 and 224. Seat support member 216 is disposed proximate central member 280 and provides for mounting of seat assembly 102 to chassis 112. Seat support member 216 is configured to receive a seat support 264 therein for adjusting and fixing the floor-to-seat height of the wheelchair. Although not shown in FIG. 2, seat assembly 102 may be attached, either directly or indirectly, to seat support 264 in a wide variety of different manners. For example, seat support 264 may have a plate affixed thereto for connection to seat assembly 102. One exemplary embodiment of a seat attachment assembly is shown in FIGS. 10A-10C and described below. Any manner of connecting the seat assembly to the chassis 112 may be employed.

In one embodiment, chassis 112 includes a battery support tray 212 disposed between caster support members 204 and 206 of frame 202. In this particular embodiment, battery support tray 212 is configured to receive a removable housing 240 designed to hold one or more batteries 218 and 220, which are the energy source of wheelchair 100. In another embodiment (not shown), battery support tray 212 is configured to hold one or more batteries 218 and 220 without the use of housing 240. One or more electrical connectors 260 for connecting one or more batteries 218 and 220 to the electrical system of the wheelchair may also be coupled to frame 202 or battery support tray 212. Further, battery support tray 212 or removable housing 240 may include a resettable fuse for one or more batteries 218 and 220.

Figure 12:
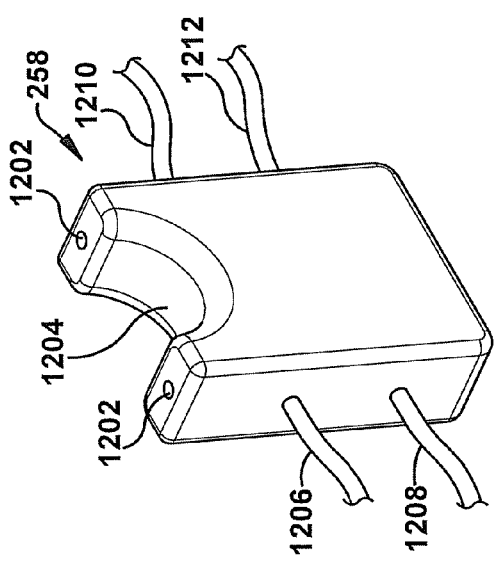
FIG. 12 is a perspective view of one embodiment of a junction block.

A junction block may also be coupled to frame 202 to permit electrical connection of various components of the wheelchair. The junction block can take a wide variety of different forms. Illustrated in FIG. 12 is a perspective view of junction block 258 of chassis 112. In the illustrated embodiment, junction block 258 is an overmolded board with four leads, or wires, extending therefrom for connection to various wheelchair components. More specifically, leads 1206 and 1210 extend from junction block 258 and connect to drive wheels 114 and 116, lead 1208 extends from the junction block and connects to one or more batteries 218 and 220 via one or more electrical connectors 260, and lead 1212 extends from the junction block and connects to joystick 124. In other embodiments, the junction block may include terminals, or connections, for coupling leads from various components of the wheelchair. For example, the junction block may include four terminals for connecting two leads from drive wheels 114 and 116, one lead from one or more batteries 218 and 220, and one lead from joystick 124.

The leads or wires emanating from junction block 258 may be hidden. For example, leads 1206 and 1210 (FIG. 12) may be routed through an opening 480 (FIG. 4E) in the bottom portion of central member 280, through the central member and axle support members 208 and 210 (FIGS. 2 and 4E), and out the distal end of the axle support members to connect to drive wheels 114 and 116 (FIG. 2). Leads 1206 and 1210 are not shown in FIGS. 2 and 4E to simplify the drawings. Lead 1208 (FIG. 12) may extend from junction block 258 and connect to electrical connector 260 (FIG. 2) attached to connector mounting bracket 408 (FIG. 5B). Further, lead 1212 (FIG. 12) may extend from junction block 258 and out the top of a rear shroud 252 (FIG. 2) of chassis 112 for connection to a lead from joystick 124 (FIG. 1A) when seat assembly 102 is mounted to the chassis.

Although not shown in FIG. 2, junction block 258 may be coupled to a member of frame 202 by various methods, such as with a bracket, fastener, weldment, adhesive, etc. As shown in FIG. 12, junction block 258 includes an arcuate portion 1204 such that the junction block can fit around a member of frame 202 (e.g., support member 404 shown in FIGS. 4B and 4C). Apertures 1202 permit attachment of a fastener and/or bracket such that junction block 258 may be coupled to one or more members of frame 202.

Chassis 112 also includes shrouding coupled to frame 202. As shown in FIGS. 1A and 1B, the shrouding of chassis 112 at least partially encompasses frame 202. Referring to FIG. 2, chassis 112 includes a front shroud 250, rear shroud 252, two side shrouds 246 and 248, and two drive wheel fenders 254 and 256 coupled to frame 202. Also, a top shroud or cover 242 is removably attached to battery housing 240. In combination, the various shroud components form an elliptical or egg shaped shrouding that at least partially covers the top, front, sides, and rear of frame 202. However, other embodiments of shrouds may also be employed or even no shroud. Further, the shrouding of chassis 112 may include more or less shroud components. As shown in FIGS. 1A-1C, the visible frame components that extend outside of the shroud components are tubular in form.

Top cover 242 includes a handle 244 and is configured to be attached to battery housing 240 such that the top cover and the housing can be removed from the wheelchair as a single unit, e.g., to service and/or charge one or more batteries 218 and 220. In another embodiment (not shown), top cover 242 is attached to battery housing 240 such that the top cover may be removed from, or manipulated relative to, the housing to expose one or more batteries 218 and 220 contained within the housing. A latch type mechanism may also be used to lock battery housing 240 and top cover 242 in place relative to frame 202. For example, handle 244 may include a button or latch type mechanism that, when manipulated, will unlock battery housing 240 and/or top cover 242 from frame 202 (e.g., seat support member 216).

As illustrated in FIG. 1C, the bottom of battery support tray 212 extends below the bottom of side shrouds 246 and 248. As such, battery support tray 212 acts a skid plate to protect side shrouds 246 and 248 from damage due to various objects (e.g., curbs, ramps, bumps, rocks, etc.) that may contact the bottom of the chassis 112 during transport.

Figure 3:
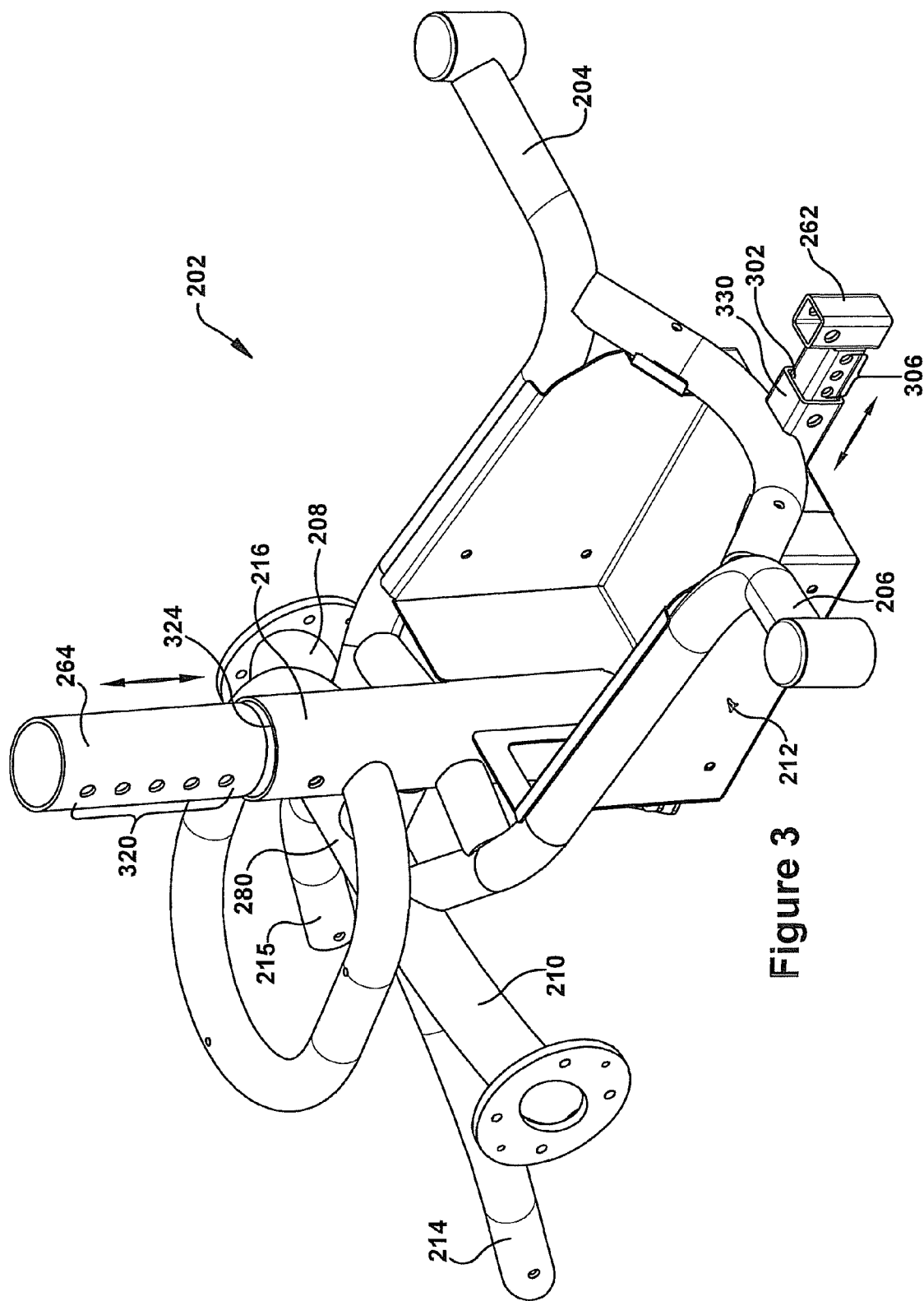
FIG. 3 is a perspective view of one embodiment of the frame of FIG. 2.

FIG. 3 is a perspective view of frame 202 illustrating the connection between seat support 264 and the frame. Seat support member 216 of frame 202 includes a receiving portion 324 having one or more apertures therein. Receiving portion 324 telescopically receives seat support 264 therein for adjusting and fixing the floor-to-seat height of the wheelchair. The floor to seat height of the wheelchair is adjusted and fixed through the use of a plurality of apertures 320 in seat support 264, which are aligned with the apertures in receiving portion 324. A suitable fastener is then used through the appropriately aligned apertures to fix or maintain the relative position of seat support 264 and receiving portion 324. The fastener may be of an easily removable type not requiring the use of tools.

FIG. 3 also illustrates the connection between foot plate mounting member 262 of foot plate 122 and frame 202. A foot plate support member 330 of frame 202 includes a receiving portion 302 having one or more apertures therein. Receiving portion 302 telescopically receives foot plate mounting member 262 therein for adjusting and fixing the foot plate of the wheelchair. Foot plate 122 (FIG. 2) is adjusted and fixed through the use of one or more apertures 306 in foot plate mounting member 262, which are aligned with the one or more apertures in receiving portion 302. A suitable fastener is then used through the appropriately aligned apertures to fix or maintain the relative position of foot plate mounting member 262 and receiving portion 302. The fastener may be of an easily removable type not requiring the use of tools.

Further, as illustrated in FIGS. 2 and 3, the chassis 112 is configured such that battery support tray 212 is disposed forward of seat support member 216. As shown, battery support tray 212 is disposed between caster support members 204 and 206 and forward of seat support member 216 such that one or more batteries 218 and 220 may be removed or installed towards the front of the wheelchair.

FIGS. 4A-4E illustrate various views of frame 202. Although frame 202 is described herein as having multiple members or components, the frame may be fabricated as a single component or formed from any number of components integrally fabricated, joined, or fixed together. For example, in one embodiment, frame 202 is fabricated from multiple components made of metal and/or composite material that, when joined or fixed together, form the frame of the conveyance. In another embodiment, frame 202 is a single fabricated component made of metal and/or composite material. Also, various members or components of frame 202 may be a larger size or diameter than other members or components of the frame. For example, in one embodiment, central member 280 may be a larger size or diameter than caster support members 204 and 206, axle support members 208 and 210, and anti-tip support members 214 and 215. In other embodiments, these members can be all of the same size or different sizes so long as the proper load-bearing requirements are met. Further, frame 202 is shown with arcuate members or components forming the frame. In other embodiments, straight members or components may be arranged at various angles to form the shape of the frame.

As shown in FIGS. 4A-4E, frame 202 includes central member 280, caster support members 204 and 206, axle support members 208 and 210, anti-tip support members 214 and 215, and seat support member 216. Caster support members 204 and 206, axle support members 208 and 210, and anti-tip support members 214 and 215 extend from central member 280 in various directions. Thus, in this particular embodiment, frame 202 resembles a spider-like arrangement in that its members emanate from an intermediate or central portion of the frame. Further, frame 202 may be described as an "H" shaped box frame in that axle support members 208 and 210 and central member 280 form one side of the "H" and the front portions of caster support members 204 and 206 form the other side of the "H". The box shape of frame 202 includes the area between caster support members 204 and 206, a cross member 406, and central member 280.

Figure 4A:
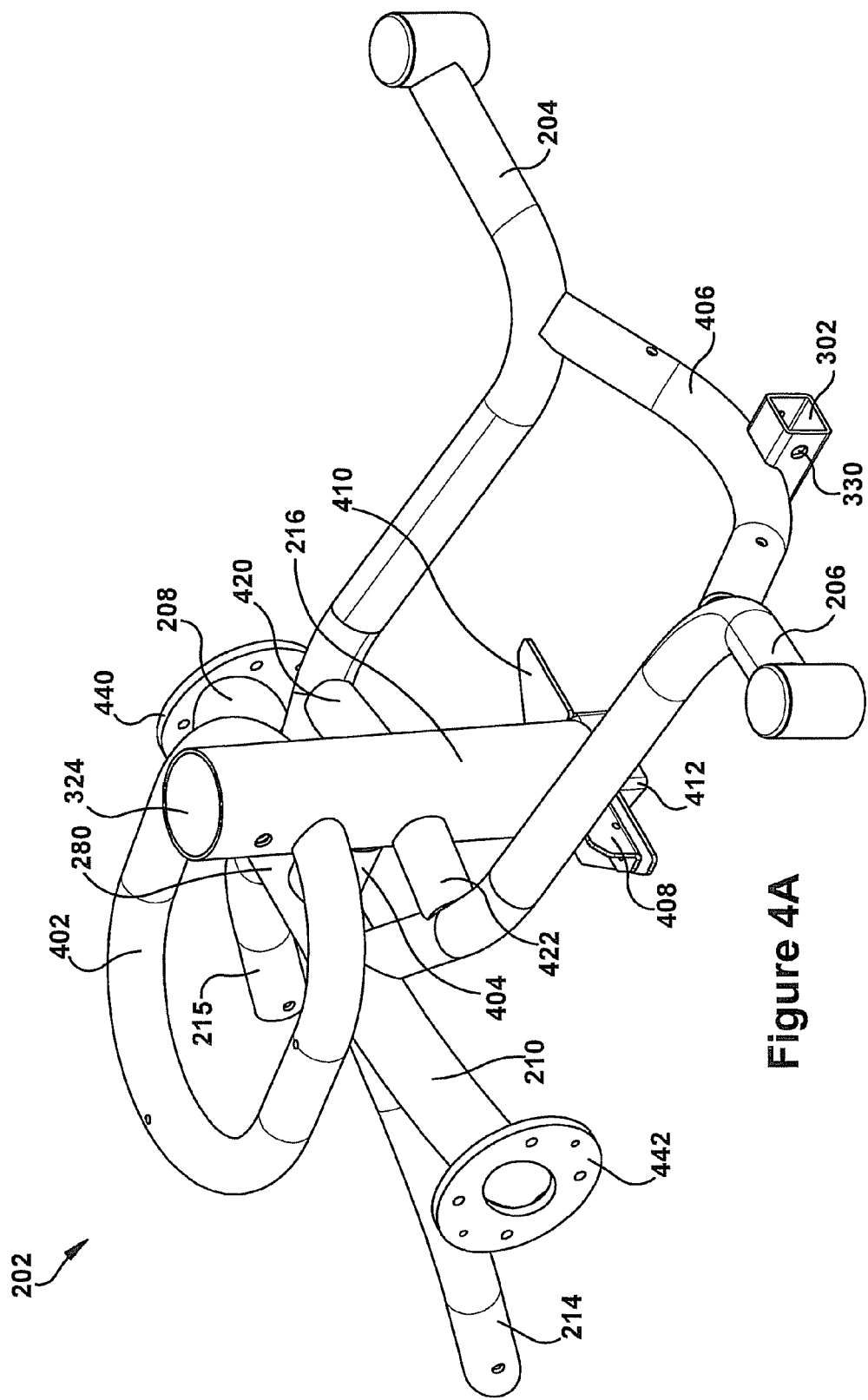
FIGS. 4A-4E are perspective, top plan, side elevational, front elevational, and rear elevational views, respectively, of one embodiment of a frame.
Figure 4B:
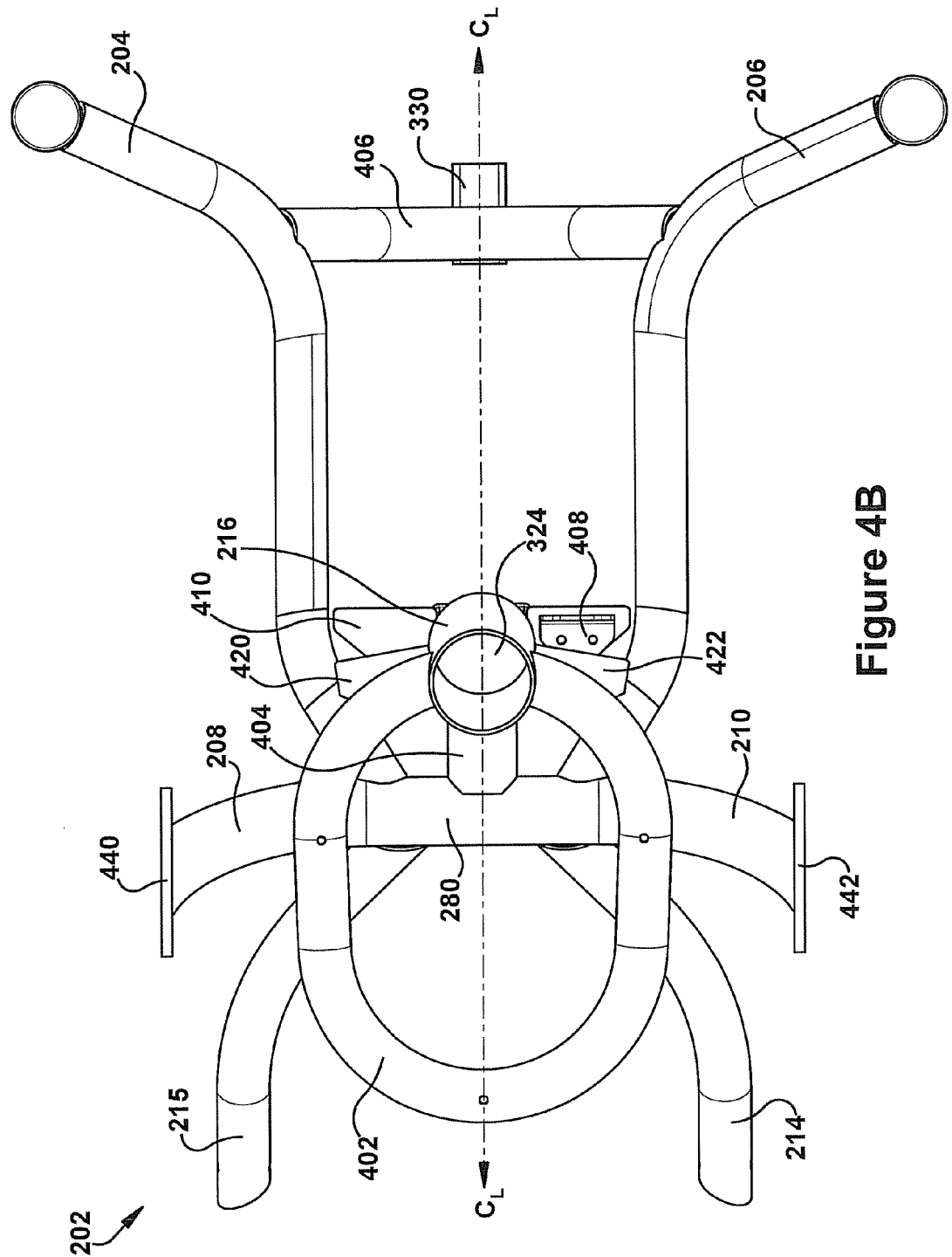
Figure 4C:
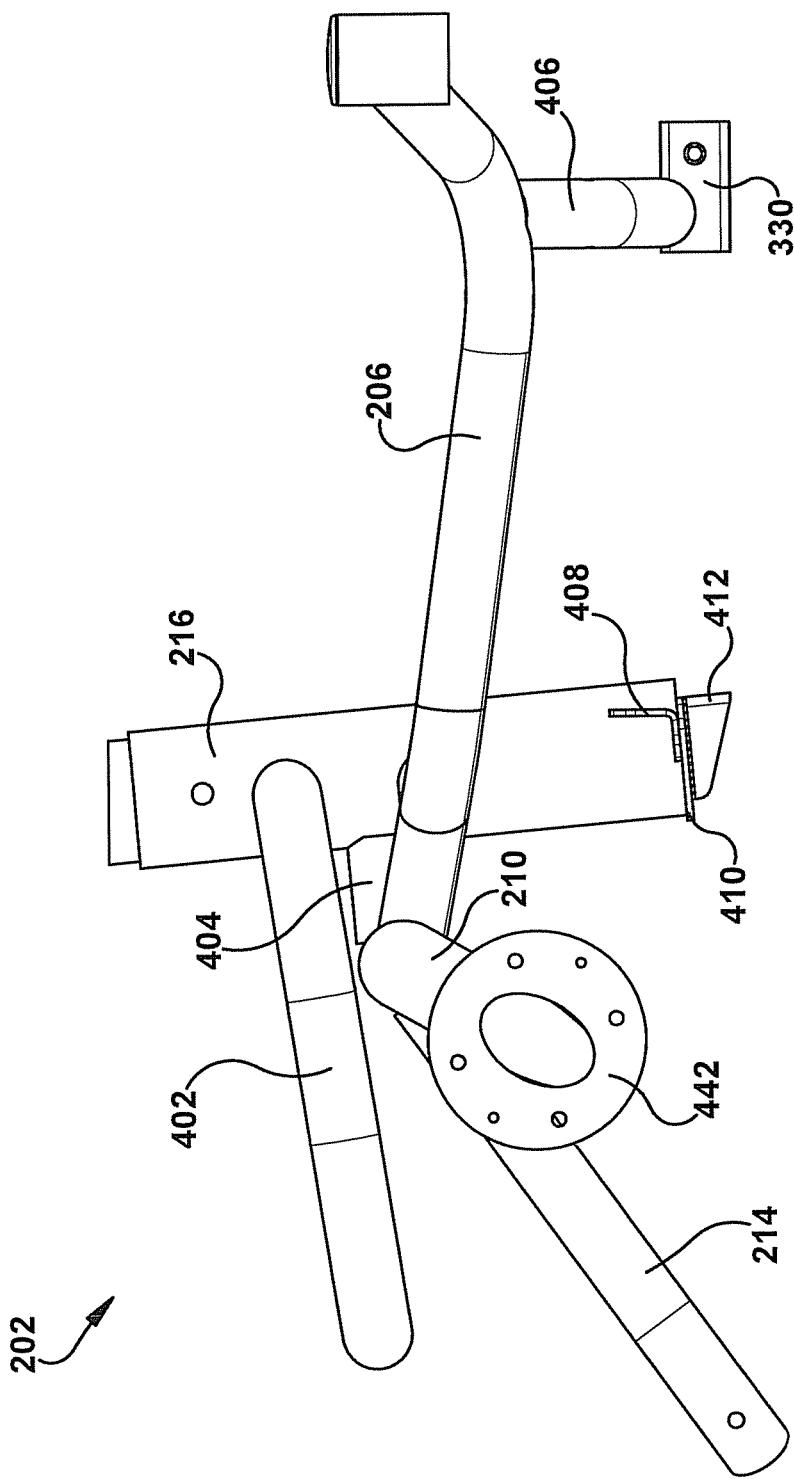
Figure 4D:
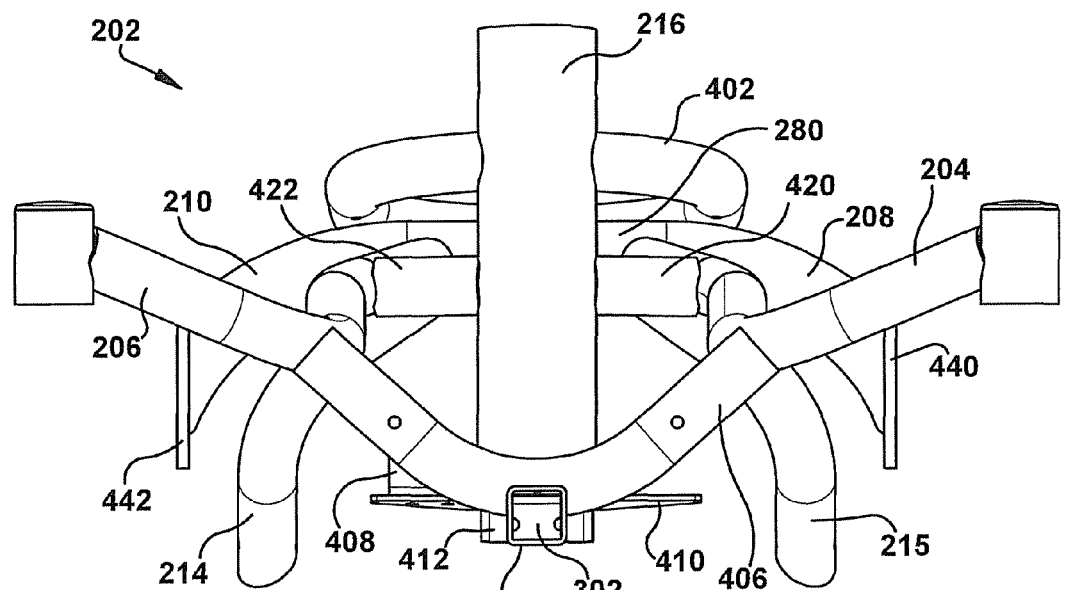
Figure 4E:
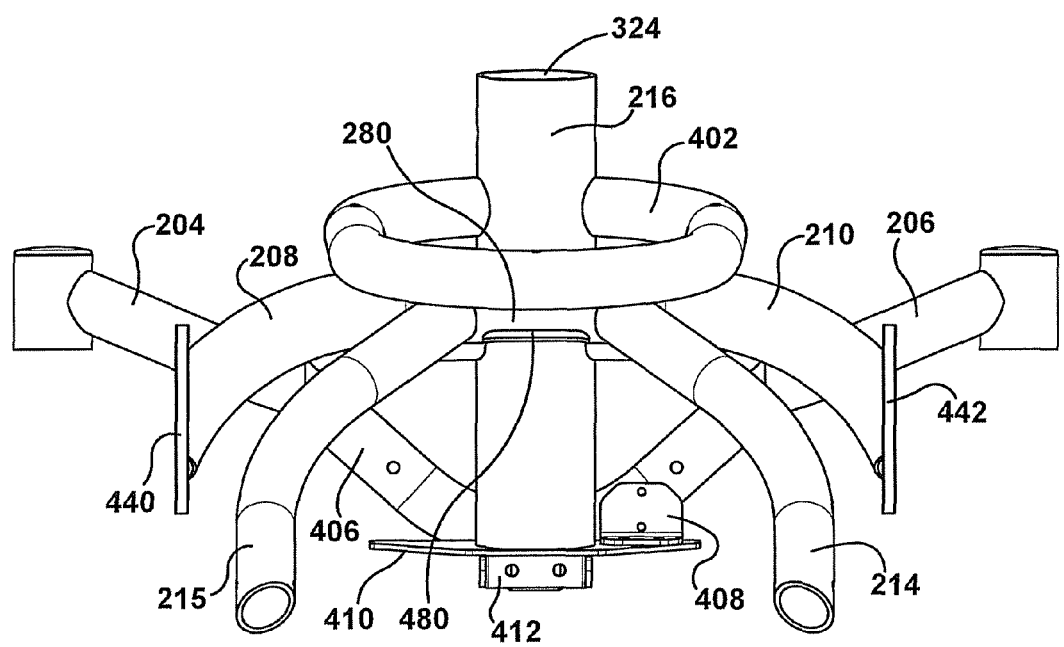

FIG. 4B illustrates a top plan view of frame 202. As shown in FIG. 4B, frame 202 is disposed substantially about centerline $C_L$, which represents the centerline of chassis 112 and wheelchair 100 (FIG. 1C). In particular, central member 280, caster support members 204 and 206, axle support members 208 and 210, and anti-tip support members 214 and 215 are all symmetrically disposed about centerline $C_L$. As such, in this embodiment, each of these members possess a geometry on one side of the centerline $C_L$ that is a mirror image of the geometry on the other side of the centerline $C_L$.

FIGS. 4A-4E illustrate the geometry of axle support members 208 and 210 in this embodiment. Axle support members 208 and 210 emanate from central member 280 and extend downwardly and away therefrom. In this particular embodiment, axle support members 208 and 210 extend in a rearward direction of the chassis. These members also collectively form a "U" or "V" shape extending away from central member 280. Central member 280 and axle support members 208 and 210 collectively form a drive wheel support member of frame 202.

Furthermore, each axle support member includes a flange 440 and 442 disposed proximate the distal portion of the axle support member and having one or more apertures therein for mounting drive wheels 114 and 116. Various shapes and sizes of apertures may be used depending at least on the size and type of drive assembly.

Other geometric configurations for axle support members 208 and 210 include members having only upwardly or downwardly arcuate portions or only linear portions extending from central member 280 and members having various combinations of arcuate portions and linear portions extending from central member 280. Other geometries are also possible. While axle support members 208 and 210 are shown emanating from central member 280 in a manner providing a rear wheel drive configuration for wheelchair 100, axle support members 208 and 210 can be disposed more forward of their current positions so as to provide a mid-wheel drive configuration or even a front wheel drive configuration.

FIGS. 4A-4E also illustrate the geometry of caster support members 204 and 206. In this embodiment, each caster support member extends in an arcuate manner and in the forward direction of the chassis. More specifically, each caster support member extends downward and away from central member 280 and centerline $C_L$, curves to become substantially parallel to the centerline, continues to extend downward while remaining substantially parallel to the centerline, then curves upward and away from the centerline to a distal end for attachment of casters 118 and 120. Thus, each caster support member emanates forward and away from central member 280 to form an "S" shape. Other geometric configurations for caster support members 204 and 206 include members having only upwardly or downwardly arcuate portions or only linear portions extending from central member 280 and members having various combinations of arcuate portions and linear portions extending from central member 280. Other geometries are also possible.

In the embodiment illustrated in FIGS. 4A-4E, cross member 406 extends between the front portion of caster support members 204 and 206. Attached to cross member 406 is foot plate support member 330 having receiving portion 302 that telescopically receives foot plate mounting member 262 therein. As shown, cross member 406 is arcuate and forms a generally "U" shape with foot plate support member 330 attached proximate the bottom of the "U". However, other geometric configurations of cross member 406 are possible, such as a straight member or a member forming a generally "V" shape.

FIGS. 4A-4E also illustrate the geometry of anti-tip support members 214 and 215. In this embodiment, anti-tip support members 214 and 215 emanate from central member 280 and extend downward and away therefrom. Apertures are located in the distal ends of anti-tip support members 214 and 215 for attachment of anti-tip wheels or casters 222 and 224. As shown, the distal end of anti-tip support members 214 and 215 projects beyond the rearward most portion of frame 202. However, this need not be the case. Collectively, anti-tip support members 214 and 215 form a generally inverted "V" or "U" shape having arcuate segments, though linear and a combination of arcuate and linear segments may also be used in the construction of the shapes.

FIGS. 4A-4E illustrate seat support member 216 of frame 202. In this embodiment, seat support member 216 is attached to central member 280 by a first support member 404 and to caster support members 204 and 206 by a second support member 420 and a third support member 422, respectively. The support members 404, 420, and 422 hold the seat support member 216 in an upright and vertical position such that receiving portion 324 may telescopically receive seat support 264 therein. However, more or less support members may be used to hold seat support member 216 in position. In some embodiments, seat support member 216 may be angled relative to the floor and not substantially vertical. Further, in the embodiment illustrated in FIGS. 4A-4E, a flange 410 is attached to the distal end of seat support member 216. Attached to flange 410 is a connector mounting bracket 408 and a battery tray mounting bracket 412. These mounting brackets are described below relative to battery support tray 212.

In the embodiment illustrated in FIGS. 4A-4E, a rear handle 402 extends rearward from seat support member 216 to provide a gripping point for the user to lift chassis 112, which is further discussed below in relation to FIG. 9. Rear handle 402 may also be used to support rear shroud 252 (FIG. 2). As shown, rear handle 402 includes arcuate and linear portions, forming an "O" shape with the ends of the member attaching to seat support member 216. However, other geometric configurations of rear handle 402 are possible, such as one or more straight members, arcuate members, or plates extending from seat support member 216. Rear handle 402 may also extend from other members or components of frame 202, e.g., extending upward and/or rearward from central member 280, one or more anti-tip support members 214 and 215, and/or axle support members 208 and 210.

Figure 5A:
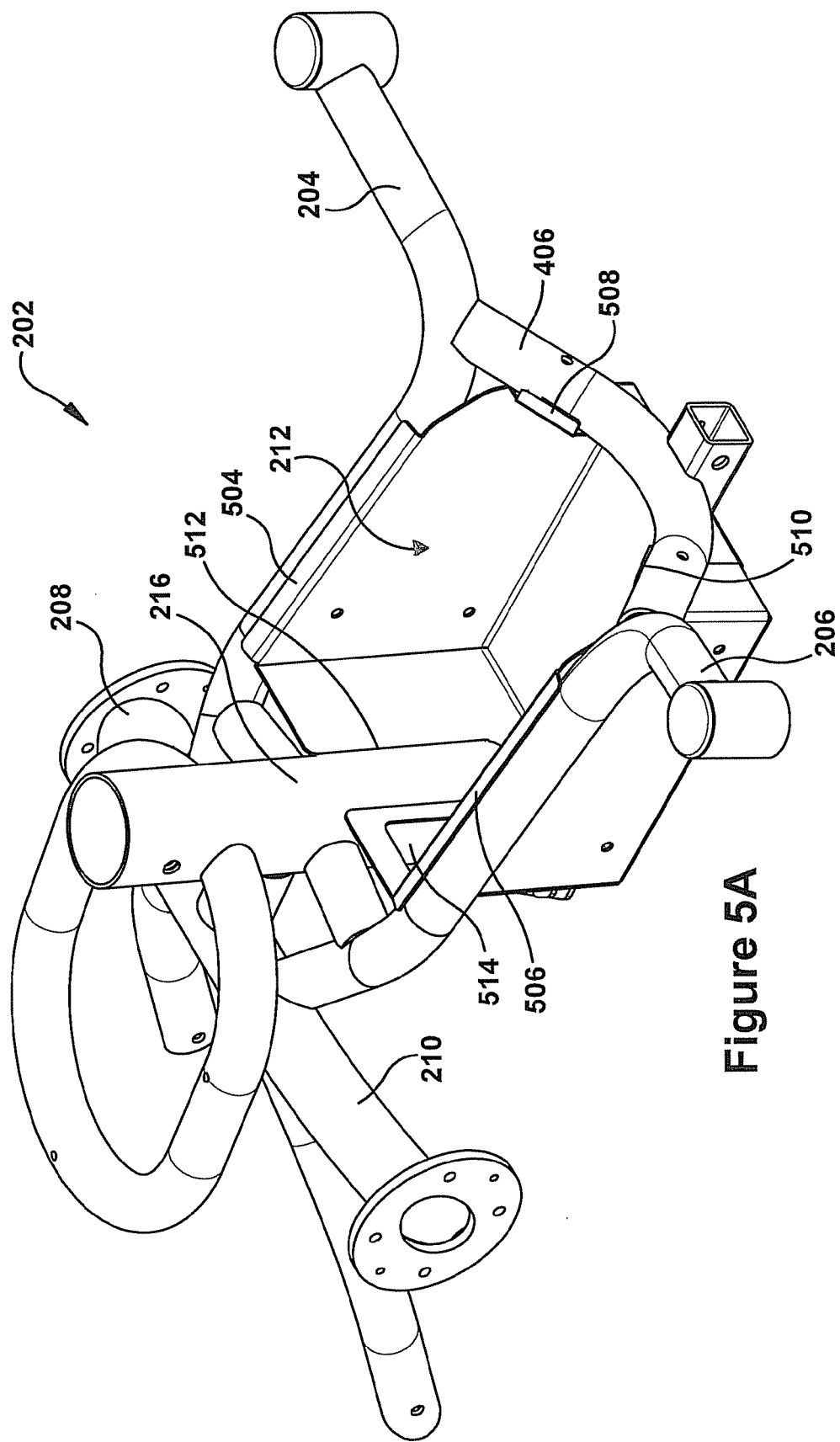
FIGS. 5A and 5B are perspective and rear elevational views of one embodiment of a frame having a battery support.
Figure 5B:
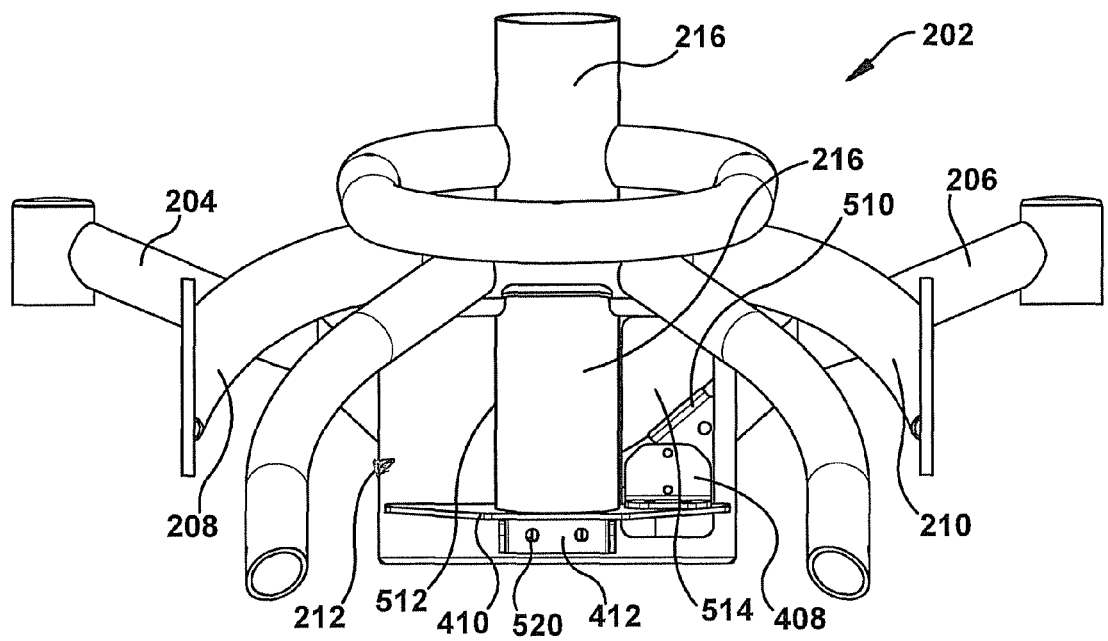

FIGS. 5A and 5B illustrate battery support tray 212 attached to frame 202. In this embodiment, battery support tray 212 is disposed between caster support members 204 and 206, seat support member 216, and cross member 406. Tabs 504 and 506 of battery support tray 212 are configured to rest on caster support members 204 and 206, respectively, to support two side walls of the tray. Further, tabs 508 and 510 of battery support tray 212 are configured to rest on cross member 406 to support the front wall of the tray. In other embodiments, more or less tabs may be used to support battery support tray 212. Further, the tabs may be attached to frame 202, such as with weldments, adhesives, and/or fasteners.

As shown in FIG. 5B, one or more locating pins or fasteners 520 are used to locate battery support tray 212 relative to frame 202 and/or attach the battery support tray to battery tray mounting bracket 412. However, battery support tray 212 can be, but does not necessarily have to be, attached to one or more of the aforementioned portions of frame 202. Other configurations of supporting and attaching battery support tray 212 to frame 202 are possible. Attachment may be by any suitable means, including weldments, adhesives, and/or fasteners. For example, in one embodiment, battery support tray 212 is welded to caster support members 204 and 206, seat support member 216, cross member 406, and battery tray mounting bracket 412. Welding battery support tray 212 to frame 202 increases the rigidity of the frame and helps to distribute the weight associated with seat assembly 102 (FIG. 1A) and the energy source (one or more batteries 218 and 220; FIG. 2) to the drive wheels and casters.

FIGS. 5A and 5B also illustrate a seat support member opening 512 and a connector opening 514 of battery support tray 212. As shown, seat support member opening 512 is a vertical slot extending downward from an upper edge of the rear wall of battery support tray 212. Seat support member opening 512 provides clearance for battery support tray 212 to be disposed within frame 202. Further, battery support tray 212 may be welded to seat support member 216 along one or more edges of seat support member opening 512. However, other geometric configurations of battery support tray 212 are possible, such as removing all or a portion of the rear wall or fabricating the rear wall to fit around seat support member 216.

As shown in FIG. 5B, connector opening 514 provides clearance for one or more electrical connectors attached to connector mounting bracket 408. In some embodiments, connector mounting bracket 408 may be configured to "cushion" the electrical connection and reduce the amount of stress on the connection. For example, a spring and/or elastomeric material may be used to allow the connector mounting bracket 408 to flex relative to frame 202, for example during connection or disconnection of the electrical component or during use of the wheelchair.

As shown in FIGS. 5A and 5B, frame 202 structurally distributes the weight associated with seat assembly 102 (FIG. 1A) and the energy source (one or more batteries 218 and 220 supported by battery support tray 212; FIG. 2) to the drive wheels and casters through axle support members 208 and 210 and caster support members 204 and 206, respectively.

Figure 6A:
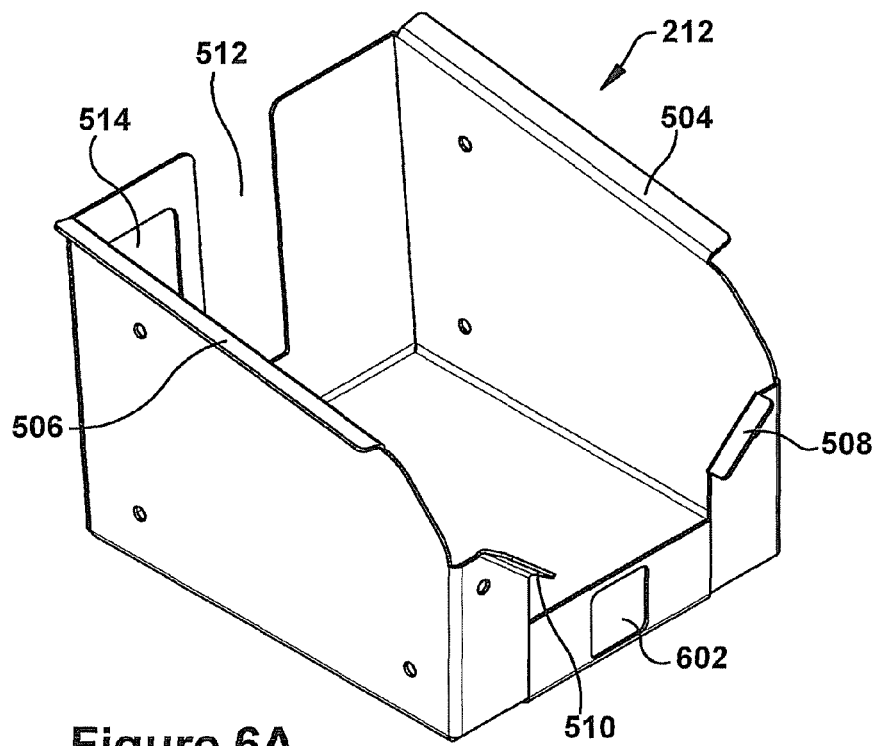
FIGS. 6A-6C are perspective, front elevational, and rear elevational views of one embodiment of a battery support.
Figure 6B:
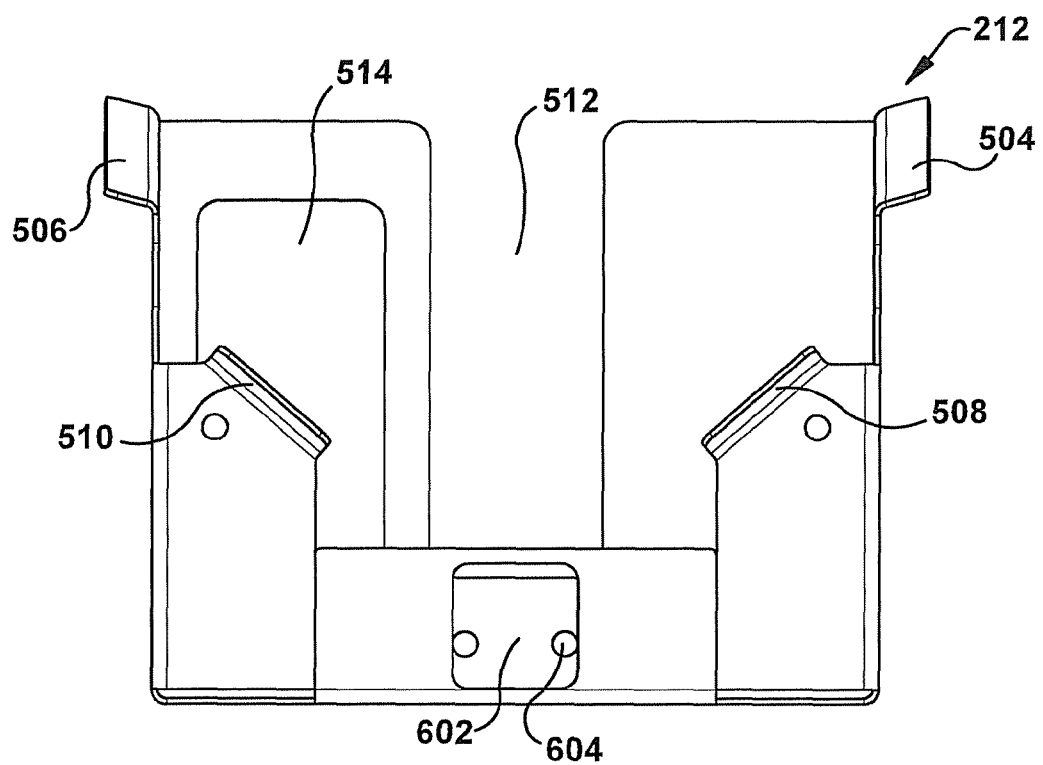
Figure 6C:
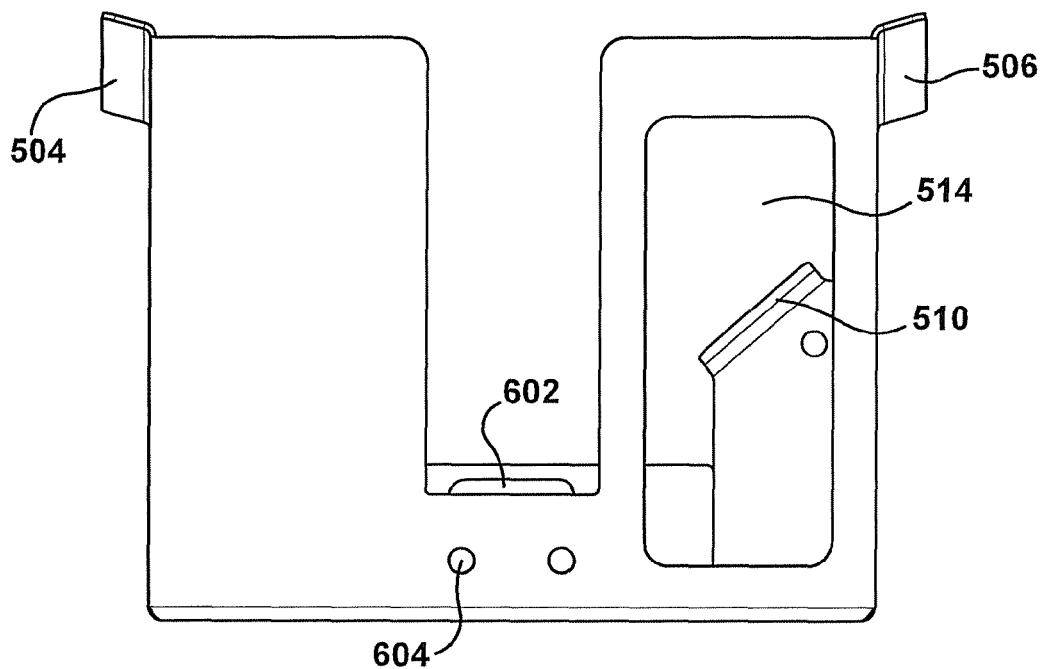

FIGS. 6A-6C illustrate the geometry of battery support tray 212 in this embodiment. As shown, battery support tray 212 includes a planar bottom, a front wall, a rear wall, and two side walls. The front wall of battery support tray 212 includes tabs 508 and 510 and a foot plate opening 602 to provide clearance for the foot plate support member and foot plate mounting member. The rear wall of battery support tray 212 includes one or more apertures 604 for receipt of one or more locating pins or fasteners 520 (FIG. 5B), seat support member opening 512, and connector opening 514. The side walls of battery support tray 212 include tabs 504 and 506.

Figure 7:
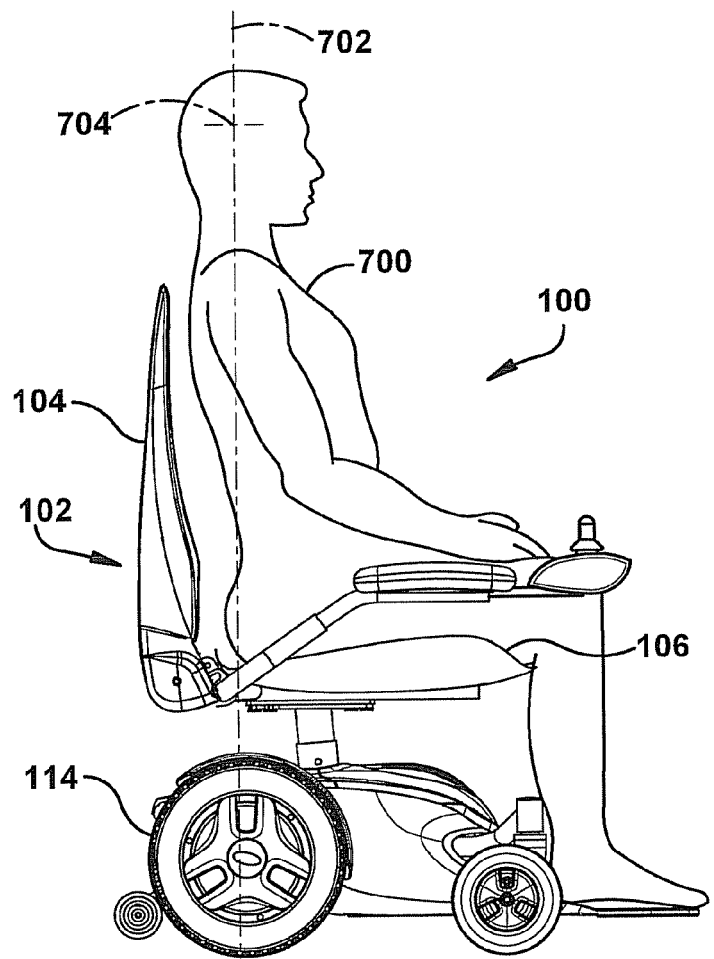
FIGS. 7 and 8 are side elevational and top plan views of one embodiment of a conveyance having an occupant seated therein.
Figure 8:
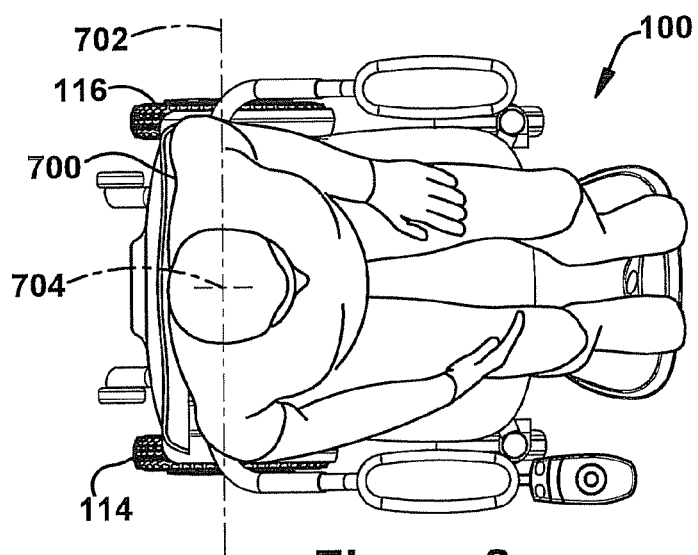

Referring now to FIGS. 7 and 8, side elevational and top plan views of wheelchair 100 are shown having an occupant 700 seated therein. The position of occupant 700 can be adjusted by, for example, lateral and/or angular movement of back portion 104 relative to seat portion 106, or lateral movement of the seat portion relative to chassis 112. In one embodiment, the position of occupant 700 is configured such that the occupant's center of perception 704 is substantially aligned with a vertical plane 702 extending between or through the axles of drive wheels 114 and 116. In other embodiments, the occupant's center of perception 704 can be placed proximate to vertical plane 702, either slightly forward or rearward thereof.

Figure 9:
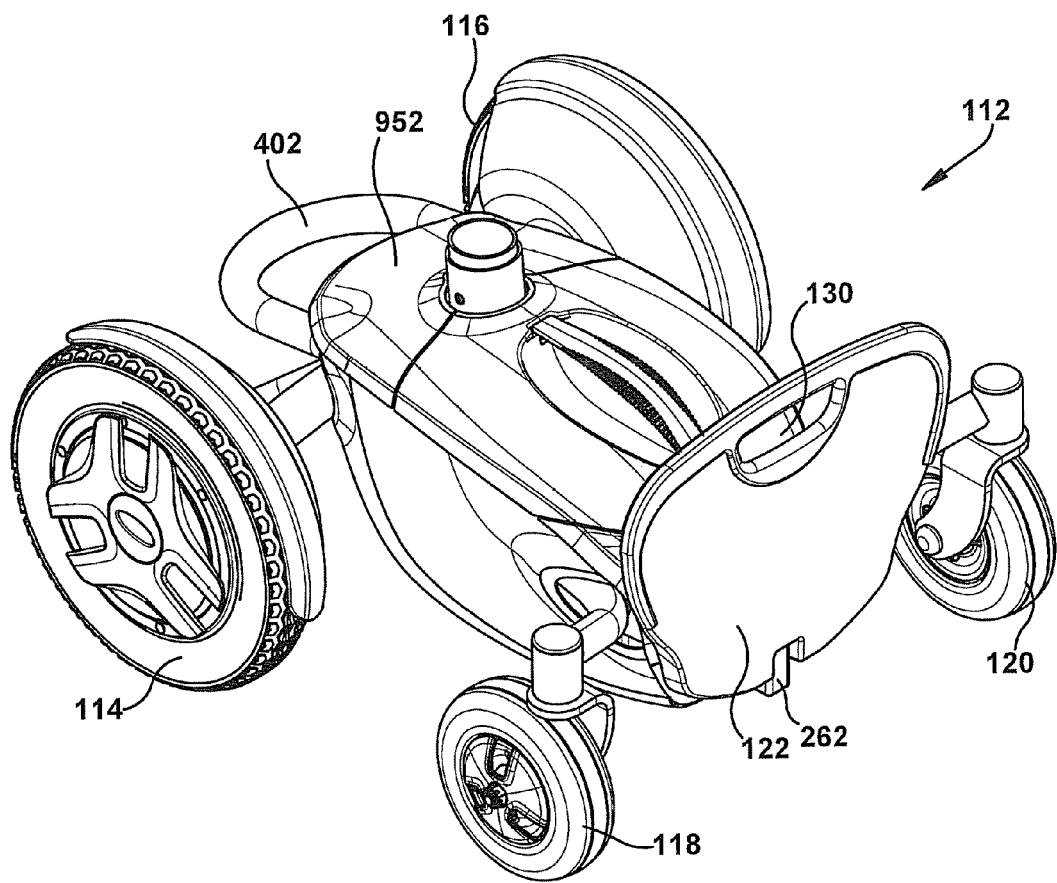
FIG. 9 is a perspective view of another embodiment of a chassis.

Referring now to FIG. 9, a perspective view of chassis 112 is shown having foot plate 122 rotated upward. Foot plate 122 may be attached to foot plate mounting member 262 by various suitable means that permit the foot plate to pivot relative to the foot plate mounting member, such as with a fastener or hinge. Further, foot plate 122 may include various means to fix the foot plate in an upright or other position, such as with a friction pivot, latch, or pin. Opening 130 of foot plate 122 provides a handle for a user to grasp and lift the front portion of chassis 112. With foot plate 122 in the upright position, opening 130 is conveniently located for the user to grasp and is at the substantially same height as rear handle 402. A user may lift chassis 112 by grasping opening 130 with one hand and rear handle 402 with the other hand, for example to lift the chassis for transport in an automobile. Further, the rear shroud of chassis 112 may be configured for the user to grasp rear handle 402. As shown, rear shroud 952 does not extend to the distal portion of rear handle 402 to provide room for a user to grasp the rear handle. However, many other configurations are possible, such as a rear shroud with an opening for the user's hand.

Referring now to FIGS. 10A-10C, a perspective view, exploded perspective view, and exploded side elevational view of a seat attachment assembly 1000 is shown. Seat attachment assembly 1000 includes an attachment plate 1004 (FIGS. 10B and 10C), a seat plate 1002, and seat support 264. Attachment plate 1004 is configured to be attached to an end of seat support 264. Attachment plate 1004 may be attached to seat support 264 by various means, such as with a weldment, adhesive, or fastener. In some embodiments, attachment plate 1004 may be integrally fabricated with seat support 264. Further, seat plate 1002 is configured to be attached to, or integrally fabricated with, seat assembly 102.

Attachment plate 1004 includes two sets of bosses 1008 and 1010 extending outward from attachment plate 1004, each set having bosses extending from opposite sides of the plate. As shown in FIG. 10B, each set of bosses 1008 and 1010 includes two ends of a pin extending between two flanges of attachment plate 1004. However, other configurations are possible, e.g., fasteners extending from each side of the plate, bosses integrally fabricated with the plate, etc.

Seat plate 1002 includes two sets of slots or openings 1006 and 1012 disposed on either side of the seat plate. Slots 1006 extend vertically upward from the bottom of two flanges of seat plate 1002. As shown, slots 1006 are configured to mate with bosses 1008 of attachment plate 1004. Slots 1012 extend upward at an angle from the bottom of the two flanges of seat plate 1002. As shown, slots 1012 are configured to mate with bosses 1010 of attachment plate 1004.

Seat plate 1002 is configured to be removably coupled to attachment plate 1004. The connection between seat plate 1002 and attachment plate 1004 permits repeated attachment and removal of seat assembly 102 with chassis 112. For example, a first end of seat plate 1002 having slots 1006 may be rotated upward to permit alignment of slots 1012 with bosses 1010 of attachment plate 1004. In this position, slots 1012 may be slid over bosses 1010. The first end of seat plate 1002 may then be rotated downward such that slots 1006 are slid over bosses 1008 of attachment plate 1004. In this configuration, seat plate 1002 is attached to attachment plate 1004.

Figure 11A:
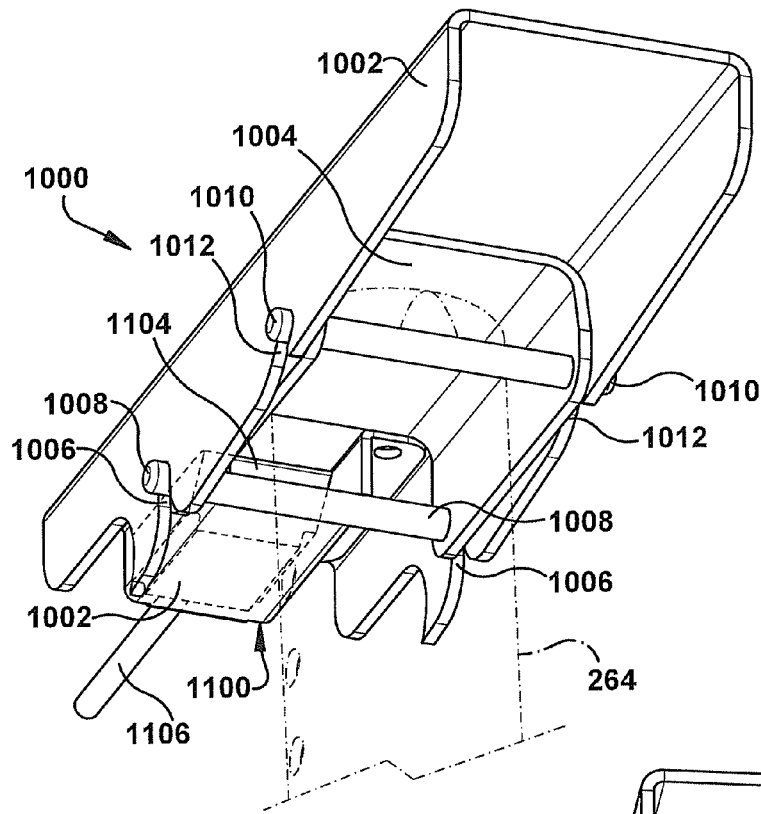
FIGS. 11A-11C are perspective and cross-sectional views of one embodiment of a seat latch assembly.
Figure 11B:
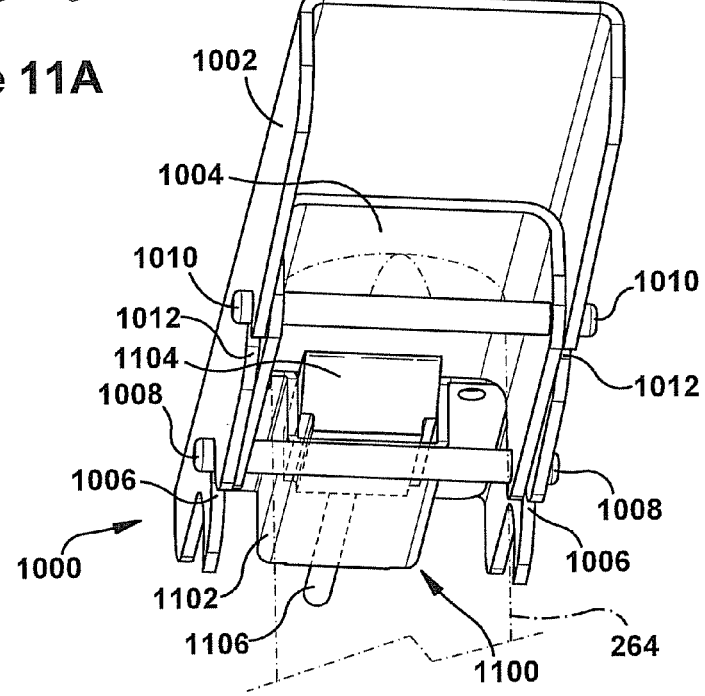
Figure 11C:
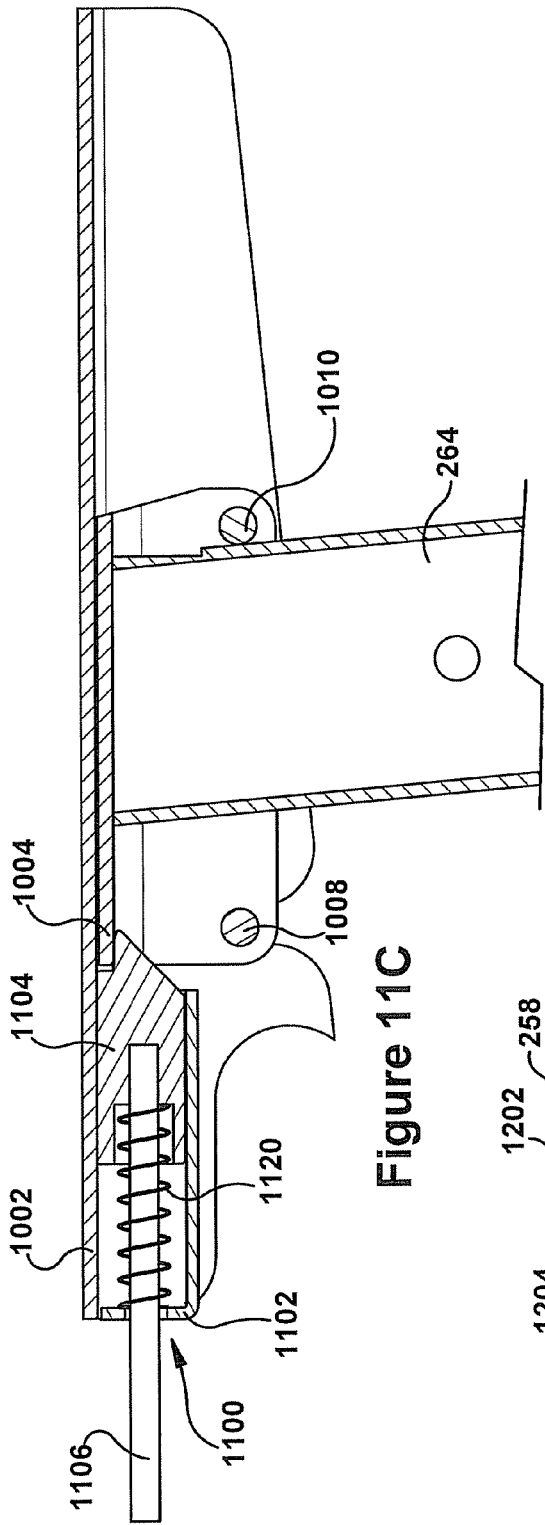

Seat attachment assembly 1000 may also include a seat latch assembly to prohibit movement of seat plate 1002 relative to attachment plate 1004. The latch assembly may be releasable to permit repeated attachment and removal of seat plate 1002 with attachment plate 1004, and thus repeated attachment and removal of seat assembly 102 with chassis 112. Many configurations of the seat latch assembly are possible. For example, a seat latch assembly 1100 for seat attachment assembly 1000 is shown in FIGS. 11A-11C. Seat latch assembly 1100 includes a housing 1102, latch member 1104, shaft 1106, and biasing mechanism 1120.

FIGS. 11A and 11B are bottom perspective views of seat attachment assembly 1000 (seat support 264 is removed) having seat latch assembly 1100 attached to the bottom of seat plate 1002. In FIG. 11A, latch member 1104 of seat latch assembly 1100 is in a retracted or unlocked position and does not engage attachment plate 1004. In FIG. 11B, latch member 1104 is in an extended or locked position and does engage attachment plate 1004 to prohibit movement of seat plate 1002 relative to the attachment plate.

FIG. 11C is a side elevational cross-sectional view of latch assembly 1100 with latch member 1104 in the extended or locked position. As shown, biasing mechanism 1120 biases latch member 1104 into the extended position such that the notched tip of the latch member engages the edge of attachment plate 1004. In this position, seat plate 1002 is prohibited from rotating upward relative to attachment plate 1004. Seat plate 1002 may be released and permitted to rotate upward relative to attachment plate 1004 by forcing latch member 1104 away from the attachment plate and into the retracted or unlocked position. This may be accomplished by pulling back on shaft 1106 and compressing biasing mechanism 1120. As shown, biasing mechanism 1120 is a spring. However, other biasing mechanisms may be used with latch assembly 1100, such as an elastomeric material or compressible fluid. In some embodiments, no biasing mechanism is used, e.g., the latch member may be fixed in the extended and/or retracted position with the use of pin or other fastener.

Other configurations of seat latch assemblies are possible. For example, a removable pin or plate structure may be used to hold bosses 1008 of attachment plate 1004 within slots 1006 of seat plate 1002 to prohibit upward rotation of the seat plate relative to the attachment plate. Further, seat plate 1002 may be coupled to attachment plate 1004, e.g., with a removable clip or other fastener, to prohibit movement of the seat plate relative to the attachment plate.

Figure 13A:
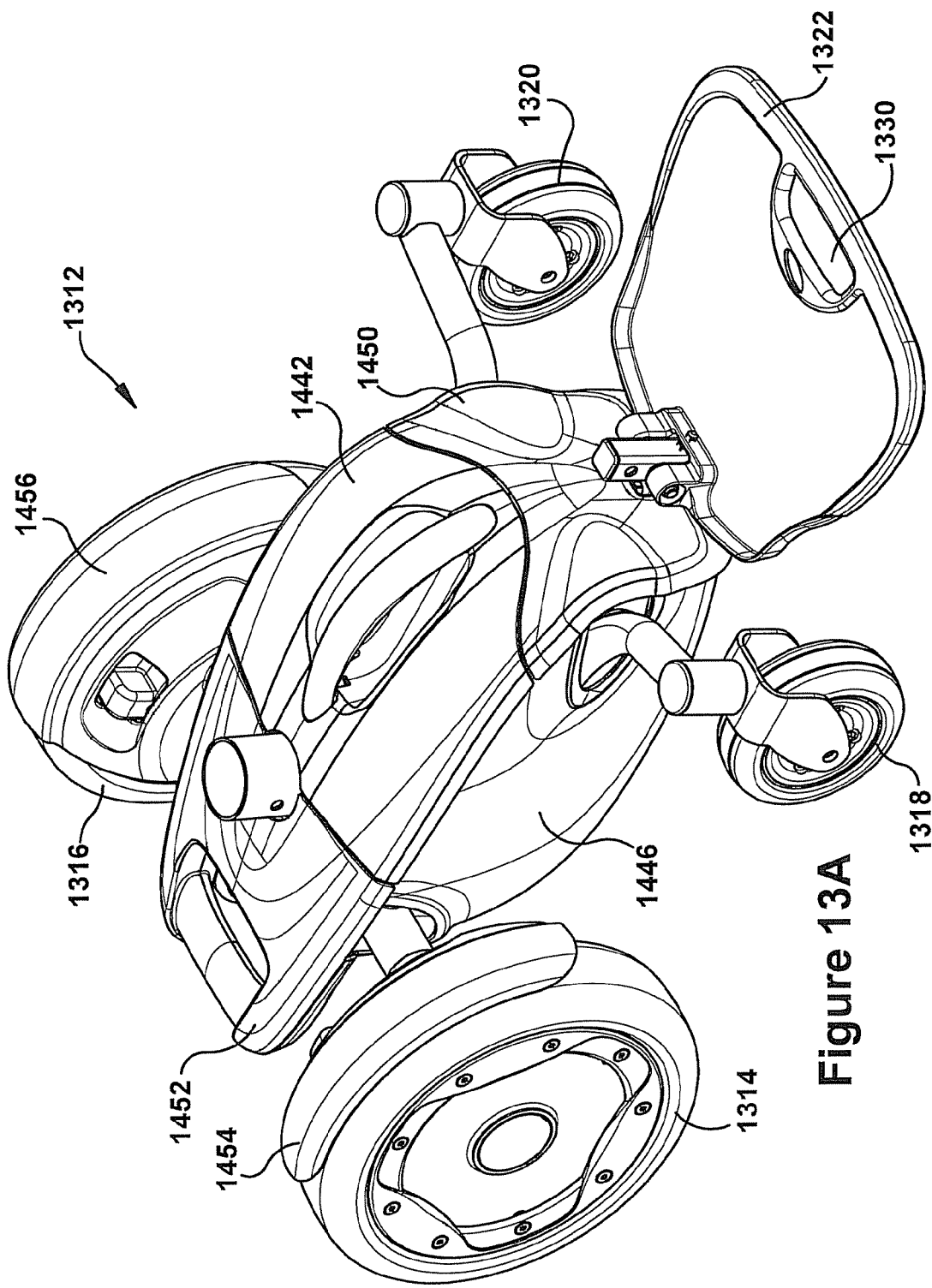
FIG. 13A is a perspective view of another embodiment of a chassis.
Figure 13B:
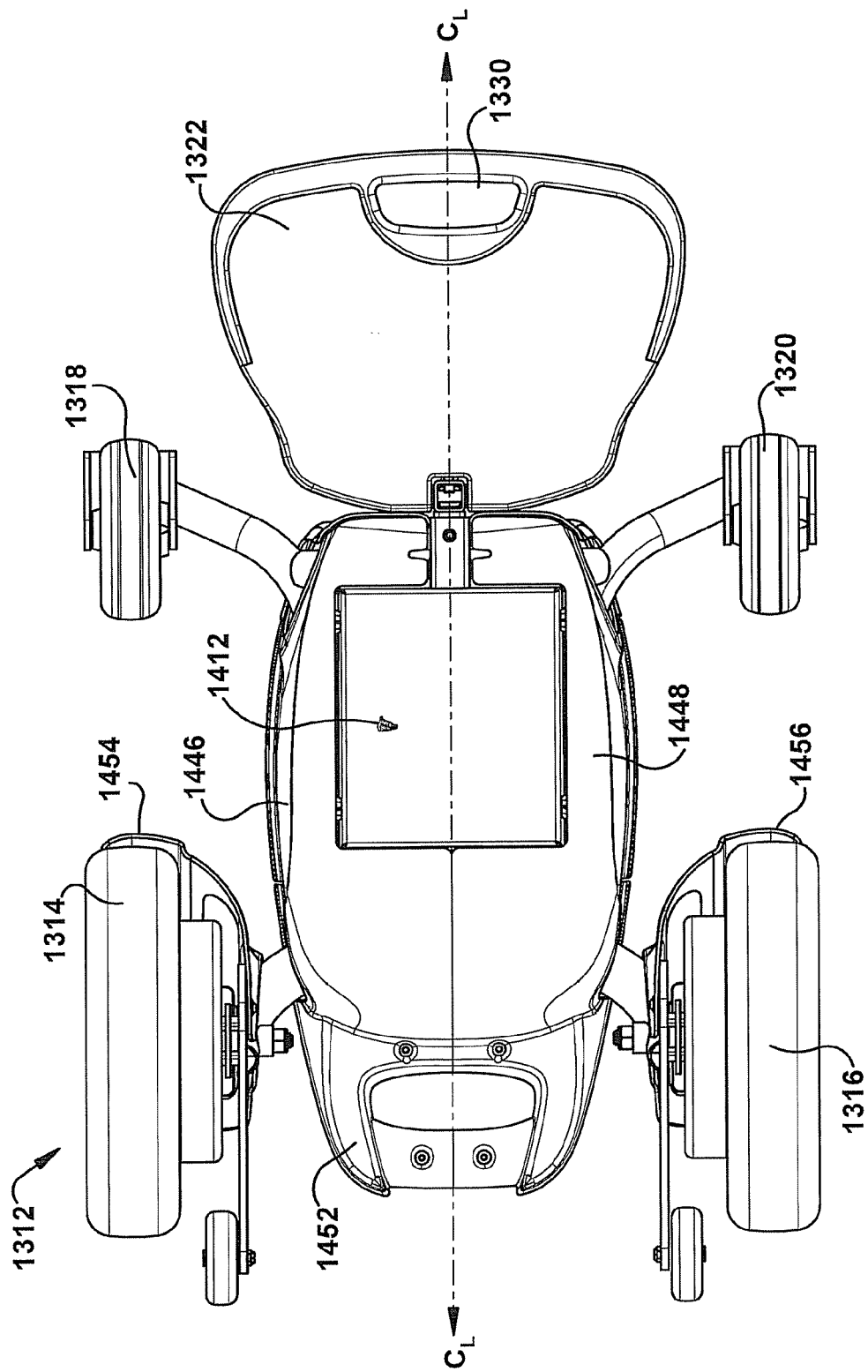
FIG. 13B is a bottom plan view of one embodiment of the chassis of FIG. 13A.

Illustrated in FIGS. 13A and 13B are perspective and bottom plan views of an exemplary chassis 1312 of a wheelchair. Chassis 1312 includes drive wheels 1314 and 1316 connected thereto for propulsion of the wheelchair. Drive wheels 1314 and 1316 may be driven by a plurality of types of drive assemblies including, for example, electric motor and gear combinations or gearless brushless motors such as wheel hub motors. Casters 1318 and 1320 are also connected to chassis 1312 for providing forward support of the wheelchair. A foot plate 1322 having an opening 1330 is connected to the front portion of chassis 1312 to support the feet of a user. Foot plate 1322 is pivotally attached to a foot plate mounting member 1462 (FIGS. 14 and 15) by use of a fastener through appropriately aligned apertures in the foot plate and the foot plate mounting member.

Figure 14:
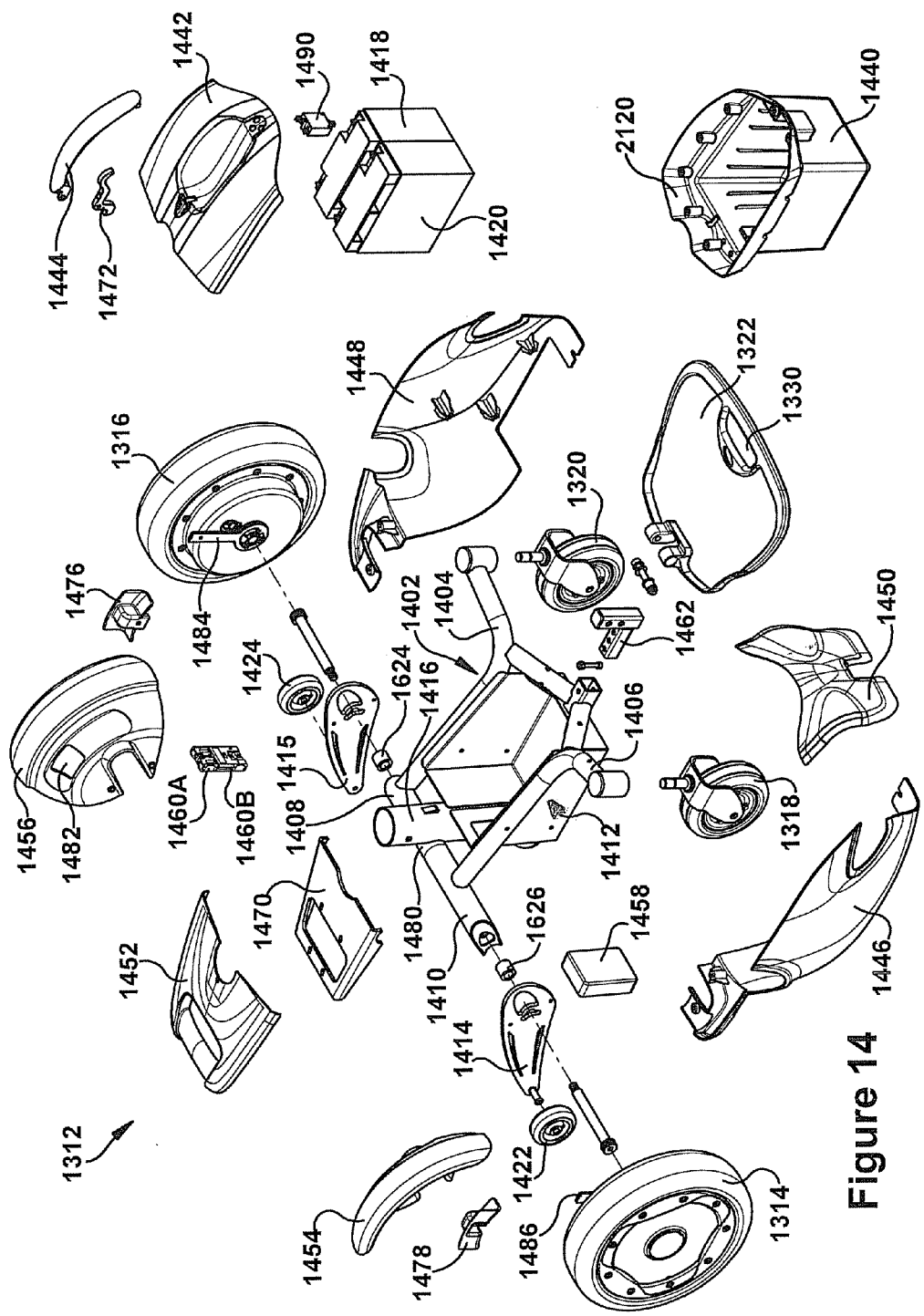
FIG. 14 is an exploded perspective view of one embodiment of the chassis of FIG. 13A.

Illustrated in FIG. 14 is an exploded perspective view of chassis 1312. Chassis 1312 includes several components for supporting and driving the wheelchair and its occupant. Chassis 1312 includes a frame 1402 disposed substantially about a centerline $C_L$ of the wheelchair (FIGS. 13B and 16B; centerline $C_L$ represents the centerline of both chassis 1312 and the wheelchair). As shown, frame 1402 includes central member 1480, two caster support members 1404 and 1406, two axle support members 1408 and 1410, one or more anti-tip support members 1414 and 1415, a seat support member 1416, and a rear handle support member 1470. In other embodiments, one or more of these members may be omitted.

Caster support members 1404 and 1406 emanate forward from axle support members 1408 and 1410, respectively, and provide for mounting of casters 1318 and 1320. As shown, casters 1318 and 1320 each comprise a double fork to support the caster wheel on both sides. Axle support members 1408 and 1410 emanate outwardly and in a slightly rearward direction from central member 1480 and provide for mounting of drive wheels 1314 and 1316. In this particular embodiment, drive wheels 1314 and 1316 are of a wheel hub motor design having the drive motors incorporated into the hub of the wheels. However, as described above, other types of drive assemblies may be used.

One or more anti-tip support members 1414 and 1415 emanate rearward from axle support members 1410 and 1408, respectively, and provide for mounting of one or more anti-tip wheels or casters 1422 and 1424. Seat support member 1416 is disposed proximate central member 1480 and provides for mounting of a seat assembly to chassis 1312. Seat support member 1416 is configured to receive a seat support therein for adjusting and fixing the floor-to-seat height of the wheelchair.

Rear handle support member 1470 emanates rearward from central member 1480 and axle support members 1408 and 1410. As shown, rear handle support member 1470 is a plate configured to support a rear shroud 1452 having a handle. Rear handle support member 1470 comprises an opening to permit the user to grasp the handle of rear shroud 1452. As shown, rear handle support member 1470 and rear shroud 1452 combine to form a rear handle of the wheelchair. However, in other embodiments, only one member may be used to form a rear handle of the wheelchair.

Chassis 1312 includes a battery support tray 1412 disposed between caster support members 1404 and 1406 of frame 1402. In this particular embodiment, battery support tray 1412 is configured to receive a removable battery housing 1440 designed to hold one or more batteries 1418 and 1420, which are the energy source of the wheelchair. A junction block 1458 may be coupled to frame 1402 to permit electrical connection of various components of the wheelchair. Further, removable housing 1440 may include a resettable fuse or breaker 1490 for one or more batteries 1418 and 1420.

Figure 20A:
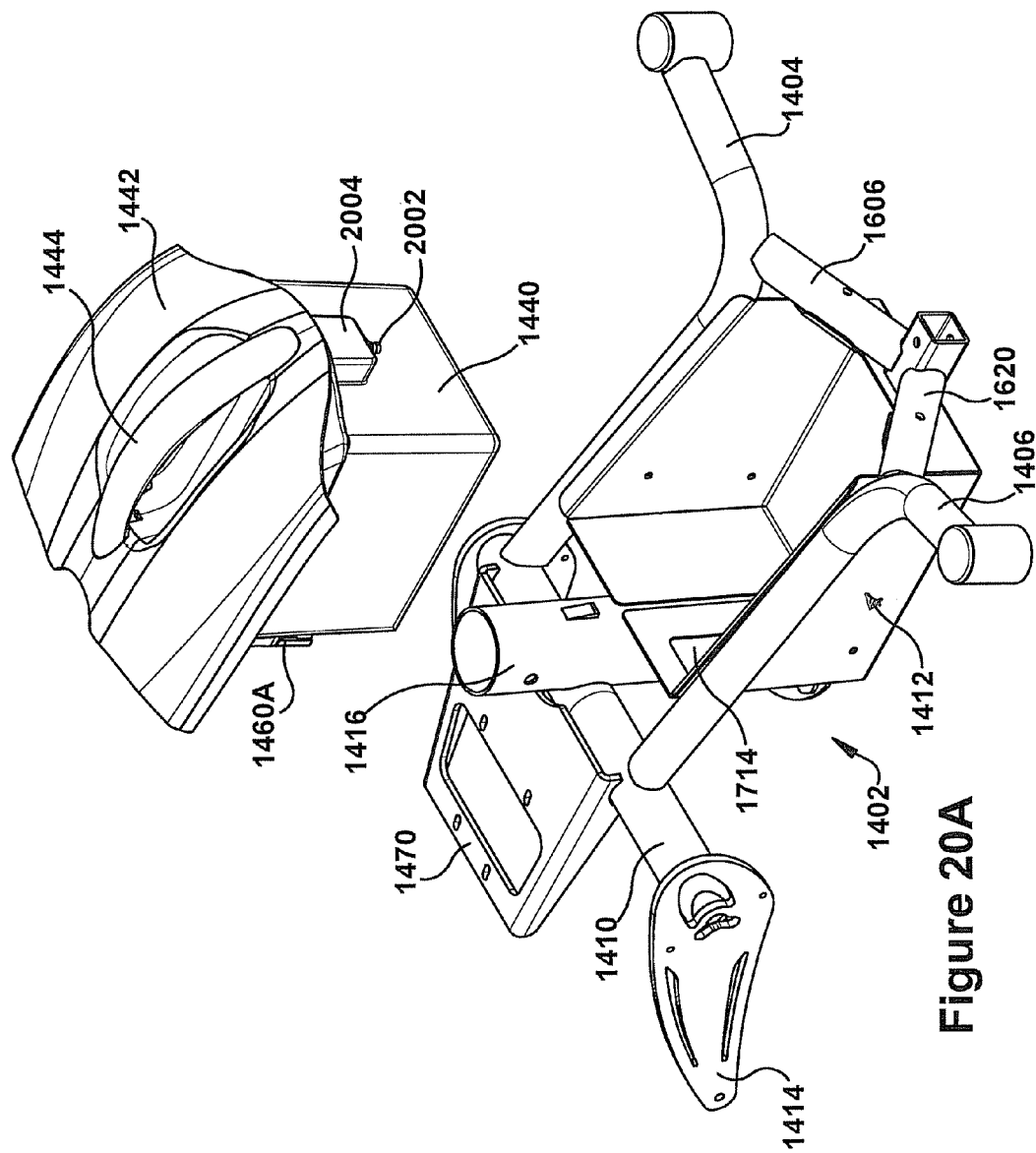
FIGS. 20A-20C are perspective and rear views of one embodiment of a battery housing and frame.
Figure 20B:
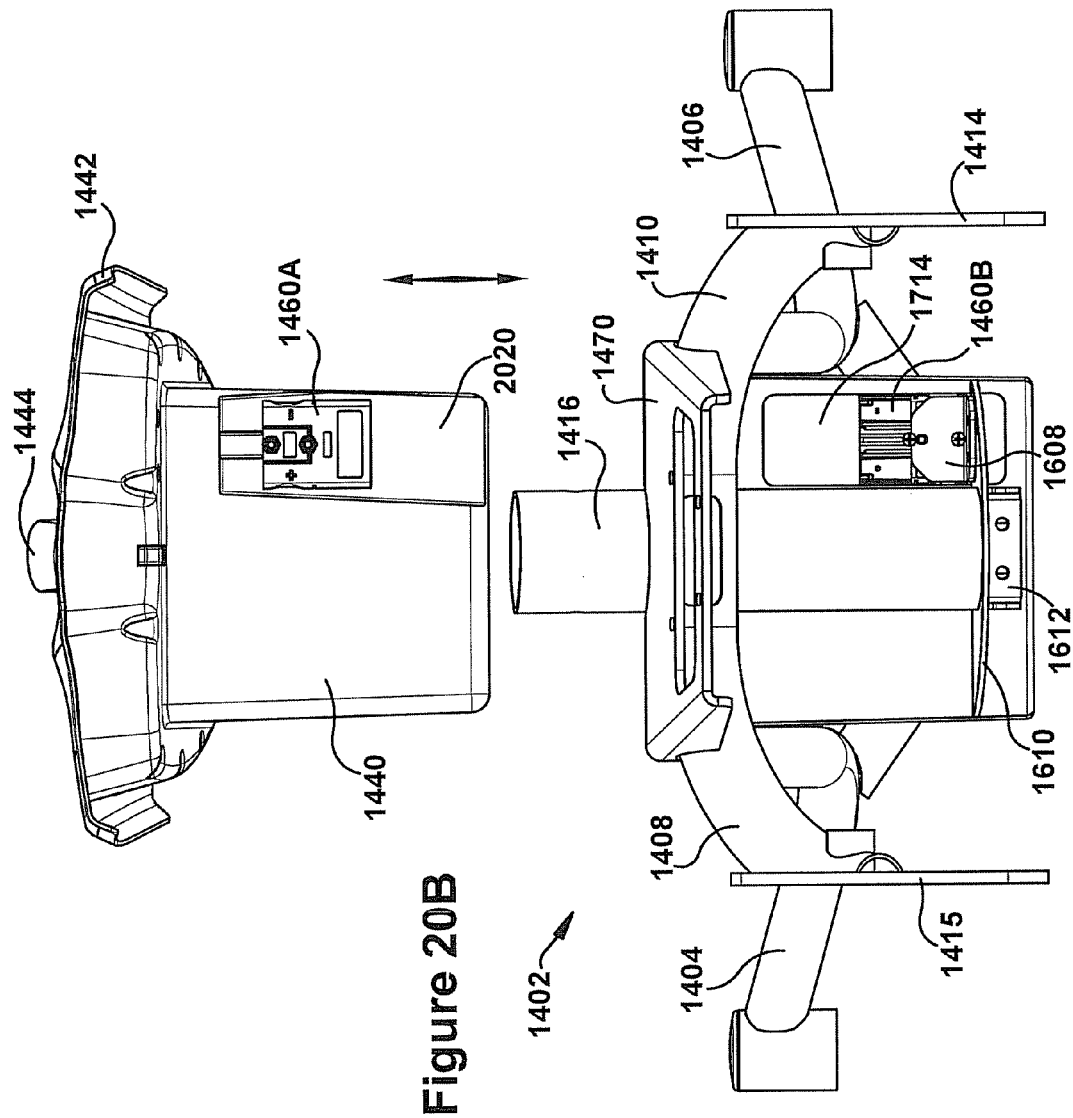
Figure 20C:
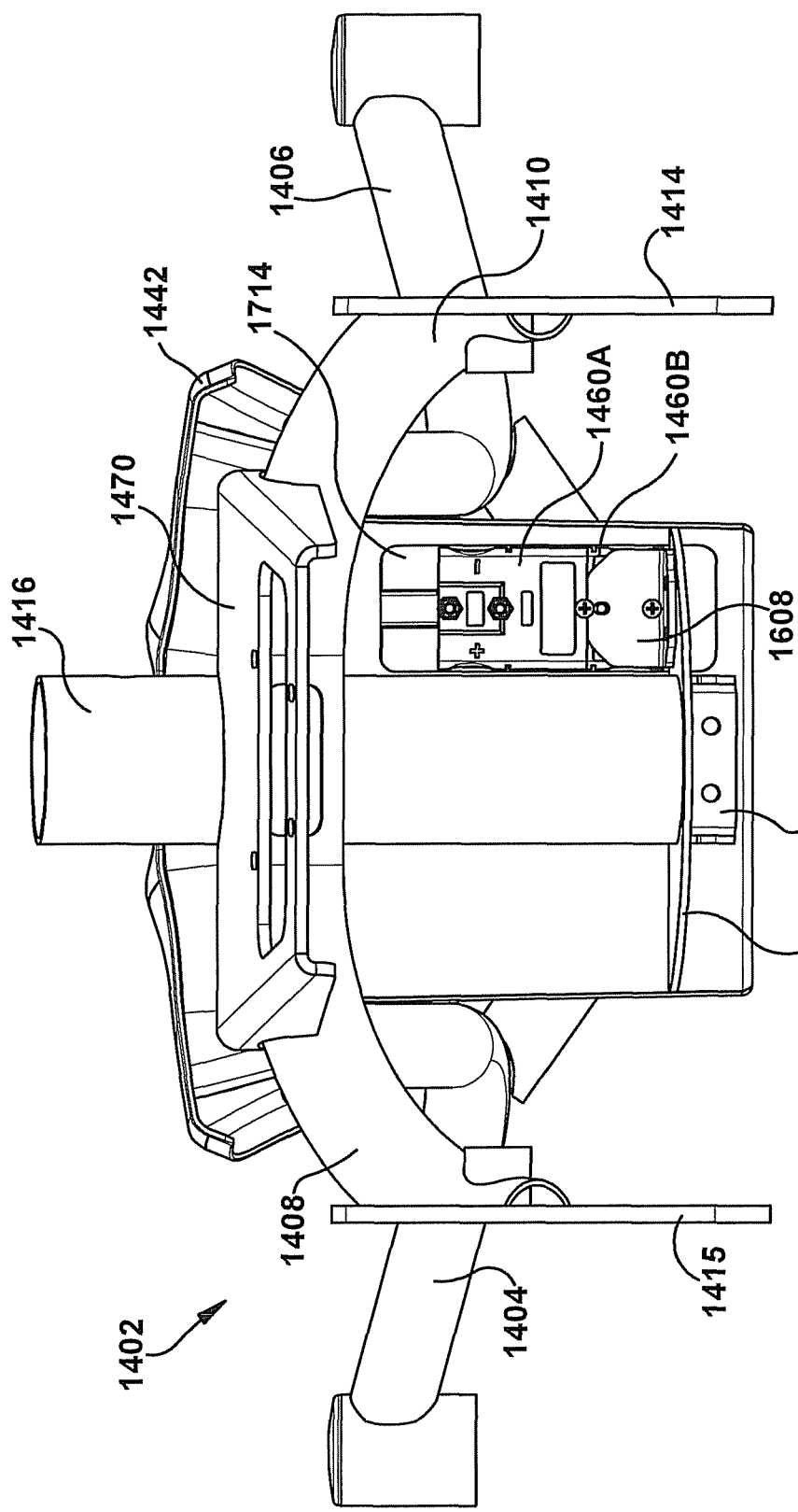

Electrical connectors 1460A and 1460B for connecting one or more batteries 1418 and 1420 to the electrical system of the wheelchair may be coupled to chassis 1312, such as to frame 1402, battery support tray 1412, or removable housing 1440. For example, as shown in FIGS. 20B and 20C, electrical connector 1460A is attached to removable housing 1440 and mating electrical connector 1460B is attached to a connector mounting bracket 1608 of frame 1402. Electrical connectors 1460A and 1460B may be positioned such that they are substantially aligned for connection or disconnection when removable housing 1440 is inserted into and removed from battery support tray 1412. FIGS. 20A and 20B illustrate the insertion and removal of removable housing 1440 relative to battery support tray 1412. As shown in FIG. 20B, removable housing 1440 includes a recessed area 2020 that provides clearance for the connection or disconnection of electrical connectors 1460A and 1460B. Further, a connector opening 1714 of battery support tray 1412 provides clearance for at least electrical connector 1460B attached to connector mounting bracket 1608. FIG. 20C illustrates removable housing 1440 inserted into battery support tray 1412 and electrical connectors 1460A and 1460B connected together such that batteries 1418 and 1420 are connected to the electrical system of the wheelchair.

Chassis 1312 also includes shrouding coupled to frame 1402. As shown in FIGS. 13A and 13B, the shrouding of chassis 1312 at least partially encompasses frame 1402. Referring to FIG. 14, chassis 1312 includes a front shroud 1450, rear shroud 1452, two side shrouds 1446 and 1448, and two drive wheel fenders 1454 and 1456 coupled to frame 1402. Also, a top shroud or cover 1442 is removably attached to battery housing 1440. However, other embodiments of shrouds may be employed or even no shroud. The shrouding of chassis 1312 may also include more or less shroud components. For example, in one embodiment, each side shroud 1446 and 1448 comprises more than one shroud component, a first component including the side and rear vertical portions of the side shroud and a second component including the rear horizontal portion of the side shroud positioned below rear handle support member 1470.

As illustrated in FIG. 13B, the bottom of battery support tray 1412 extends below the bottom of side shrouds 1446 and 1448. As such, battery support tray 1412 acts a skid plate to protect side shrouds 1446 and 1448 from damage due to various objects (e.g., curbs, ramps, bumps, rocks, etc.) that may contact the bottom of the chassis 1312 during transport.

As shown in FIGS. 13A and 14, each drive wheel fender 1454 and 1456 comprises an opening (see opening 1482 for drive wheel fender 1456 in FIG. 14) that provides access to a brake release lever 1486 and 1484 of drive wheel 1314 and 1316, respectively. Attached to an end of each brake release lever 1486 and 1484 is a handle 1478 and 1476 that is partially exposed through the opening in drive wheel fender 1454 and 1456. The user may move handle 1478 and 1476 of brake release lever 1486 and 1484 forward and backward to selectively engage and disengage the brakes of drive wheels 1314 and 1316. Drive wheels 1314 and 1316 and/or brake release levers 1486 and 1484 may be configured or arranged such that the user can move the handles in the same direction (e.g., both forward or both backward) to selectively engage and disengage the brakes of the drive wheels. In other embodiments, the brake release levers, handles, and/or openings in the drive wheel fenders may be a variety of different shapes and sizes.

Top cover 1442 includes a handle 1444 and is configured to be attached to battery housing 1440 such that the top cover and the housing can be removed from the wheelchair as a single unit, e.g., to service and/or charge one or more batteries 1418 and 1420. A locking assembly 1472 is attached to handle 1444 to selectively lock and unlock top cover 1442 and removable housing 1440 in place relative to frame 1402. As shown, locking assembly 1472 is spring biased toward a locked position such that when manipulated, the locking assembly will unlock top cover 1442 from seat support member 1416 of frame 1402 (See FIGS. 21A-21C). In another embodiment, the top cover may be removed, leaving the battery compartment in place.

Figure 15A:
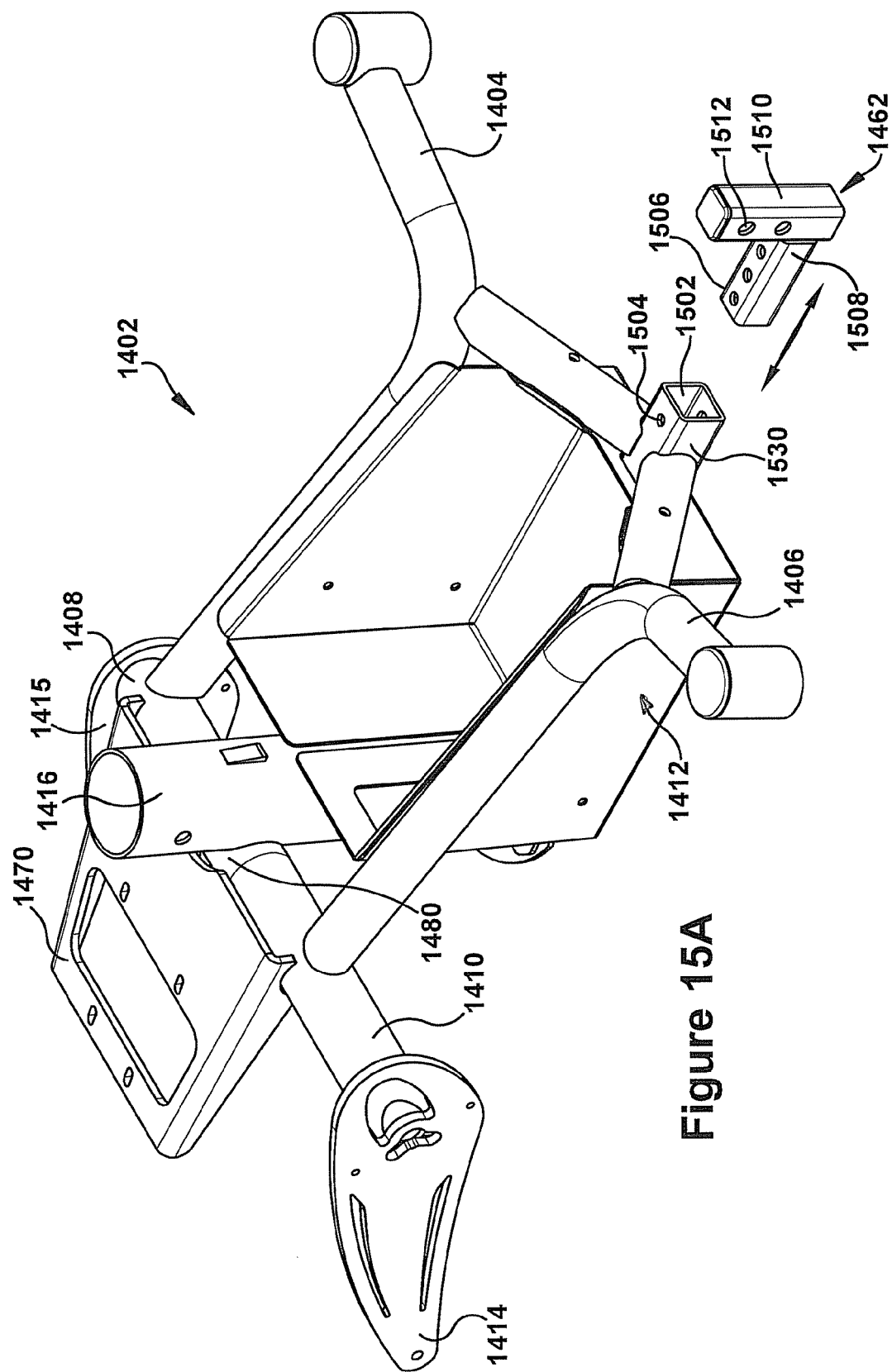
FIG. 15A is a perspective view of one embodiment of the frame of FIG. 14.

FIGS. 15A-15C illustrate the connection between foot plate mounting member 1462 of foot plate 1322 and frame 1402. As shown, foot plate mounting member 1462 comprises a horizontal portion 1508 and a vertical portion 1510. A foot plate support member 1530 of frame 1402 includes a receiving portion 1502 having one or more apertures 1504 therein. Receiving portion 1502 telescopically receives horizontal portion 1508 of foot plate mounting member 1462 therein for adjusting and fixing the horizontal position of foot plate 1322 relative to frame 1402 of the wheelchair. Foot plate 1322 is adjusted and fixed through the use of one or more apertures 1506 in foot plate mounting member 1462, which are aligned with one or more apertures 1504 in receiving portion 1502. A suitable fastener is then used through the appropriately aligned apertures to fix or maintain foot plate mounting member 1462 in position relative to receiving portion 1502. The fastener may be of an easily removable type not requiring the use of tools.

As illustrated in FIG. 15B, the vertical position of foot plate 1322 relative to foot plate mounting member 1462 may be adjusted and fixed through the use of one or more apertures in the foot plate, which are aligned with one or more apertures 1512 in vertical portion 1510 of the foot plate mounting member. A suitable fastener is then used through the appropriately aligned apertures to fix or maintain foot plate 1322 in position relative to foot plate mounting member 1462. The fastener may be of an easily removable type not requiring the use of tools.

Further, the connection between foot plate 1322 and foot plate mounting member 1462 permits the foot plate to rotate or pivot relative to the foot plate mounting member, e.g., from a lowered position (shown in FIGS. 15B-15C) to an upright or other position. Opening 1330 of foot plate 1322 provides a handle for a user to grasp and lift the front portion of chassis 1312. With foot plate 1322 in the upright position, opening 1330 is conveniently located for the user to grasp, for example to lift chassis 1312 for transport in an automobile. Foot plate 1322 and/or foot plate mounting member 1462 may include various means to fix the foot plate in the lowered, upright or other position, such as with a friction pivot, latch, or pin.

FIG. 15C is a cross-sectional view taken along line 15C-15C in FIG. 15B. As shown, foot plate 1322 includes a stop 1514 that engages vertical portion 1510 of foot plate mounting member 1462 in the lowered position. Stop 1514 may be adjustable such that the position of foot plate 1322 relative to foot plate mounting member 1462 can be altered based on the preferences of the user. For example, stop 1514 may be extended or retracted relative to foot plate 1322 such that the footplate is positioned slightly upward or downward, respectively, when the footplate is in the lowered position. Stop 1514 may be a variety of shapes and sizes. Further, various methods may be employed to adjust stop 1514 relative to foot plate 1322. For example, stop 1514 may be adjusted relative to foot plate 1322 through the use of a threaded fastener or a pin aligned with one or more apertures in the foot plate.

Further, as illustrated in FIGS. 14 and 15A, the chassis 1312 is configured such that battery support tray 1412 is disposed forward of seat support member 1416. As shown, battery support tray 1412 is disposed between caster support members 1404 and 1406 and forward of seat support member 1416 such that one or more batteries 1418 and 1420 may be removed or installed towards the front of the wheelchair.

FIGS. 16A-16E illustrate various views of frame 1402. As shown, frame 1402 includes central member 1480, caster support members 1404 and 1406, axle support members 1408 and 1410, anti-tip support members 1414 and 1415, seat support member 1416, and rear handle support member 1470. One or more of these members can be omitted in other embodiments.

Figure 16A:
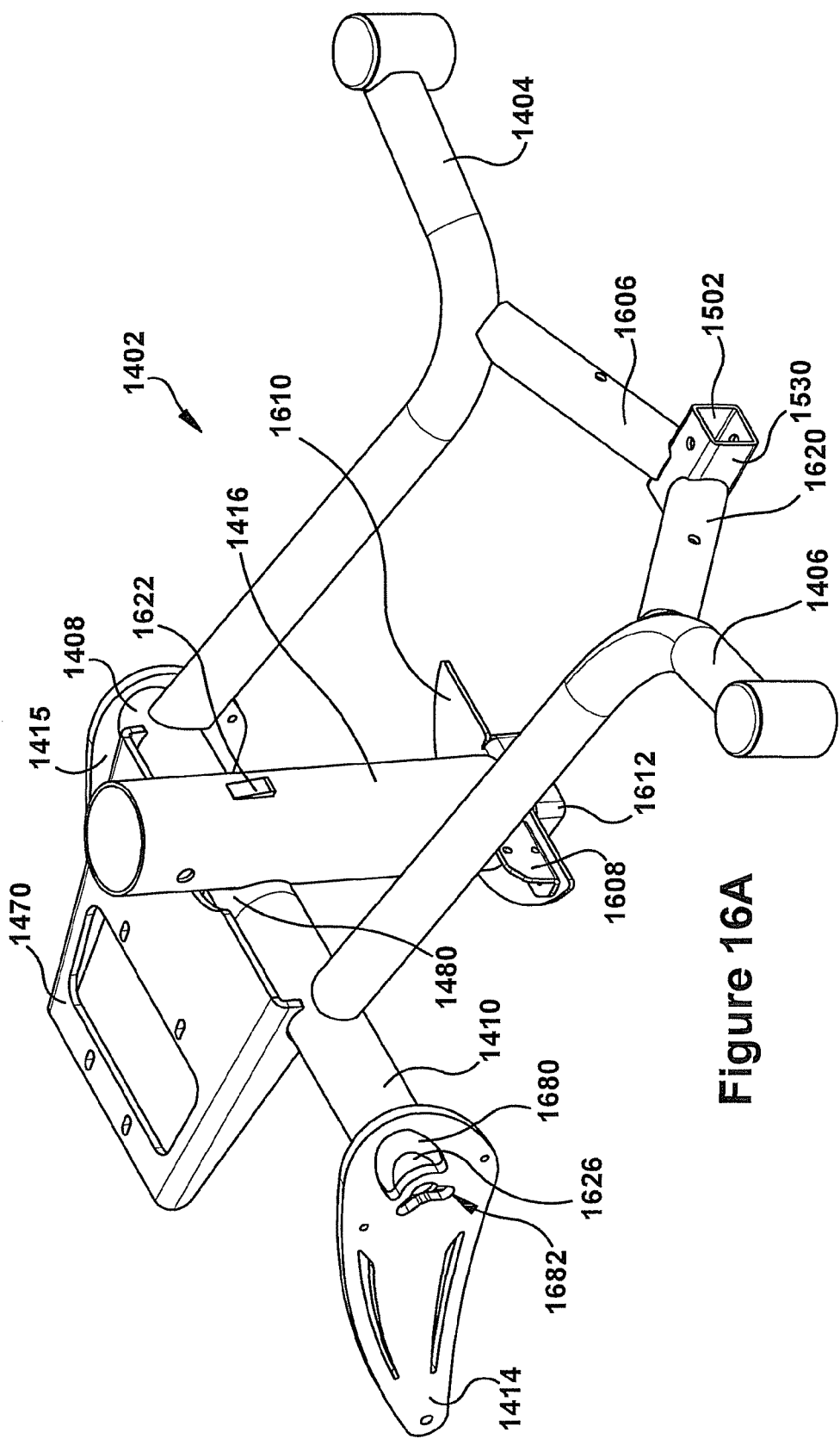
FIGS. 16A-16E are perspective, top plan, side elevational, front elevational, and rear elevational views, respectively, of one embodiment of the frame of FIG. 14.
Figure 16B:
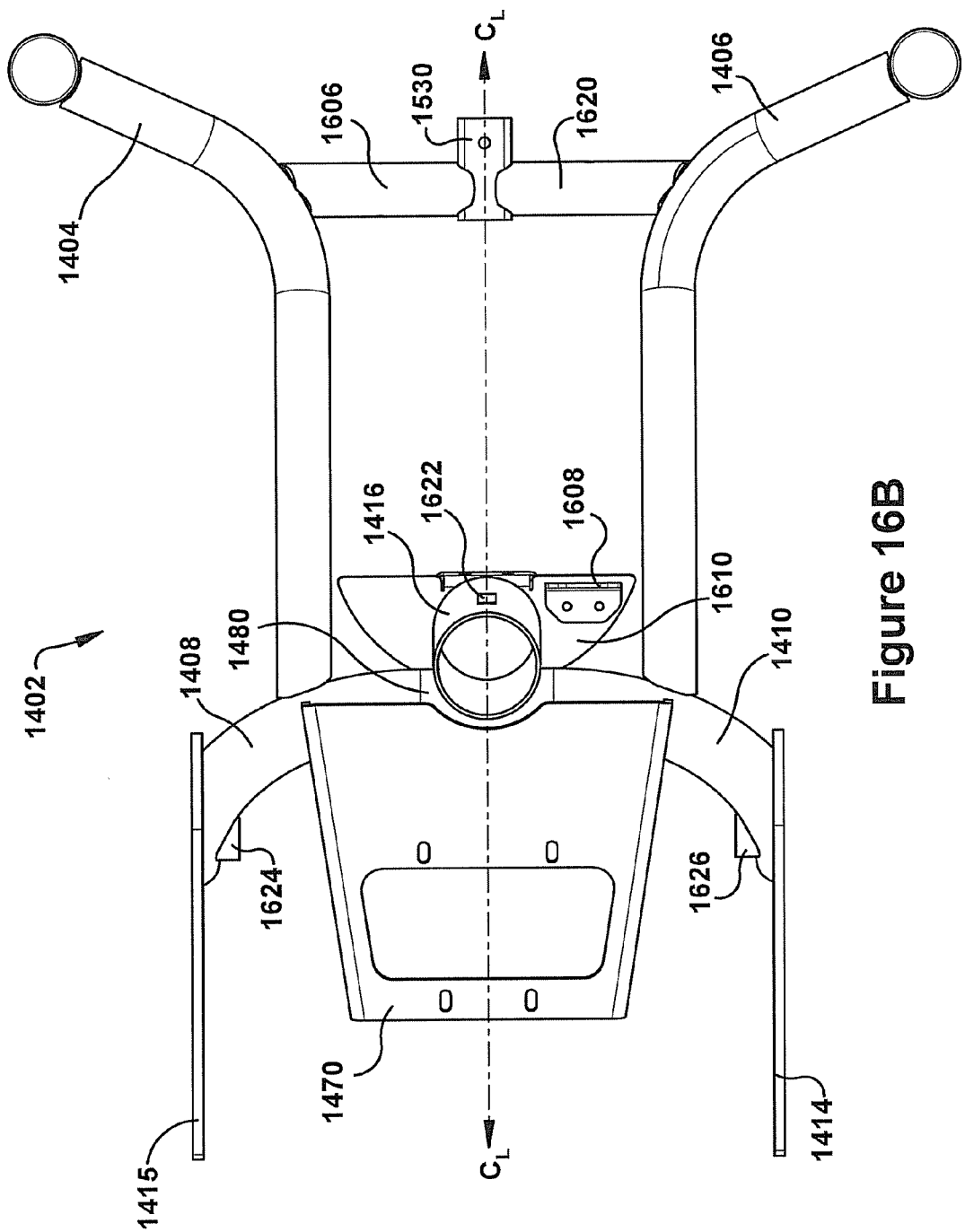
Figure 16C:
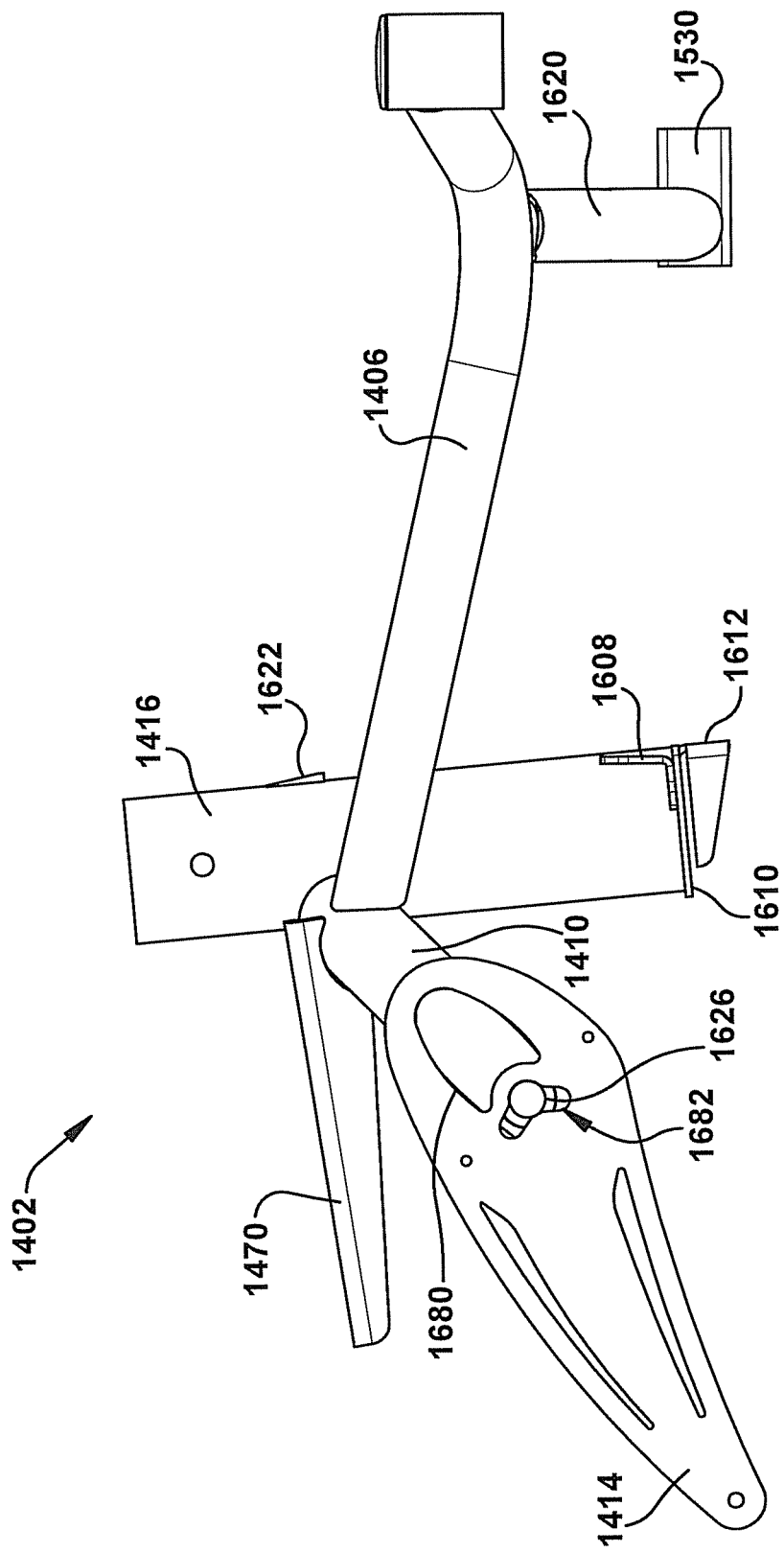
Figure 16D:
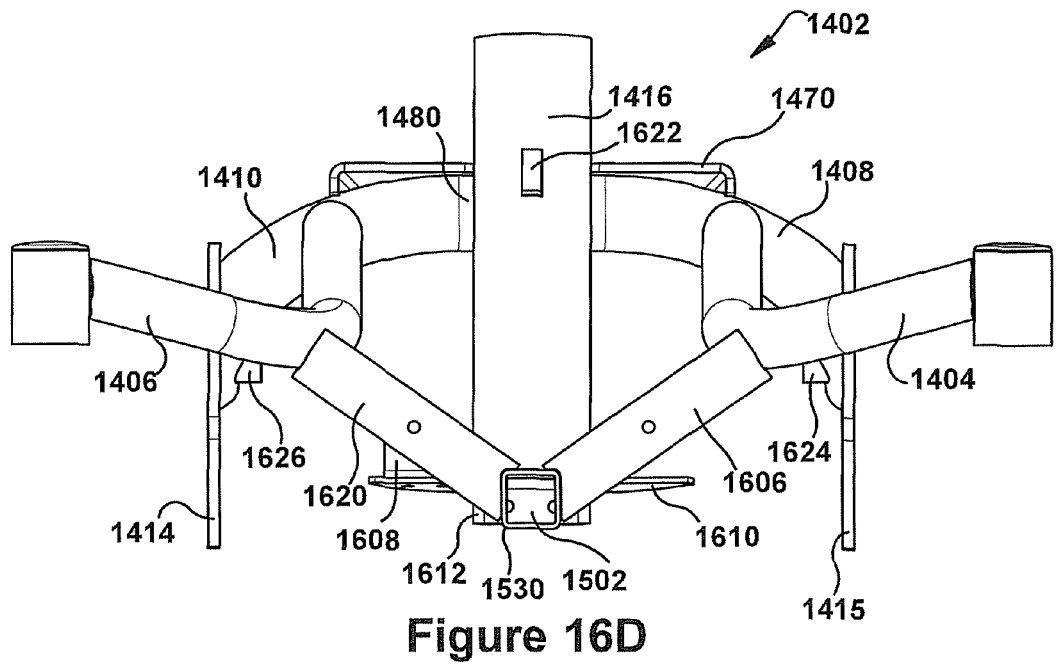
Figure 16E:
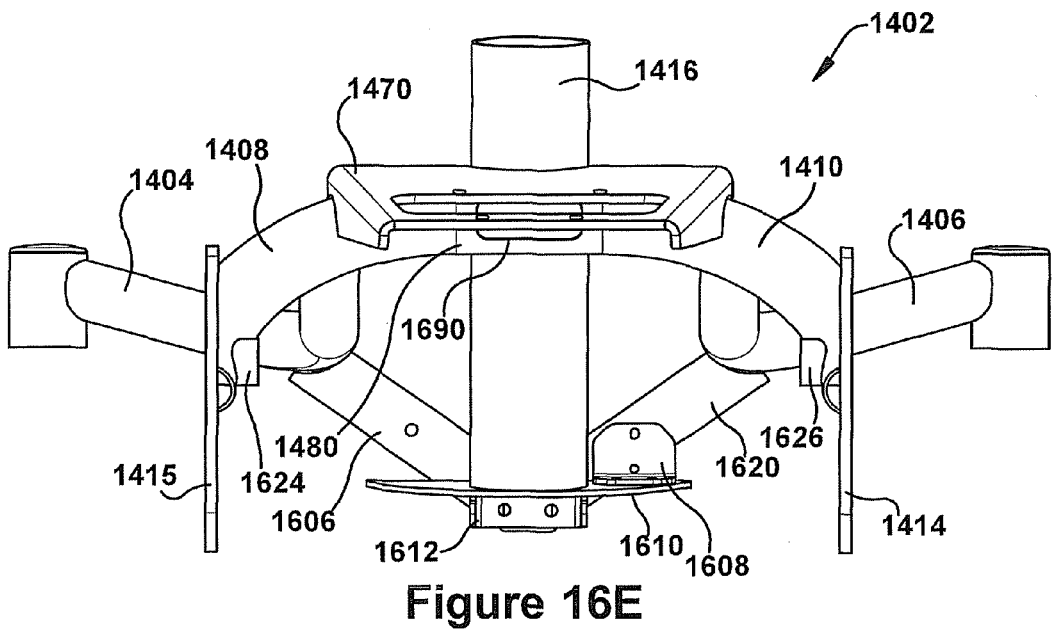

FIG. 16B illustrates a top plan view of frame 1402. As shown in FIG. 16B, frame 1402 is disposed substantially about centerline $C_L$, which represents the centerline of chassis 1312 and the wheelchair (FIG. 13B). In particular, central member 1480, caster support members 1404 and 1406, axle support members 1408 and 1410, anti-tip support members 1414 and 1415, and rear handle support member 1470 are all symmetrically disposed about centerline $C_L$. As such, in this embodiment, each of these members possess a geometry on one side of the centerline $C_L$ that is a mirror image of the geometry on the other side of the centerline $C_L$.

FIGS. 16A-16E illustrate the geometry of axle support members 1408 and 1410 in this embodiment. Axle support members 1408 and 1410 emanate from central member 1480 and extend downwardly and away therefrom. In this particular embodiment, axle support members 1408 and 1410 extend in a rearward direction of the chassis. These members also collectively form a "U" or "V" shape extending away from central member 1480. Central member 1480 and axle support members 1408 and 1410 collectively form a drive wheel support member of frame 1402.

A distal portion of each axle support member 1408 and 1410 may be configured such that anti-tip support members 1414 and 1415 can be coupled to the distal portion of the axle support members. As shown, the distal portion of axle support members 1408 and 1410 are cut to form a face substantially parallel to centerline $C_L$ of frame 1402 for attachment of anti-tip support members 1414 and 1415. Anti-tip support members 1414 and 1415 extend rearward from axle support members 1408 and 1410 and are substantially parallel to centerline $C_L$ of frame 1402. Anti-tip support members 1414 and 1415 may be coupled to axle support members 1408 and 1410 by various means, such as, for example, with weldments, fasteners, and/or adhesives.

The distal portion of each axle support member 1408 and 1410 may also include attachment members for mounting drive wheels 1314 and 1316 (see FIGS. 13A-14) to the axle support members. Referring to FIGS. 14-16E, drive wheel attachment members 1624 and 1626 are cylindrical in shape and coupled to the distal portion of axle support members 1408 and 1410, substantially perpendicular to centerline $C_L$ of frame 1402 and positioned between the axle support members and anti-tip support members 1414 and 1415. Each drive wheel attachment member 1624 and 1626 includes an opening for mounting drive wheels 1314 and 1316. Drive wheel attachment members 1624 and 1626 and the openings therein may be various shapes and sizes depending at least on the size and type of drive assembly. Drive wheel attachment members 1624 and 1626 may be coupled to axle support members 1408 and 1410 by various means, such as, for example, with weldments, fasteners, and/or adhesives.

Furthermore, an opening in the distal portion of each axle support member 1408 and 1410 may align with an opening 1680 in anti-tip support members 1414 and 1415 to provide access for leads or wires connecting drive wheels 1314 and 1316 to junction block 1458. For example, the leads or wires from drive wheels 1314 and 1316 may be routed through opening 1680, axle support members 1408 and 1410, and central member 1480 and then out an opening 1690 (FIG. 16E) in the central member to junction block 1458.

Figure 22:
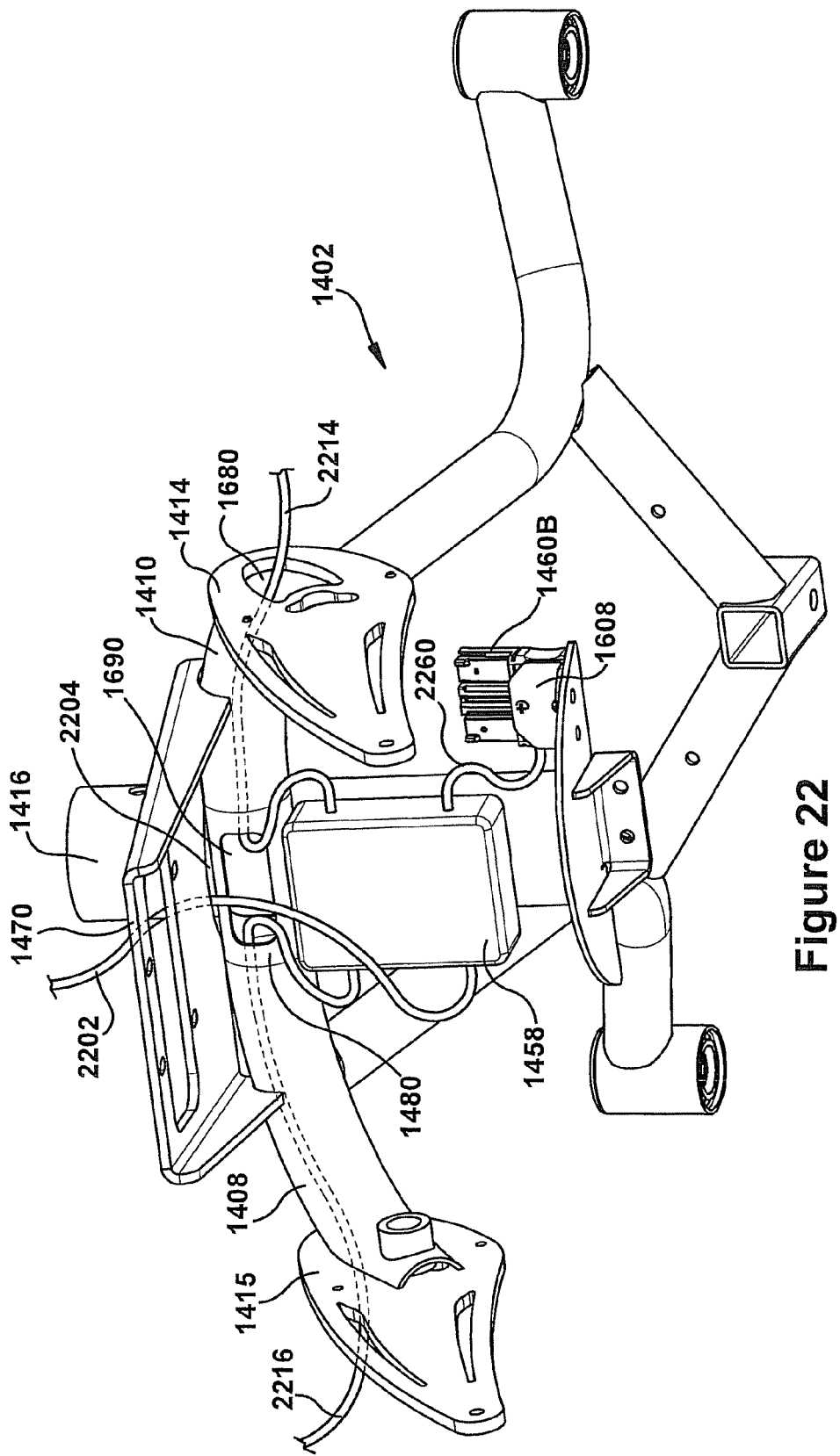
FIG. 22 is a rear perspective view of one embodiment of a frame having wires associated therewith.

The embodiments of the frame of the conveyance or wheelchair disclosed in this application may be configured as a wire routing system. For example, as illustrated in FIG. 22, frame 1402 may be configured as a wire routing system such that the leads or wires emanating from junction block 1458 are at least partially hidden and unexposed. Hiding the leads or wires within the frame and/or underneath the shrouding reduces the risk that the leads or wire will be damaged during use.

FIG. 22 is a rear perspective view of frame 1402 illustrating the routing of the leads or wires emanating from junction block 1458. The wire routing system may include a terminal block or terminal strip in place of junction block 1458. As illustrated in FIG. 22, leads 2214 and 2216 are routed from junction block 1458 through opening 1690 of central member 1480, through the central member and axle support members 1408 and 1410, and out openings 1680 in anti-tip support members 1414 and 1415 to connect to drive wheels 1314 and 1316. Lead 2260 extends from junction block 1458 and connects to electrical connector 1460B attached to connector mounting bracket 1608. Further, lead 2202 is routed from junction block 1458, out an opening 2204 between seat support member 1416 and rear handle support member 1470, and between rear shroud 1452 (FIG. 14) and the seat support member for connection to a lead from the joystick when the seat assembly of the wheelchair is mounted to chassis 1312 (FIG. 13A). The wires or leads may include various strain relief elements to relieve strain on the wires or leads routed throughout the wheelchair.

Many other configurations of a wire routing system are possible. For example, any or all of the portions of the frame may be configured for routing wire. Wire may be routed through the front support members, cross members, rear support member, or anti tip members or mounting plates of the frame. Further, the terminal or junction block may be located and positioned in a variety of ways to facilitate routing of the wires or leads.

FIGS. 16A-16E also illustrate the geometry of caster support members 1404 and 1406. In this embodiment, each caster support member 1404 and 1406 extends from axle support member 1408 and 1410, respectively, in a forward and downward direction substantially parallel to centerline $C_L$ of frame 1402. Each caster support member 1404 and 1406 then curves upward and away from centerline $C_L$ to a distal end for attachment of casters 1318 and 1320. Thus, each caster support member 1404 and 1406 emanates forward and away from axle support members 1408 and 1410 to form an "L" shape.

In the embodiment illustrated in FIGS. 16A-16E, cross members 1606 and 1620 extend downward from a front portion of caster support members 1404 and 1406, respectively, and substantially perpendicular to centerline $C_L$ of frame 1402. Cross members 1606 and 1620 are attached to foot plate support member 1530. As shown, cross members 1606 and 1620 are straight and form a generally "V" shape with foot plate support member 1530 attached proximate the bottom of the "V".

FIGS. 16A-16E also illustrate the geometry of anti-tip support members 1414 and 1415. In this embodiment, anti-tip support members 1414 and 1415 are plates that emanate rearward from axle support members 1408 and 1410 substantially parallel to centerline $C_L$ of frame 1402. As shown, the distal end of anti-tip support members 1414 and 1415 projects beyond the rearward most portion of frame 1402. Apertures are located in the distal ends of anti-tip support members 1414 and 1415 for attachment of anti-tip wheels or casters 1422 and 1424.

Each anti-tip support member 1414 and 1415 includes an opening 1682 for mounting drive wheels 1314 and 1316. As described in more detail below, opening 1682 includes a first portion substantially aligned with the opening in drive wheel attachment member 1624 and 1626 for receipt of a mounting shaft of the drive wheel. Further, opening 1682 includes a second and third portion for receipt of keys or locator pins of the drive wheel. Opening 1680 in anti-tip support members 1414 and 1415 provides access for leads or wires connecting drive wheels 1314 and 1316 to junction block 1458.

FIGS. 16A-16E illustrate seat support member 1416 of frame 1402. In this embodiment, seat support member 1416 is coupled to central member 1480. As shown, central member 1480 includes a cut out portion that permits the central member to at least partially surround seat support member 1416. Seat support member 1416 may be coupled to central member 1480 by various means, such as, for example, with weldments, fasteners, and/or adhesives. Central member 1480 holds seat support member 1416 in an upright and vertical position such that it may telescopically receive a seat support therein. Further, in the embodiment illustrated in FIGS. 16A-16E, a flange 1610 is attached to the distal end of seat support member 1416. Attached to flange 1610 is a connector mounting bracket 1608 and a battery tray mounting bracket 1612. These mounting brackets are described below relative to battery support tray 1412.

In the embodiment illustrated in FIGS. 16A-16E, a rear handle support member 1470 extends rearward from central member 1480 and axle support members 1408 and 1410 to provide a gripping point for the user to lift chassis 1312. Rear handle support member 1470 may be coupled to central member 1480 and axle support members 1408 and 1410 by various means, such as, for example, with weldments, fasteners, and/or adhesives. As shown, rear handle support member 1470 is a plate configured to support rear shroud 1452 having a handle. Rear handle support member 1470 comprises an opening to permit the user to grasp the handle of rear shroud 1452. In this embodiment, rear handle support member 1470 and rear shroud 1452 combine to form a rear handle of the wheelchair. However, in other embodiments, only one member may be used to form a rear handle of the wheelchair.

Figure 17A:
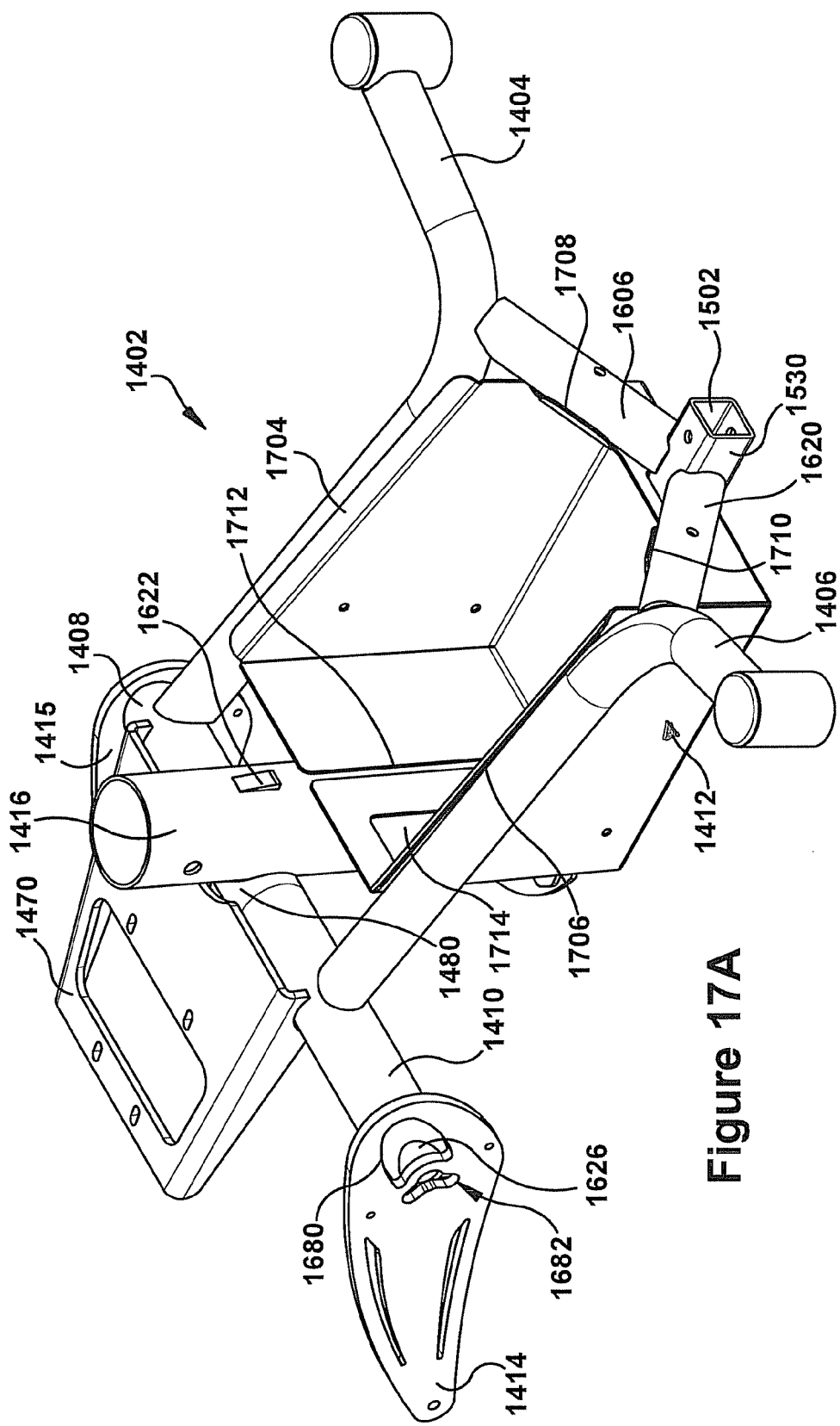
FIGS. 17A and 17B are perspective and rear elevational views of one embodiment of a frame having a battery support.
Figure 17B:
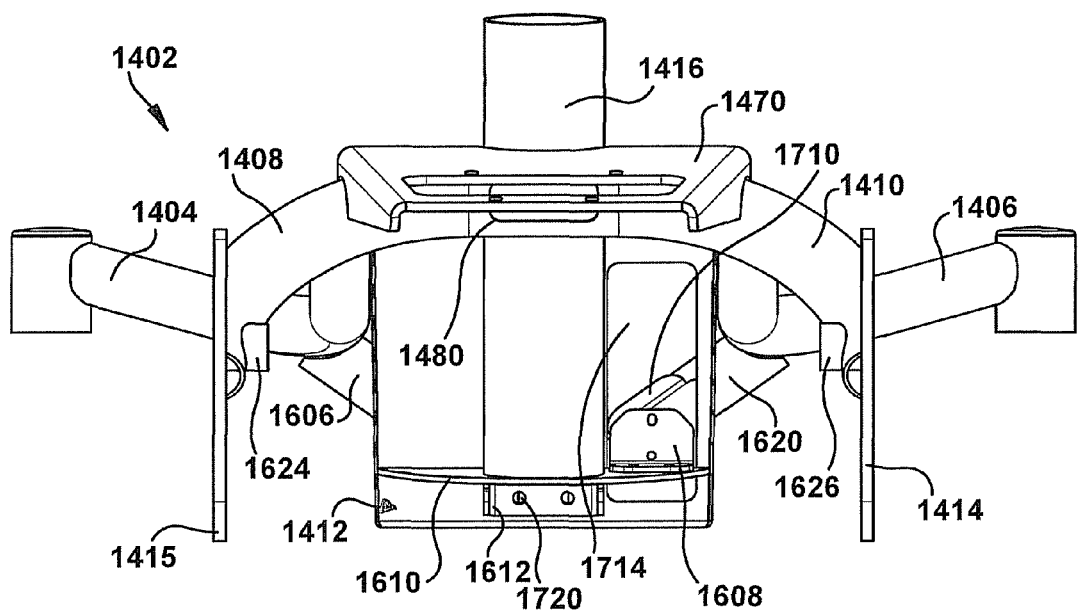

FIGS. 17A and 17B illustrate battery support tray 1412 attached to frame 1402. In this embodiment, battery support tray 1412 is disposed between caster support members 1404 and 1406, seat support member 1416, and cross members 1606 and 1620. Tabs 1704 and 1706 of battery support tray 1412 are configured to rest on caster support members 1404 and 1406, respectively, to support two side walls of the tray. Further, tabs 1708 and 1710 of battery support tray 1412 are configured to rest on cross members 1606 and 1620, respectively, to support the front wall of the tray. The tabs may be attached to frame 1402, such as with weldments, adhesives, and/or fasteners.

As shown in FIG. 17B, one or more locating pins or fasteners 1720 are used to locate battery support tray 1412 relative to frame 1402 and/or attach the battery support tray to battery tray mounting bracket 1612. Attachment may be by any suitable means, including weldments, adhesives, and/or fasteners.

FIGS. 17A and 17B also illustrate a seat support member opening 1712 and a connector opening 1714 of battery support tray 1412. As shown, seat support member opening 1712 is a vertical slot extending downward from an upper edge of the rear wall of battery support tray 1412. Seat support member opening 1712 provides clearance for battery support tray 1412 to be disposed within frame 1402. Further, battery support tray 1412 may be welded to seat support member 1416 along one or more edges of seat support member opening 1712. As shown in FIGS. 17B, 20B, and 20C, connector opening 1714 provides clearance for electrical connector 1460B attached to connector mounting bracket 1608.

Figure 18A:
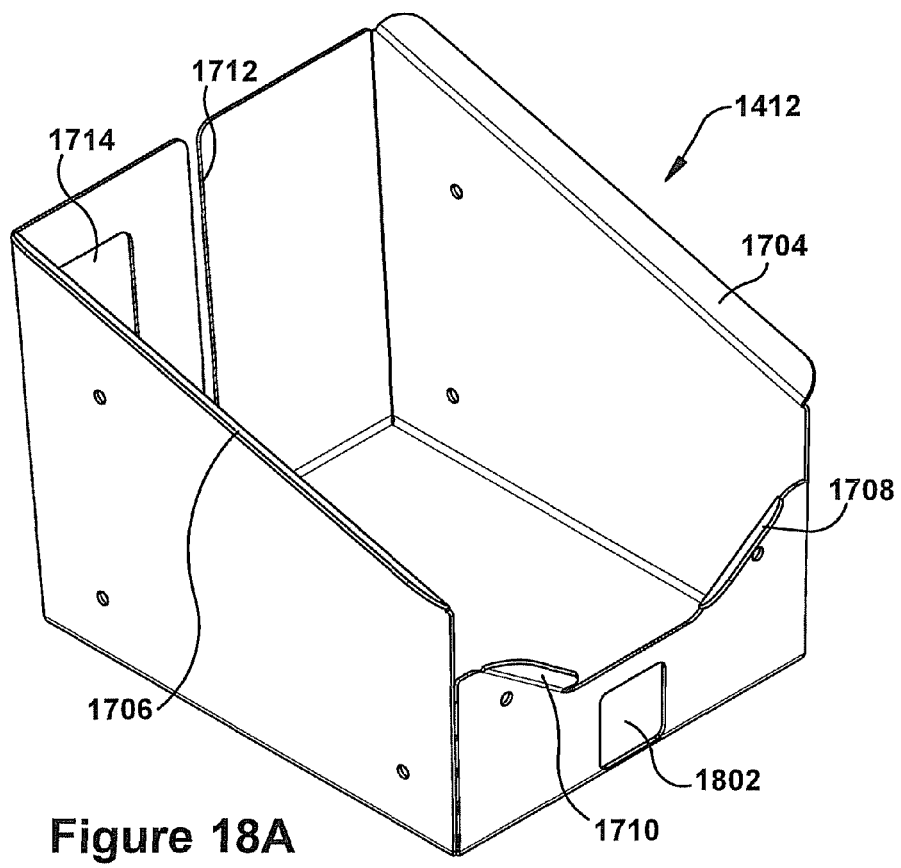
FIGS. 18A-18C are perspective, front elevational, and rear elevational views of one embodiment of a battery support.
Figure 18B:
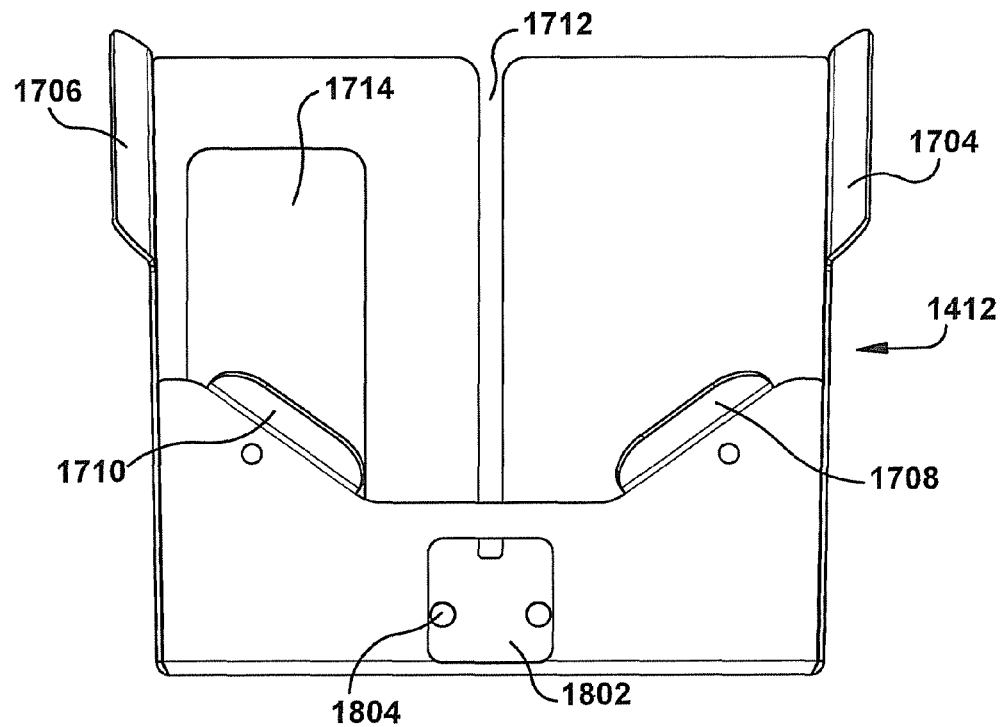
Figure 18C:
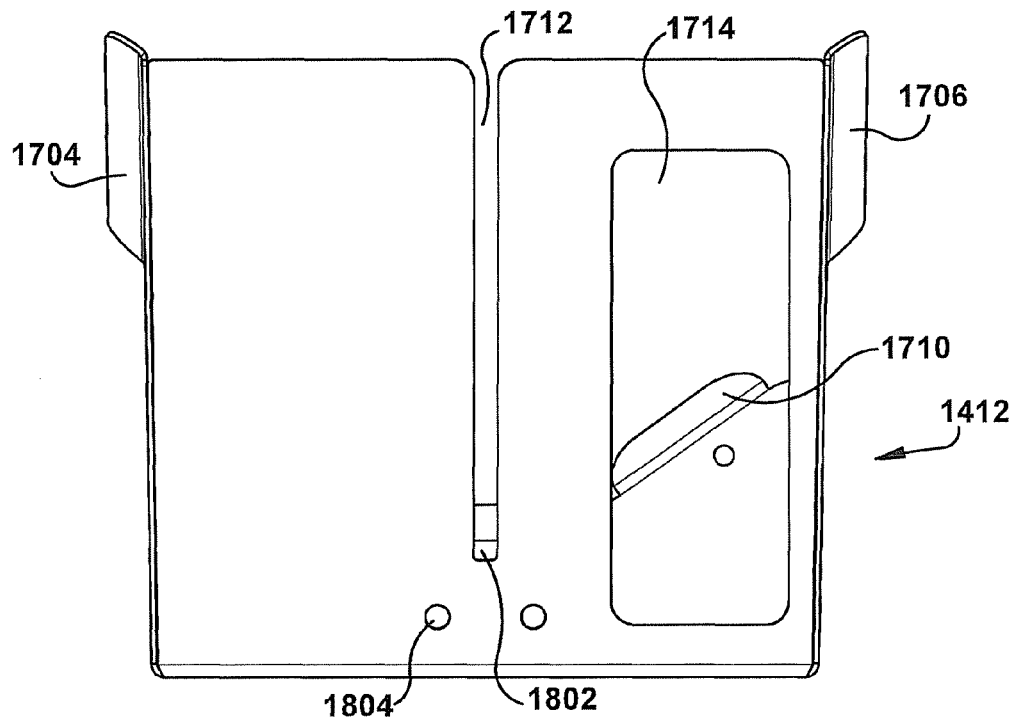

FIGS. 18A-18C illustrate the geometry of battery support tray 1412 in this embodiment. As shown, battery support tray 1412 includes a planar bottom, a front wall, a rear wall, and two side walls. The front wall of battery support tray 1412 includes tabs 1708 and 1710 and a foot plate opening 1802 to provide clearance for the foot plate support member and foot plate mounting member. The rear wall of battery support tray 1412 includes one or more apertures 1804 for receipt of one or more locating pins or fasteners 1720 (FIG. 17B), seat support member opening 1712, and connector opening 1714. The side walls of battery support tray 1412 include tabs 1704 and 1706.

The drive wheel assemblies of the wheelchair may be mounted to the frame in a variety of ways, such as with fasteners, weldments, or adhesives. The drive wheel assemblies may be removable and include one or more locating features, such as a pin, key, or aperture, configured to mate with a corresponding locating feature of the frame. The locating features may facilitate alignment and orientation of the drive wheel assembly relative to the frame. The locating features may also prohibit rotation of the drive wheel assembly relative to the frame. Further, the locating features of the drive wheel assembly and/or the frame may differ on each side of wheelchair such as to ensure the correct drive wheel assembly is mounted on the correct side of the frame.

Figure 23A:
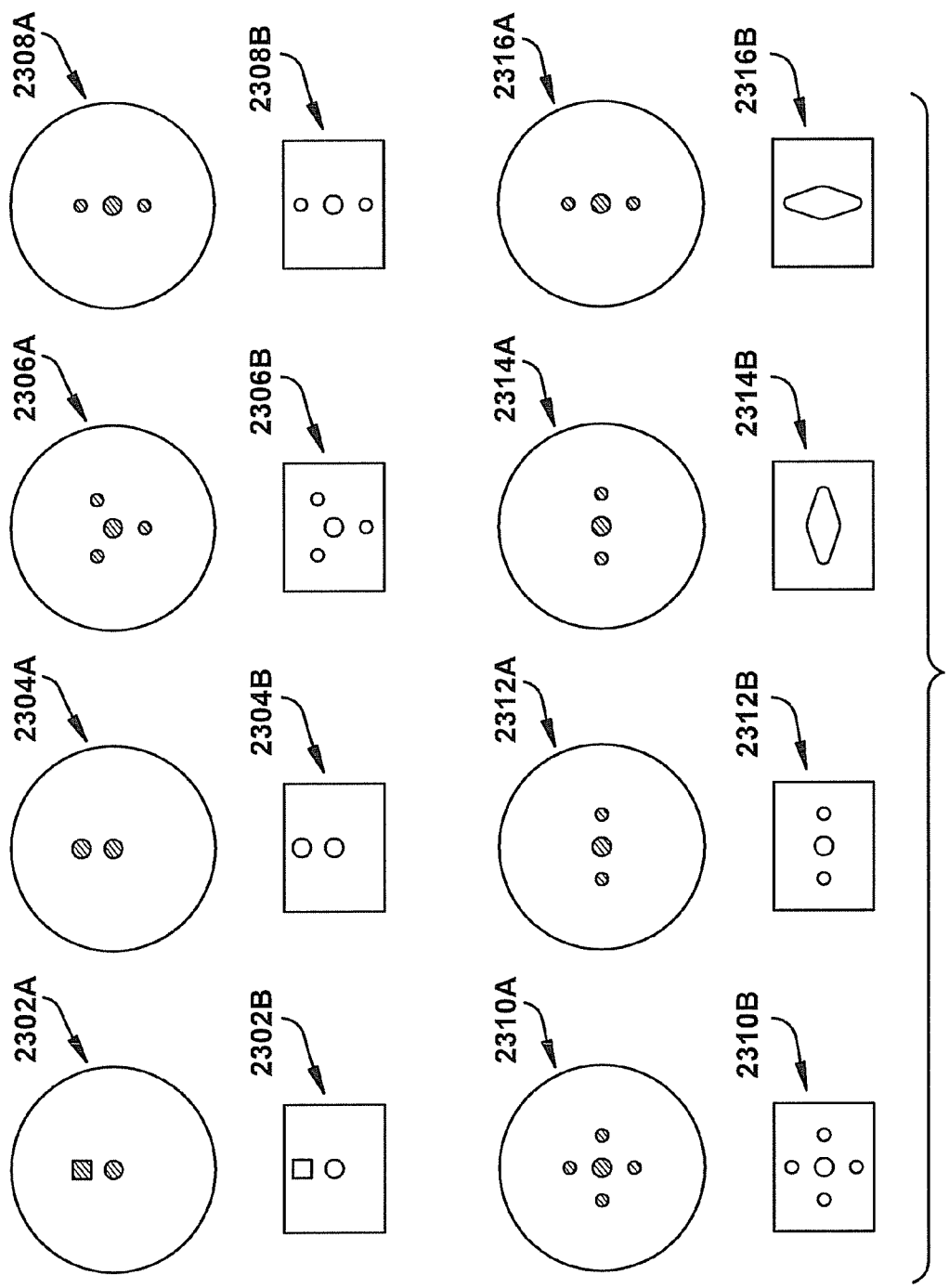
FIGS. 23A and 23B illustrate exemplary drive wheel assembly mounting configurations.
Figure 23B:
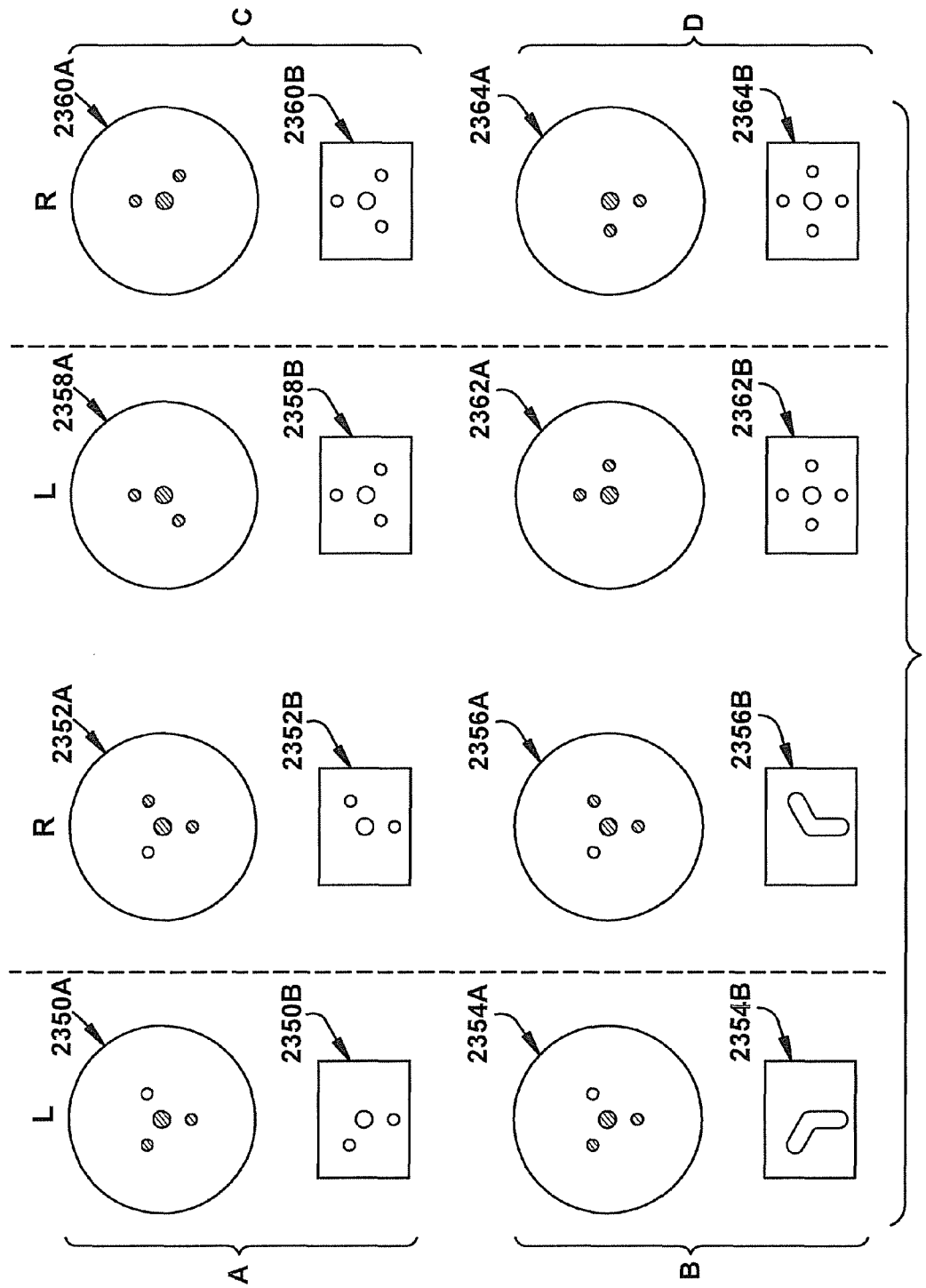

FIGS. 23A and 23B illustrate exemplary drive wheel assembly mounting configurations. FIG. 23A illustrates drive wheel assemblies 2302A through 2316A and corresponding frame portions 2302B through 2316B. As illustrated, each drive wheel assembly 2302A through 2316A has a center circular mounting shaft and one or more pins configured to mate with one or more corresponding apertures in each frame portion 2302B through 2316B. More specifically, drive wheel assemblies 2302A (square pin), 2304A (single round pin), 2306A (three pins), 2308A (two vertically aligned pins), 2310A (four pins), 2312A (two horizontally aligned pins), 2314A (two horizontally aligned pins), and 2316A (two vertically aligned pins) are configured to mate with frame portions 2302B (square aperture), 2304B (single round aperture), 2306B (three apertures), 2308B (two vertically aligned apertures), 2310B (four apertures), 2312B (two horizontally aligned apertures), 2314B (horizontal slot), and 2316B (vertical slot), respectively.

FIG. 23B illustrates drive wheel assemblies 2350A through 2364A and corresponding frame portions 2350B through 2364B. As illustrated, drive wheel assemblies 2350A through 2364A and frame portions 2350B through 2364B are grouped as four right/left mounting combinations (groups A-D) for a wheelchair. The locating features of frame portions 2350B and 2352B of group A and frame portions 23548 and 23568 of group B are asymmetrical such that the mirrored right and left frame portions are not identical. To compensate for the asymmetrical locating features on frame portions 2350B through 2356B (shown as apertures), the top pin of drive wheel assemblies 2350A through 2356A is movable between two locations depending on whether the drive wheel assembly is to be mounted on the left or right frame portion. Thus, the drive wheel assembly may be configured to be mounted on the left or right asymmetrical frame portion by moving the top locator pin.

Still referring to FIG. 23B, the locating features of frame portions 2358B and 2360B of group C and frame portions 2362B and 2364B of group D are symmetrical such that the mirrored right and left frame portions are identical. Further, the locating features of drive wheel assemblies 2358A and 2360A of group C and drive wheel assemblies 2362A and 2364A of group D are not identical. However, the locating features of the frame portions are configured to compensate for the differences in the locating features of the drive wheel assemblies. Thus, either drive wheel assembly in group C may be mounted to either frame portion in group C and either drive wheel assembly in group D may be mounted to either frame portion in group D.

Many other drive wheel assembly mounting configurations are possible in addition to those illustrated in FIGS. 23A and 23B. For example, the frame portion may include one or more pins configured to mate with one or more corresponding apertures in the drive wheel assembly. Further, each drive wheel assembly and/or frame portion may have more or less mounting shafts, pins, and/or apertures of various shapes, sizes, and/or orientations.

Figure 19A:
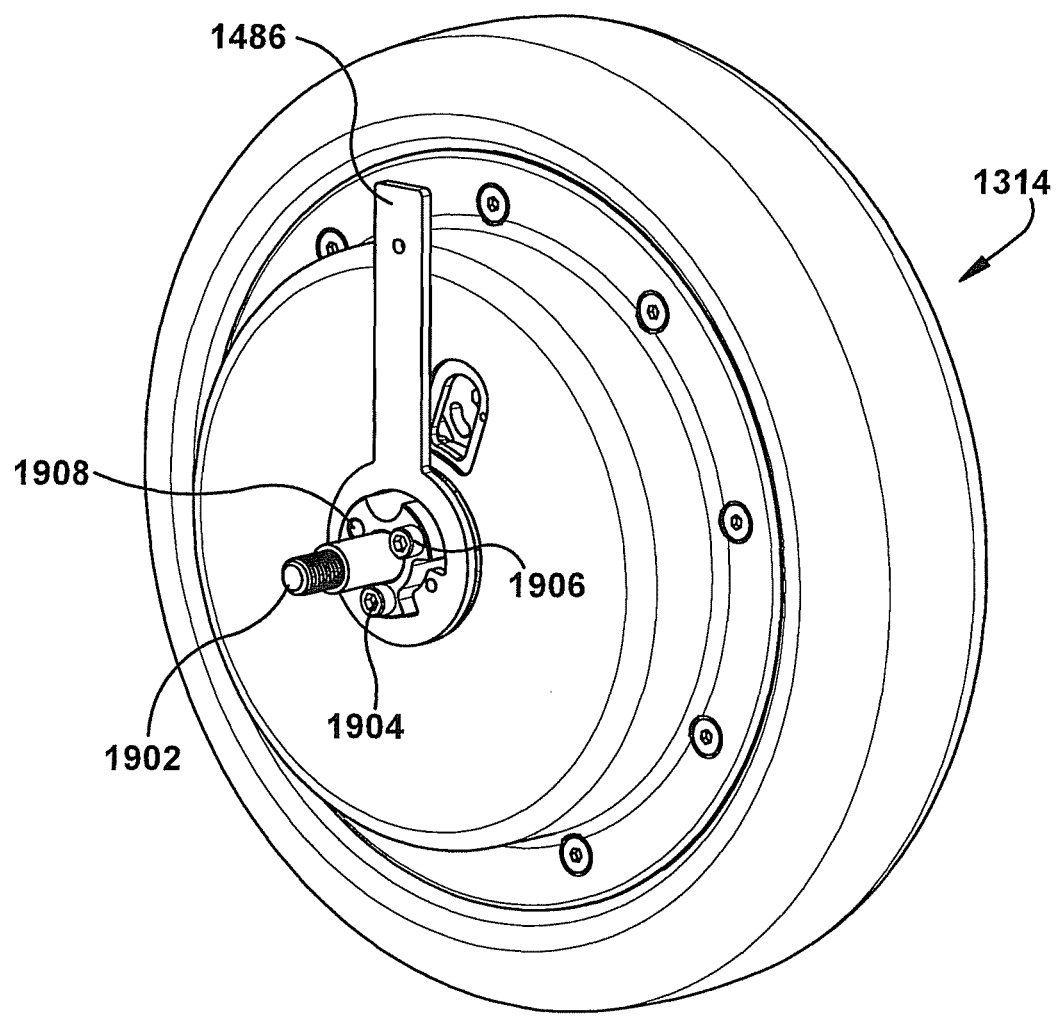
FIG. 19A is a perspective view of one embodiment of a drive wheel assembly.
Figure 19B:
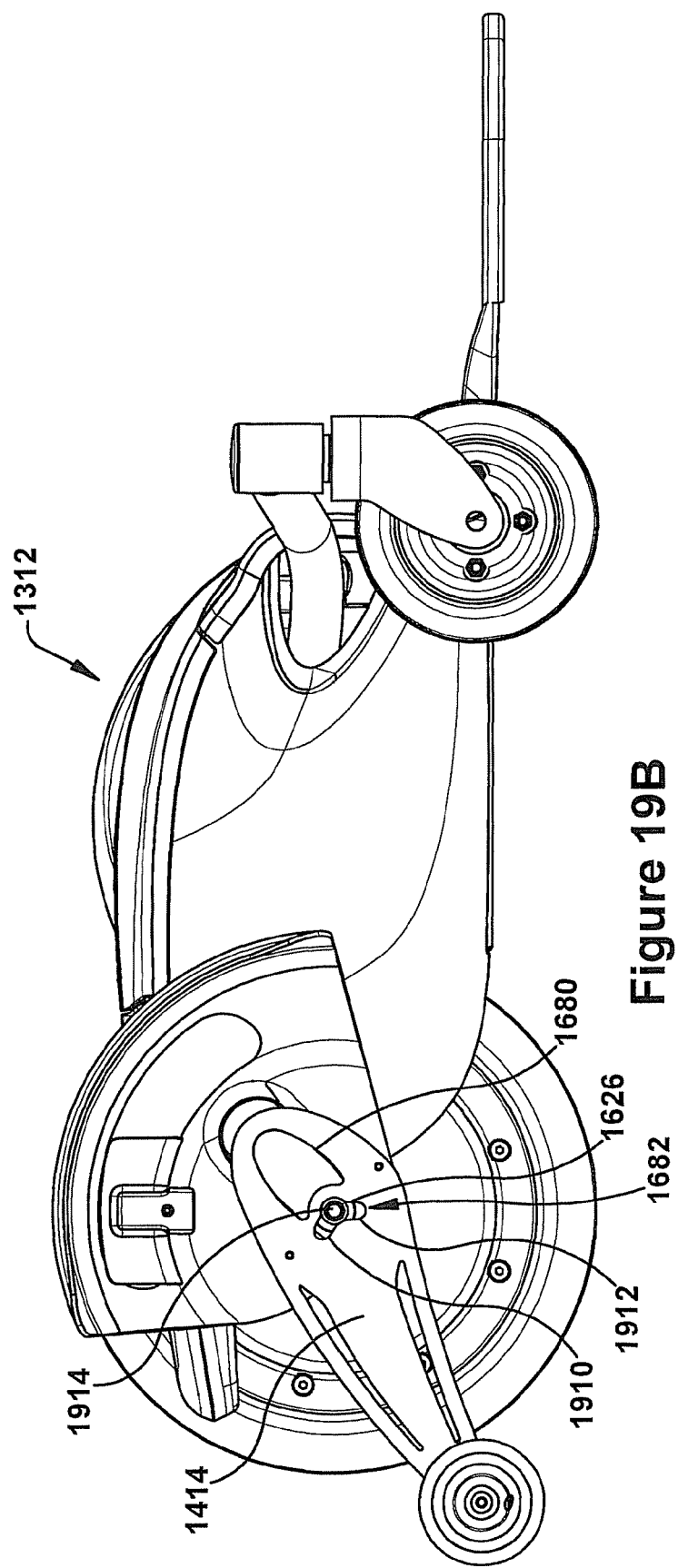
FIG. 19B is a side elevational view of one embodiment of a chassis shown with a drive wheel assembly removed.
Figure 19C:
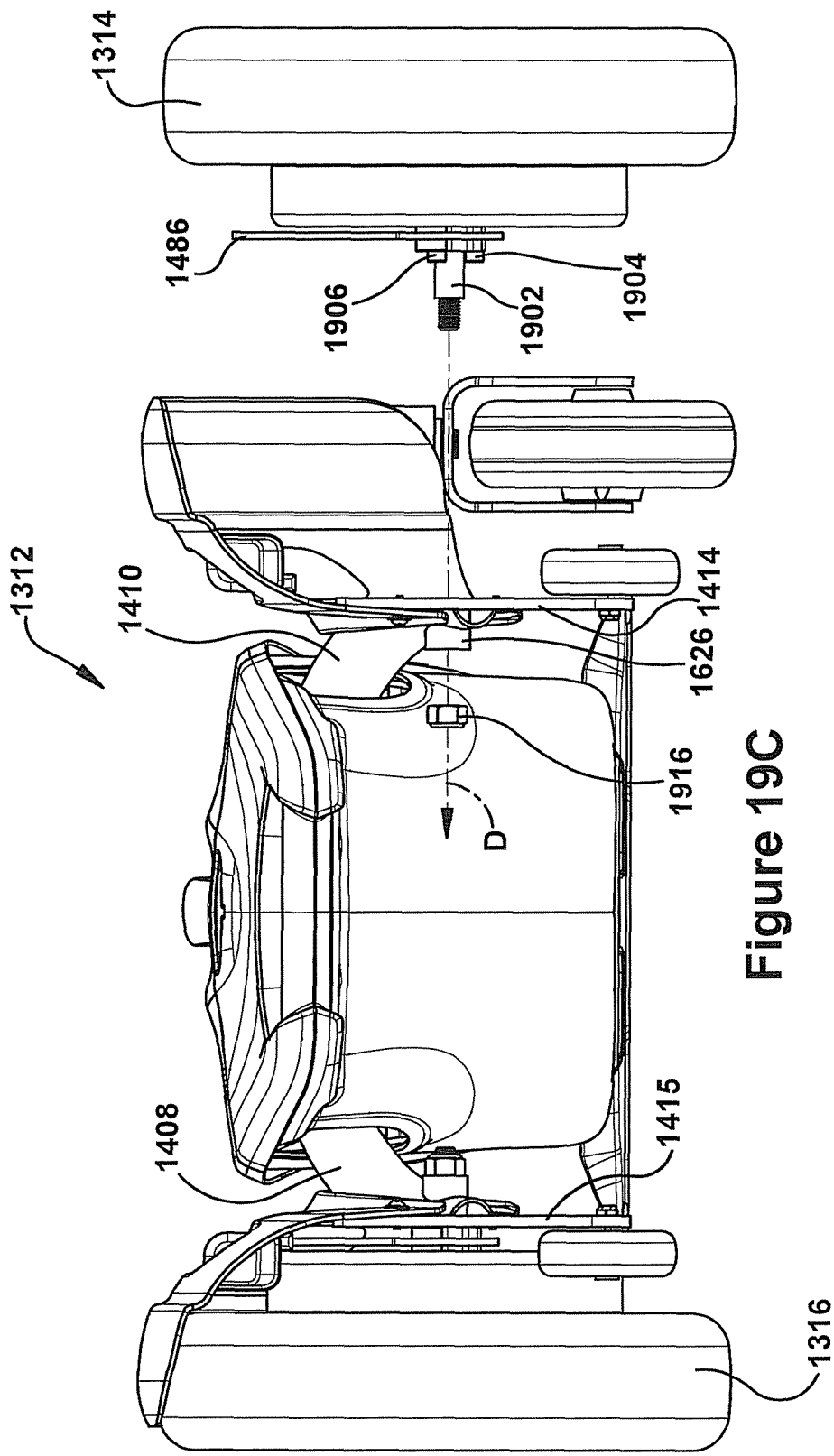
FIG. 19C is a rear elevational view of one embodiment of a chassis shown with a drive wheel assembly exploded from one side.

An exemplary method of mounting a drive wheel assembly to an axle support member of chassis 1312 is illustrated with FIGS. 19A-19C. A rear perspective view of drive wheel 1314 is shown in FIG. 19A. As shown, a bolt having a mounting shaft 1902 is used to mount drive wheel 1314 to axle support member 1410. Drive wheel 1314 comprises three locator pin openings, two upper openings and one lower opening. Two locator pins 1904 and 1906 are received in locator pin openings, locator pin 1906 in an upper opening and locator pin 1904 in the lower opening. The other upper locator pin opening 1908 is shown without a locator pin. As discussed below, locator pin 1906 may be moved to locator pin opening 1908 to mount the drive wheel assembly to axle support member 1408 on the other side of chassis 1312.

FIG. 19B is a side elevational view of chassis 1312 with drive wheel 1314 removed. As shown, anti-tip support member 1414 includes opening 1682 for mounting drive wheel 1314. However, the opening does not necessarily need to be in anti-tip support member 1414 and may be in one or more other members of chassis 1312. Opening 1682 includes a first portion 1914 substantially aligned with the opening in drive wheel attachment member 1626 for receipt of mounting shaft 1902. Further, opening 1682 includes a second portion 1910 and a third portion 1912 for receipt of locator pins 1906 and 1904, respectively, of drive wheel 1314.

FIG. 19C is a rear elevational view of chassis 1312 with drive wheel 1314 partially removed. To mount drive wheel 1314 to axle support member 1410, the drive wheel is positioned such that mounting shaft 1902 is substantially aligned with first portion 1914 of opening 1682 and the opening in drive wheel attachment member 1626. Further, drive wheel 1314 is orientated such that locator pins 1906 and 1904 are substantially aligned with second portion 1910 and third portion 1912, respectively, of opening 1682. Mounting shaft 1902 is then inserted through first portion 1914 of opening 1682 and the opening in drive wheel attachment member 1626 by moving drive wheel 1314 in a direction D. Nut 1916 is then threaded onto a threaded portion of mounting shaft 1902 to secure drive wheel 1314 to axle support member 1410.

An exemplary method of mounting drive wheel 1316 to axle support member 1408 is similar as described above, except the upper locator pin of drive wheel 1316 is moved to the other upper locator pin opening (described as locator pin opening 1908 of drive wheel 1314). Because anti-tip support members 1414 and 1415 are symmetrically disposed about centerline $C_L$, each member possess a geometry on one side of the centerline $C_L$ that is a mirror image of the geometry on the other side of the centerline $C_L$. Thus, the portion of the opening in the anti-tip member that receives the upper locator pin is mirrored, requiring the upper locator pins of drive wheels 1314 and 1316 to be in different upper locator pin openings. Therefore, a drive wheel assembly can be configured to be mounted on the right or left side of the wheelchair by moving the upper locator pin.

FIGS. 20A-20B illustrate the insertion and removal of removable housing 1440 and top cover 1442 relative to battery support tray 1412 of frame 1402. As shown, battery support tray 1412 is configured to receive removable housing 1440. Removable housing 1440 includes a resettable fuse support portion 2004 formed in one wall of the housing to support resettable fuse or breaker 1490 (FIG. 14) for one or more batteries 1418 and 1420. The bottom of resettable fuse support portion 2004 includes an opening (not shown) in which a reset switch 2002 of resettable fuse 1490 (FIG. 14) protrudes.

FIGS. 21A-21C illustrate top cover 1442, handle 1444, and locking assembly 1472 of chassis 1312. Locking assembly 1472 is attached to handle 1444 to selectively lock and unlock top cover 1442 and removable housing 1440 in place relative to frame 1402. As shown, locking assembly 1472 comprises a body member mounted to a bracket 2108 with a fastener 2110 that permits the body member to pivot relative to the bracket. The body member comprises a trigger portion 2106 and a latching portion 2102. Trigger portion 2106 is configured to extend through an opening 2122 in top cover 1442 such that it can be manipulated by the user when grasping handle 1444. Latching portion 2102 is configured to extend through an opening 2120 (FIG. 14) in removable housing 1440 and selectively engage striker 1622 (FIG. 16A) of seat support member 1416.

Locking assembly 1472 also comprises a biasing mechanism 2104. As shown, biasing mechanism 2104 is a spring positioned between the body member of locking assembly 1472 and a bottom side of handle 1444. Biasing mechanism 2104 is configured to bias locking assembly 1472 toward a locked position in which latching portion 2102 is engaged with striker 1622 and top cover 1442 is prohibited from moving relative to frame 1402. When trigger portion 2106 is moved toward handle 1444, latching portion 2102 disengages striker 1622 and top cover 1442 is permitted to move relative to frame 1402. Although a spring is illustrated, any biasing mechanism may be used that permits latching portion 2102 to selectively engage and disengage striker 1622, such as an elastomeric material or compressible fluid.

Figure 24A:
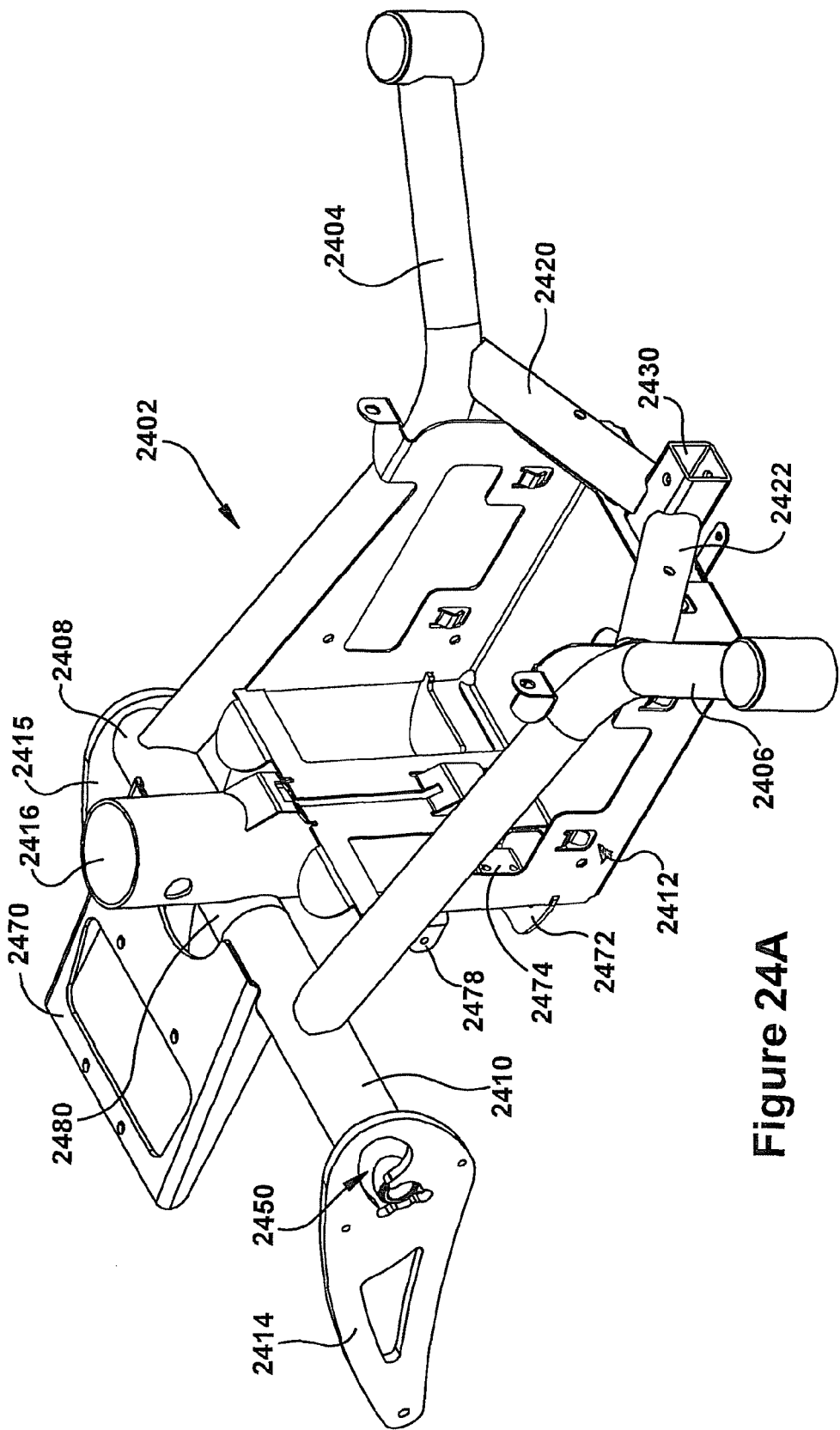
FIGS. 24A-24C are perspective, top plan, and side elevational views, respectively, of another embodiment of a frame.
Figure 24B:
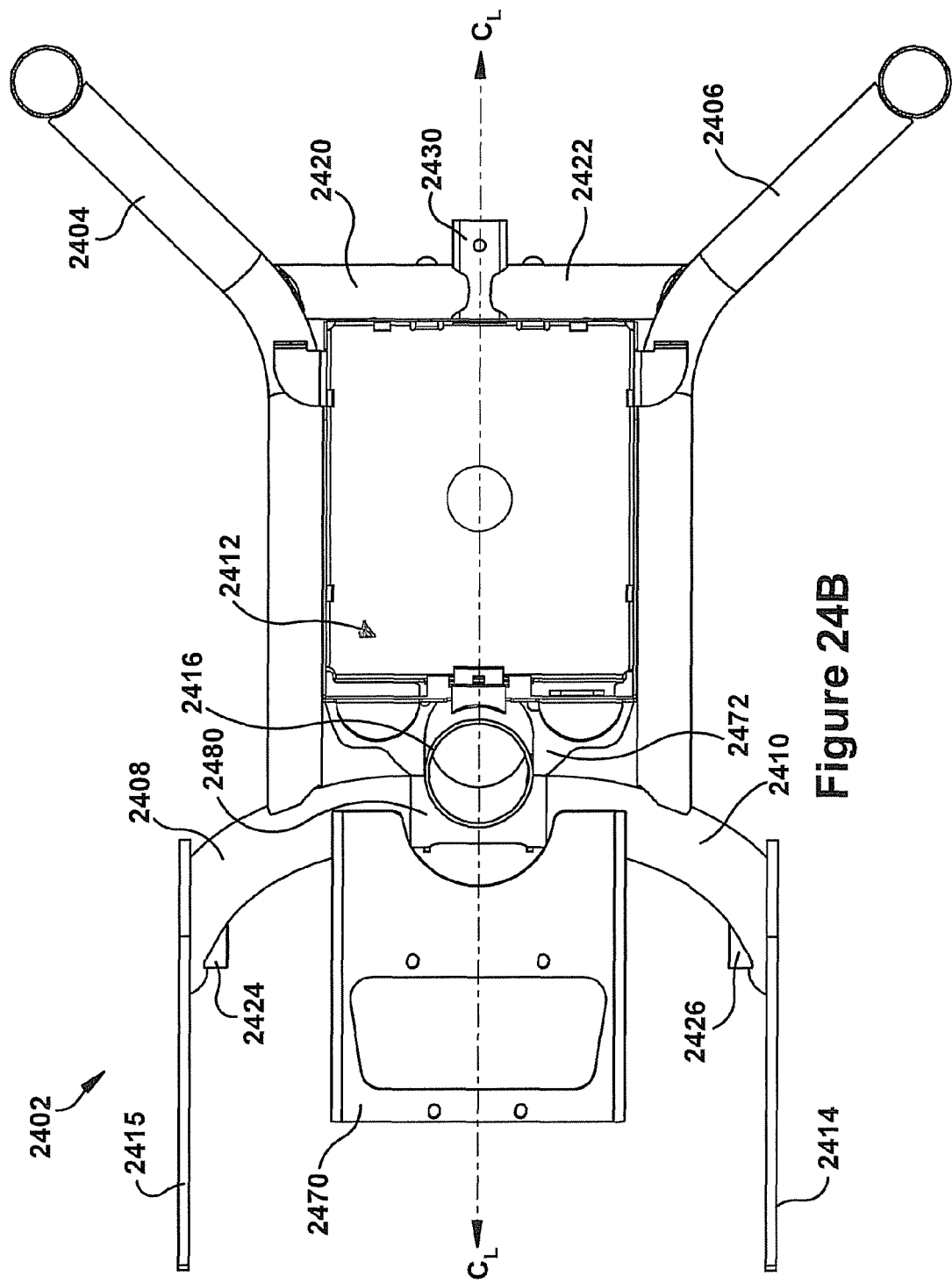
Figure 24C:
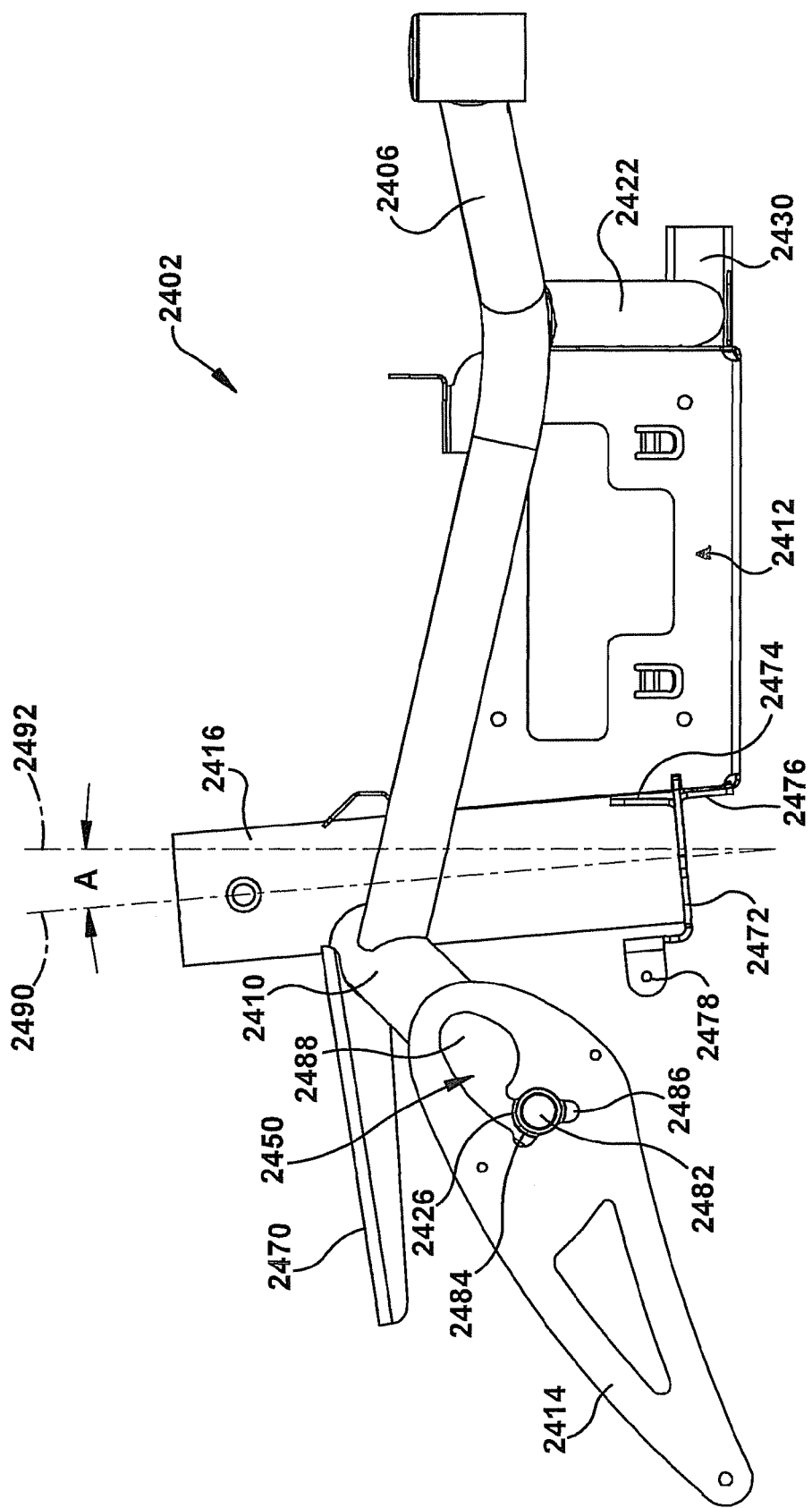

FIGS. 24A-24C illustrate various views of a frame 2402 according to an embodiment of the present application. Similar to frame 1402 described above, frame 2402 includes a central member 2480, caster support members 2404 and 2406, axle support members 2408 and 2410, anti-tip support members 2414 and 2415, a seat support member 2416, and a rear handle support member 2470.

FIG. 24B illustrates a top plan view of frame 2402. As shown in FIG. 24B, frame 2402 is disposed substantially about centerline $C_L$, which represents the centerline of the chassis and the wheelchair. In particular, central member 2480, caster support members 2404 and 2406, axle support members 2408 and 2410, anti-tip support members 2414 and 2415, and rear handle support member 2470 are all symmetrically disposed about centerline $C_L$. As such, in this embodiment, each of these members possess a geometry on one side of the centerline $C_L$ that is a mirror image of the geometry on the other side of the centerline $C_L$.

FIGS. 24A-24C illustrate the geometry of axle support members 2408 and 2410 in this embodiment. Axle support members 2408 and 2410 emanate from central member 2480 and extend downwardly and away therefrom. In this particular embodiment, axle support members 2408 and 2410 extend in a rearward direction of the chassis. These members also collectively form a "U" or "V" shape extending away from central member 2480. Central member 2480 and axle support members 2408 and 2410 collectively form a drive wheel support member of frame 2402.

A distal portion of each axle support member 2408 and 2410 may be configured such that anti-tip support members 2414 and 2415 can be coupled to the distal portion of the axle support members. As shown, the distal portion of axle support members 2408 and 2410 are cut to form a face substantially parallel to centerline $C_L$ of frame 2402 for attachment of anti-tip support members 2414 and 2415. Anti-tip support members 2414 and 2415 extend rearward from axle support members 2408 and 2410 and are substantially parallel to centerline $C_L$ of frame 2402. Anti-tip support members 2414 and 2415 may be coupled to axle support members 2408 and 2410 by various means, such as, for example, with weldments, fasteners, and/or adhesives.

The distal portion of each axle support member 2408 and 2410 may also include attachment members for mounting drive wheels to the axle support members. As illustrated in FIGS. 24A-24C, drive wheel attachment members 2424 and 2426 are cylindrical in shape and coupled to the distal portion of axle support members 2408 and 2410, substantially perpendicular to centerline $C_L$ of frame 2402 and positioned between the axle support members and anti-tip support members 2414 and 2415. Each drive wheel attachment member 2424 and 2426 includes an opening for mounting drive wheels. Drive wheel attachment members 2424 and 2426 and the openings therein may be various shapes and sizes depending at least on the size and type of drive assembly. Drive wheel attachment members 2424 and 2426 may be coupled to axle support members 2408 and 2410 by various means, such as, for example, with weldments, fasteners, and/or adhesives.

Furthermore, an opening in the distal portion of each axle support member 2408 and 2410 may align with an opening 2450 in anti-tip support members 2414 and 2415 to provide access for leads or wires connecting the drive wheels to a terminal or junction block. For example, the leads or wires from the drive wheels may be routed through opening 2450, axle support members 2408 and 2410, and central member 2480 and then out an opening in the central member to the terminal or junction block.

FIGS. 24A-24C also illustrate the geometry of caster support members 2404 and 2406. In this embodiment, each caster support member 2404 and 2406 extends from axle support member 2408 and 2410, respectively, in a forward and downward direction substantially parallel to centerline $C_L$ of frame 2402. Each caster support member 2404 and 2406 then curves upward and away from centerline $C_L$ to a distal end for attachment of the casters. Thus, each caster support member 2404 and 2406 emanates forward and away from axle support members 2408 and 2410 to form an "L" shape.

In the embodiment illustrated in FIGS. 24A-24C, cross members 2420 and 2422 extend downward from a front portion of caster support members 2404 and 2406, respectively, and substantially perpendicular to centerline $C_L$ of frame 2402. Cross members 2420 and 2422 are attached to foot plate support member 2430. As shown, cross members 2420 and 2422 are straight and form a generally "V" shape with foot plate support member 2430 attached proximate the bottom of the "V".

FIGS. 24A-24C also illustrate the geometry of anti-tip support members 2414 and 2415. In this embodiment, anti-tip support members 2414 and 2415 are plates that emanate rearward from axle support members 2408 and 2410 substantially parallel to centerline $C_L$ of frame 2402. As shown, the distal end of anti-tip support members 2414 and 2415 projects beyond the rearward most portion of frame 2402. Apertures are located in the distal ends of anti-tip support members 2414 and 2415 for attachment of anti-tip wheels or casters.

Opening 2450 in each anti-tip support member 2414 and 2415 includes portions for mounting the drive wheels and coupling anti-tip support members to the axle support members 2408 and 2410. As illustrated in FIG. 24C, opening 2450 includes a first portion 2482 substantially aligned with the opening in drive wheel attachment member 2424 and 2426 for receipt of a mounting shaft of the drive wheel. Further, opening 2450 includes a second portion 2484 and a third portion 2486 for receipt of keys or locator pins of the drive wheel. Opening 2450 also includes a fourth portion 2488 that provides access for leads or wires connecting the drive wheels to the terminal or junction block. The shape of fourth portion 2488 is also configured to follow the contour of the face formed by cutting the distal portion of axle support members 2408 and 2410. In this regard, the shape of the fourth portion 2488 facilitates coupling anti-tip support members 2414 and 2415 to axle support members 2408 and 2410, such as, for example, with weldments, fasteners, and/or adhesives.

FIGS. 24A-24C illustrate seat support member 2416 of frame 2402. In this embodiment, seat support member 2416 is coupled to central member 2480. As shown, central member 2480 includes a cut out portion that permits the central member to at least partially surround seat support member 2416. Seat support member 2416 may be coupled to central member 2480 by various means, such as, for example, with weldments, fasteners, and/or adhesives. Central member 2480 holds seat support member 2416 in an upright and vertical position such that it may telescopically receive a seat support therein. As shown in FIG. 24C, the longitudinal axis 2490 of seat support member 2416 is angled slightly rearward relative to a vertical axis 2492 of frame 2402 to facilitate insertion of the seat support and stabilization of the seat. Angle A between longitudinal axis 2490 and vertical axis 2492 is generally acute and preferably in the range of 0 to 10 degrees, but may have an even larger range depending on the design. In one embodiment, angle A is 5 degrees.

Further, in the embodiment illustrated in FIGS. 24A-24C, a bracket 2494 is attached to the distal end of seat support member 2416. Attached to bracket 2494 is a connector mounting bracket 2474, a battery tray mounting bracket 2476, and a shroud mounting bracket 2478.

In the embodiment illustrated in FIGS. 24A-24C, a rear handle support member 2470 extends rearward from central member 2480 and axle support members 2408 and 2410 to provide a gripping point for the user to lift the chassis. Rear handle support member 2470 may be coupled to central member 2480 and axle support members 2408 and 2410 by various means, such as, for example, with weldments, fasteners, and/or adhesives. As shown, rear handle support member 2470 is a plate configured to support a rear shroud having a handle. Rear handle support member 2470 comprises an opening to permit the user to grasp the handle of the rear shroud. In this embodiment, rear handle support member 2470 and the rear shroud combine to form a rear handle of the wheelchair. However, in other embodiments, only one member may be used to form a rear handle of the wheelchair.

Figure 25A:
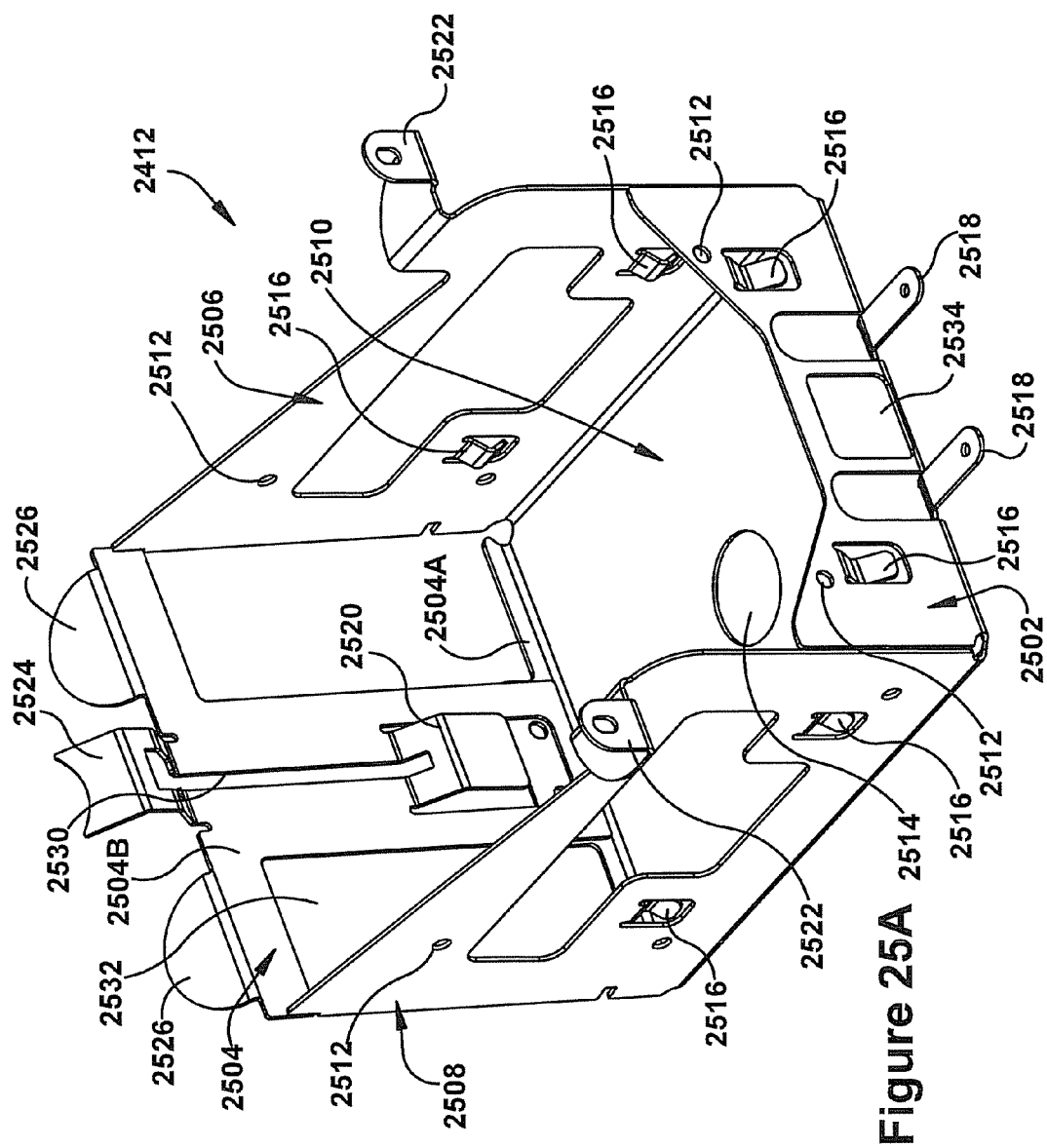
FIGS. 25A and 25B are perspective views of another embodiment of a battery support.
Figure 25B:
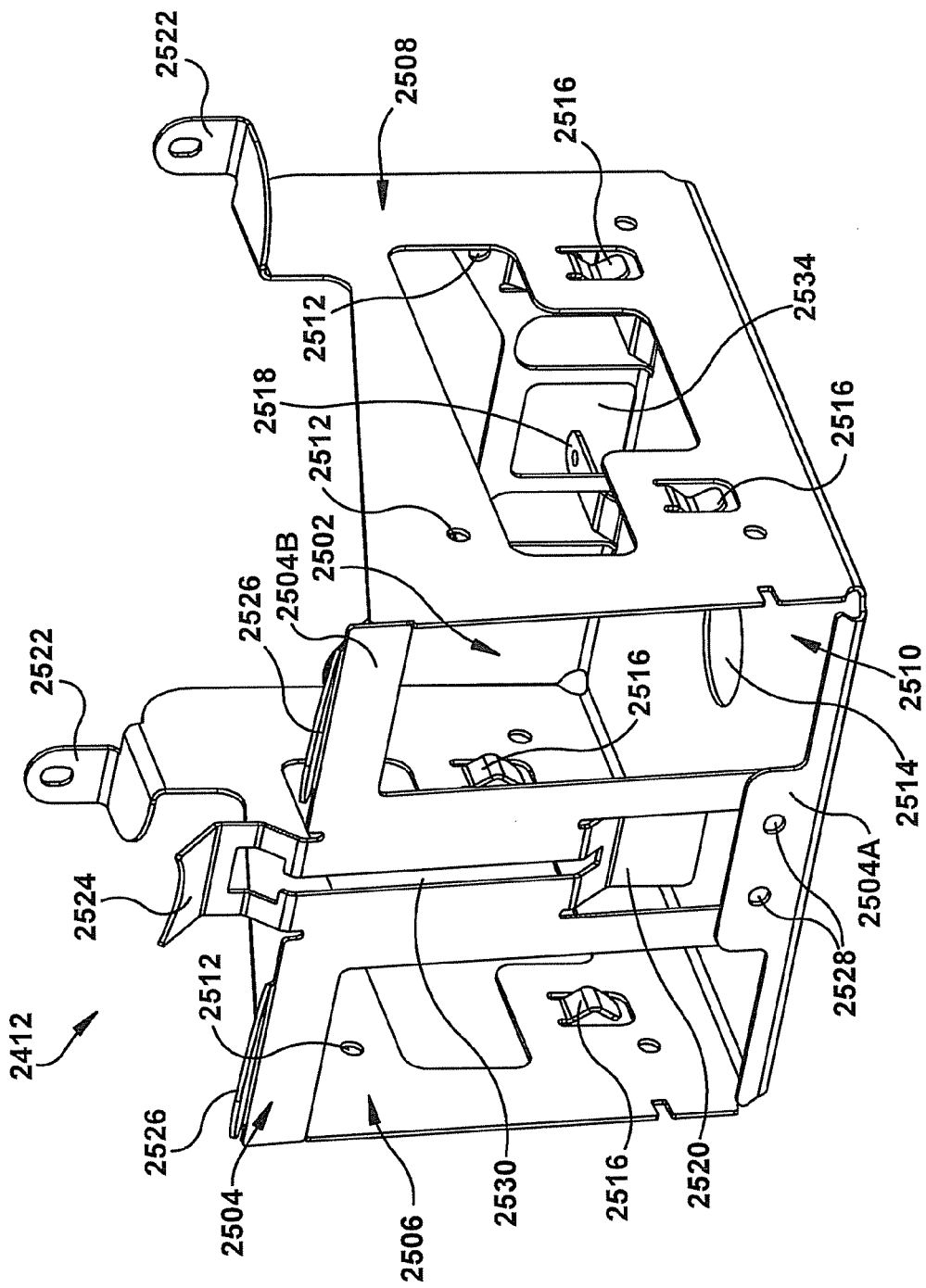

FIGS. 25A and 25B illustrate battery support tray 2412. Battery support tray 2412 includes a front wall 2502, a rear wall 2504, two side walls 2506 and 2508, and a bottom 2510. As shown, a unitary piece of material, such as, for example, a stamped piece of metal, is bent to form front wall 2502, side walls 2506 and 2508, and a lower portion 2504A of rear wall 2504 extending upward from bottom 2510. An upper portion 2504B of rear wall 2504 is formed from a separate piece of material and is attached to lower portion 2504A to form rear wall 2504. Forming upper portion 2504B of rear wall 2504 from a separate piece of material reduces the amount of material used to manufacture battery support tray 2412. However, in other embodiments, the entire battery support tray is formed from a single piece of material. Upper portion 2504B of rear wall 2504 may be attached to lower portion 2504A by various means, such as with weldments, fasteners, and/or adhesives. Further, the walls and bottom of the battery support tray 2412 may be welded together to provide strength to the tray.

In the embodiment illustrated in FIGS. 24A-24C, battery support tray 2412 is disposed between caster support members 2404 and 2406, seat support member 2416, and cross members 2420 and 2422 of frame 2402. The walls of battery support tray 2412 include apertures 2512 configured for fasteners to attach the tray to the components of frame 2402. However, battery support tray 2412 may be attached to frame 2402 by various means, such as with weldments and/or adhesives.

Battery support tray 2412 is configured to receive a removable battery housing designed to hold one or more batteries of the wheelchair. Tabs 2516 on the front wall 2502 and side walls 2506 and 2508 and tab 2520 on the rear wall 2504 of battery support tray 2412 are configured as guides to position the battery housing and hold the housing in place relative to the battery support tray. As illustrated in FIGS. 25A and 25B, tabs 2516 and 2520 are bent such that they flex outward when the battery housing is placed in battery support tray 2412 to hold the housing in place and prohibit the housing from rattling in the tray.

Tab 2524 extends upwards from rear wall 2504 of battery support tray 2412. Tab 2524 is configured as a striker or latch that engages a latching portion of a locking assembly designed to selectively lock and unlock the top cover and removable housing in place relative to frame 2402, such as, for example, the latching portion 2102 of locking assembly 1472 illustrated in FIGS. 21A-21C. Tab 2524 may be configured to extend through an opening in the removable housing to engage the latching portion of the locking assembly.

Tabs 2526 also extend upward from rear wall 2504 of battery support tray 2412. Tabs 2526 are configured as guides for the removable battery housing when the housing is inserted into the battery support tray 2412. As such, tabs 2526 prohibit the removable battery housing from catching on sharp edges of the battery support tray 2412 when the housing is inserted into the tray. Further, tabs 2522 extending from side walls 2506 and 2508 and tabs 2518 extending from front wall 2502 are configured as brackets for attaching various portions of shrouding to frame 2402. As shown in FIG. 25B, apertures 2528 are configured for fasteners to attach battery support tray 2412 to battery tray mounting bracket 2476. However, attachment may be by any other suitable means, including weldments and/or adhesives.

FIGS. 25A and 25B also illustrate a seat support member opening 2530 and a connector opening 2532 of battery support tray 2412. As shown, seat support member opening 2530 is a vertical slot in rear wall 2504 of battery support tray 2412. Seat support member opening 2530 provides clearance for battery support tray 2412 to be disposed within frame 2402. Further, battery support tray 2412 may be welded to seat support member 2416 along one or more edges of seat support member opening 2530. Connector opening 2532 provides clearance for an electrical connector attached to connector mounting bracket 2474. A foot plate opening 2534 in front wall 2502 provides clearance for a foot plate support member and foot plate mounting member and an opening 2514 in bottom 2510 permits drainage of water or other liquids that may collect in battery support tray 2412. Other openings in side walls 2506 and 2508 and rear wall 2504 help to reduce the weight of battery support tray 2412.

Figure 26:
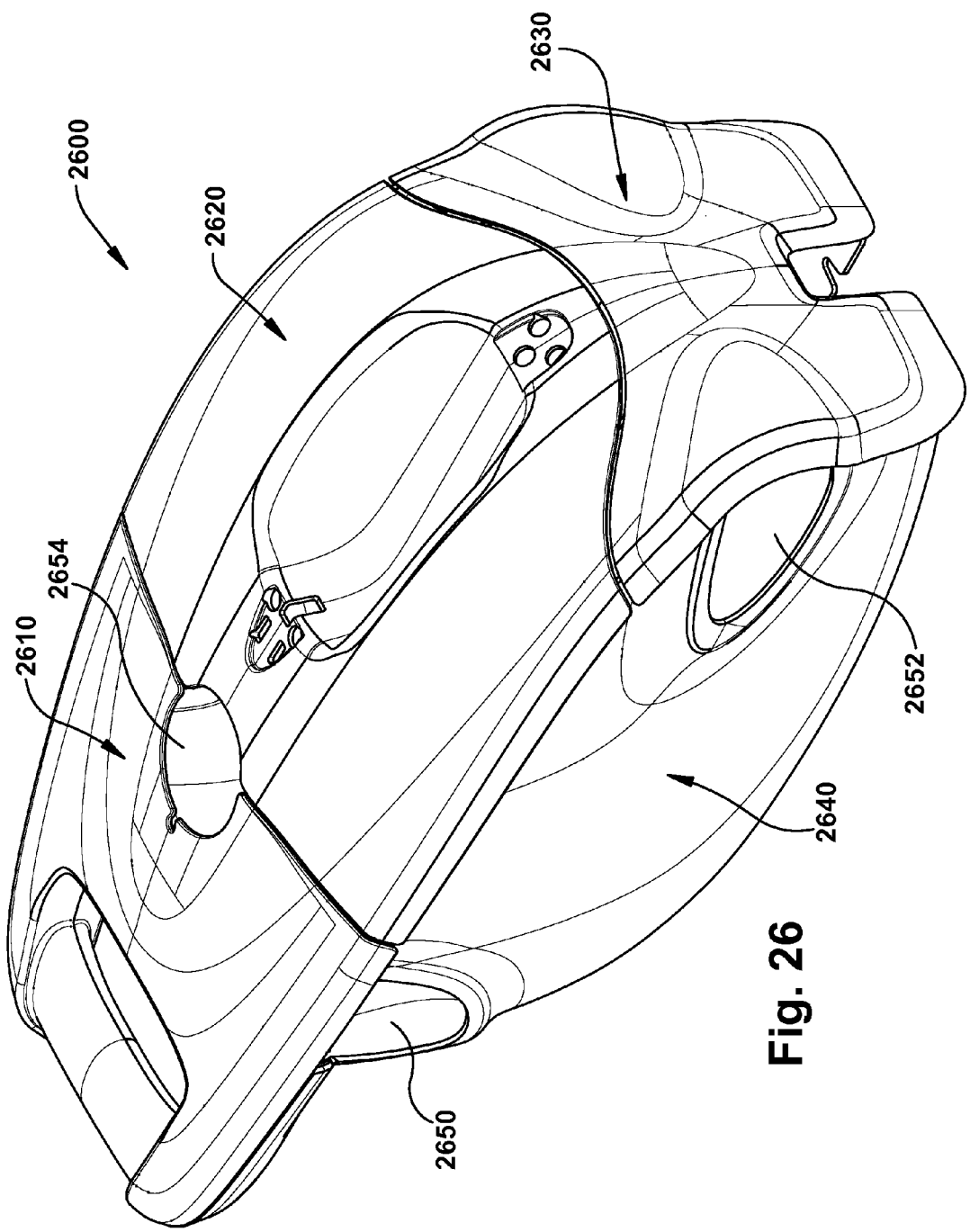
FIG. 26 is a perspective view of an embodiment of a shrouding system.

FIG. 26 illustrates a shrouding system 2600 for a conveyance such as a wheelchair according to an embodiment of the present application. As illustrated in FIG. 26, the shrouding system 2600 includes a rear handle shroud 2610, a top shroud 2620, a front shroud 2630, a left shroud, and a right shroud. Left shroud and right shroud form a lower shroud 2640 of shrouding system 2600. Shrouding system 2600 may include more or less shroud components. Multiple shroud components may be combined to form a single shroud component, for example, left and right shrouds may be combined to form a single lower shroud.

Shrouding system 2600 is configured to cover the frame and other components of the conveyance. As illustrated in FIG. 26, rear handle shroud 2610, top shroud 2620, and front shroud 2630 are configured to collectively cover a top and front of the frame and other components of the conveyance. Further, lower shroud 2640 is configured to cover the left and right sides, bottom, and rear of the frame and other components of the conveyance.

Shrouding system 2600 also includes openings 2650, 2652, and 2654 allowing frame components for the wheels, casters, and/or seat assembly of the conveyance to project from the shroud. Specifically, rear handle shroud 2610 and/or top shroud 2620 include opening 2654 allowing the frame component for attachment of a seat assembly of the conveyance to extend from the shroud. Lower shroud 2640 includes openings 2650 and 2652 allowing for frame components for attachment of the wheels and casters of the conveyance to extend from the shroud. Further, as illustrated in FIG. 29A, lower shroud 2640 includes a bottom opening 2956 for a skid plate or battery tray of the conveyance.

FIGS. 27A and 27B illustrate top shroud 2620 of shrouding system 2600. Top shroud 2620 includes attachment portions 2710 for attachment of a handle to facilitate removal of the top shroud from the frame or other component of the conveyance such as, for example, the battery support. Further, a central portion of top shroud 2620 includes a depression 2712 that provides clearance for a user to grasp the handle. In one embodiment, the handle includes a locking assembly configured to lock or unlock top shroud 2620 relative to the frame or other component of the conveyance. Top shroud 2620 includes an opening for a latch of the locking assembly. Further, depression 2712 is configured to provide clearance for the locking assembly. Top shroud 2620 also includes a rounded notch, aperture, or opening towards is rear portion 2804 allowing seat support member 216 (shown in FIG. 2) to project or extend from the shroud. Rear handle shroud 2610 includes a similar notch, aperture or opening corresponding located for the same purpose.

FIGS. 28A-28E are various cross-sectional views of top shroud 2620 of shrouding system 2600. FIGS. 28A and 28B are side cross-sectional views of top shroud 2620 taken along lines 28A-28A and 28B-28B, respectively, shown in FIG. 27B. Line 28A-28A is also the centerline of top shroud 2620. FIGS. 28C-28E are front cross-sectional views of top shroud 2620 taken along lines 28C-28C, 28D-28D, and 28E-28E, respectively, shown in FIG. 27B.

As illustrated in FIG. 28B, top shroud 2620 includes a top surface 2802 having a rear portion 2804 and a front portion 2806. Top surface 2802 has a convex outer surface that curves outward and slopes downward from rear portion 2804 to front portion 2806. As illustrated in FIG. 28A, depression 2712 has a rear wall 2808 and a bottom 2810. Rear wall 2808 extends downward from rear portion 2804 at an acute angle to vertical axis V and then curves to transition to bottom 2810. Bottom 2810 extends from rear wall 2808 of depression 2712 and transitions to front portion 2806 of top surface 2802. Bottom 2810 is substantially parallel to horizontal axis H, but may also include a gentle downward or upward slope toward front portion 2806. A downward sloping bottom 2810 provides a complimentary configuration to downwardly sloping top surface 2802.

Other configurations of rear wall 2808 and bottom 2810 of depression 2712 are possible. For example, rear wall 2808 may extend downward from rear portion 2804 substantially parallel to vertical axis V and may or may not be curved. Further, bottom 2810 may or may not be substantially parallel to horizontal axis H. For example, bottom 2810 may be angled relative to horizontal axis H and slope downward or upward from rear wall 2808 to front portion 2806.

FIGS. 28C-28E are front cross-sectional views of top shroud 2620 at three locations and illustrate the changing shape of the top shroud from the rear to the front of the conveyance. As illustrated in the Figures, top shroud 2620 includes a left portion 2812 and a top portion 2810 and depression 2712 has a left sidewall 2820 and a right sidewall 2818. Top surface 2802 has a curved surface configuration and slopes upward from left portion 2812 and right portion 2810 to the central portion of top shroud 2620. Top surface 2802 then curves downward to form a convex transition to left sidewall 2820 and right sidewall 2818 of depression 2712. The convex transition from top surface 2802 to left sidewall 2820 and right sidewall 2818 forms a left ridge 2816 and right ridge 2814, respectively. Left sidewall 2820 and right sidewall 2818 of depression 2712 extend downward from top surface 2802 at an acute angle to vertical axis V and then curve to transition to bottom 2810.

Left sidewall 2820, right sidewall 2818, and bottom 2810 of depression 2712 form a concave surface of the depression. As illustrated in FIGS. 28C-28E, the shape of the concave depression 2712 changes from the rear to the front of the conveyance. For example, the horizontal width of the depression 2712 increases and then decreases from the rear to the front of the conveyance (see also FIG. 27B). Further, the acute angle between left and right sidewalls 2820 and 2818 and vertical axis V decreases then increases from the rear to the front of the conveyance. Because top surface 2802 slopes downward from rear portion 2804 to front portion 2806, the depth of depression 2712 decreases from the rear to the front of the conveyance.

FIGS. 29A and 29B illustrate lower shroud 2640 of shrouding system 2600. As illustrated, left and right side shrouds form lower shroud 2640. Lower shroud 2640 includes a left and right sidewall 2902 and 2904, a rear wall 2906, and a bottom 2908. Each side wall 2902 and 2904 includes a top, bottom, front, and rear portion. Each side wall 2902 and 2904 extends rearward from the front portion to the rear portion and then curves inward to transition to rear wall 2906. Each side wall 2902 and 2904 also extends downward from the top portion to the bottom portion and then curves inward to transition to bottom 2908. Bottom 2908 includes opening 2956 configured to at least partially expose a skidplate or battery tray of the conveyance. Each sidewall 2902 and 2904 includes openings 2650 and 2652 allowing frame components for attachment of wheels and casters of the conveyance to project therefrom.

As illustrated in FIG. 29B, each sidewall 2902 and 2904 of lower shroud 2640 comprises a convex outer surface that curves outward from the front portion to the rear portion of the sidewall. Further, each sidewall 2902 and 2904 includes a concave perimeter 2910 (see FIG. 29A) that curves inward and extends from the rear portion to the front portion of the sidewall. As shown in this embodiment, outward projecting nature of perimeter 2910 provides for a raised perimeter starting from the rear (e.g., mid to upper rear) and continuing to the front (e.g., mid to lower front). Perimeter 2910 may have a uniform or non-uniform width. As illustrated in FIG. 29A, perimeter 2910 extends from the upper rear portion to the front portion of each sidewall 2902 and 2904. Perimeter 2910 permits portions of lower shroud 2640 to appear differently than other portions. More specifically, perimeter 2910 is configured to reflect light such that portions of lower shroud 2640 appear to be a different color tone (i.e., toning) than other portions of the lower shroud even though the portions may be manufactured from the same color.

FIGS. 30A-30D are front cross-sectional views of lower shroud 2640 at four locations and illustrate the changing shape of the lower shroud from the rear to the front of the conveyance. FIGS. 30A-30D are taken along lines 30A-30A, 30B-30B, 30C-30C, and 30D-30D, respectively, shown in FIG. 29B.

Figure 30A:
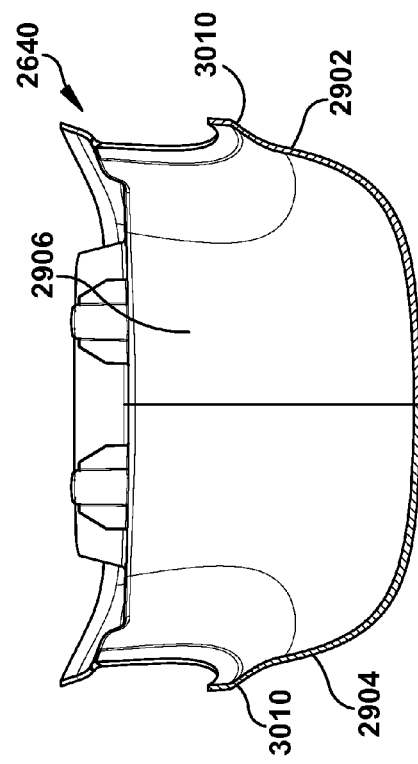
FIGS. 30A-30D are cross-sectional views of one embodiment of the lower shroud shown in FIG. 29A.
Figure 30B:
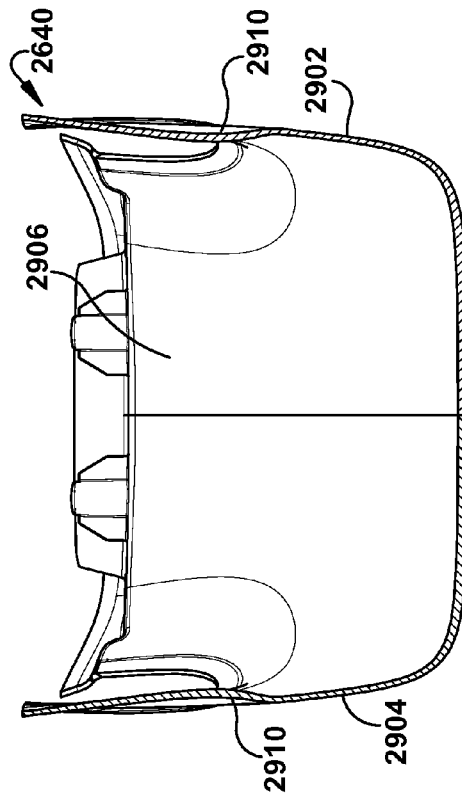
Figure 30C:
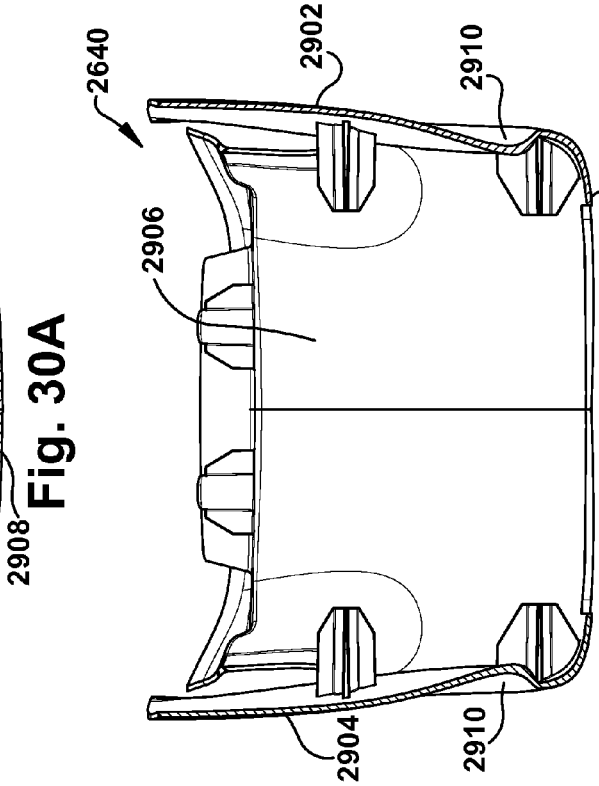
Figure 30D:
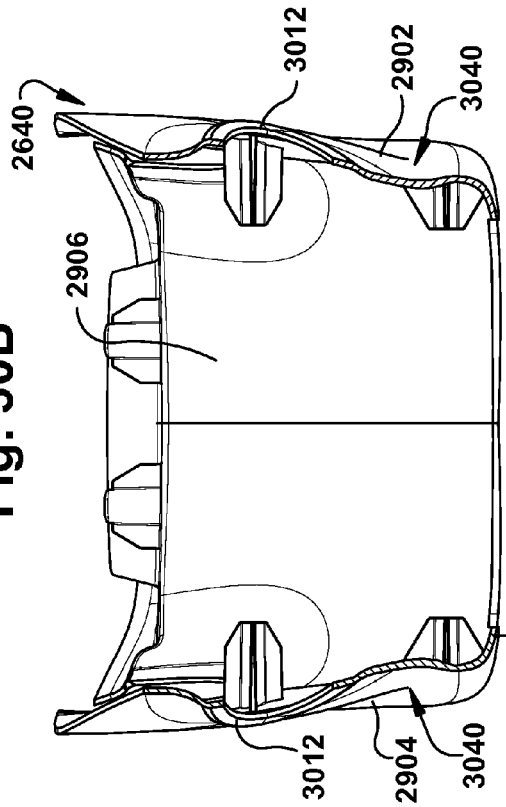

As illustrated in FIG. 29A, 30A, and 30D, each sidewall 2902 and 2904 transitions to convex portions 3010 and 3012 that surround openings 2650 and 2652 that permit attachment of the wheels and casters of the conveyance. The convex portions 3010 and 3012 follow the shape of openings 2650 and 2652. The convex portions 3010 and 3012 may have a uniform or non-uniform width.

As illustrated in FIGS. 30B and 30C, the depth of concave perimeter 2910 increases as the perimeter extends from the rear portion to the front portion of sidewalls 2902 and 2904. As shown, the concavity of perimeter 2910 is more exaggerated and the depth of the perimeter is greater in FIG. 30C than in FIG. 30B. Further, the width of concave perimeter 2910 decreases as the perimeter extends from the rear portion to the front portion of sidewalls 2902 and 2904. As shown, the width of perimeter 2910 is smaller in FIG. 30C than in FIG. 30B.

As illustrated in FIGS. 30C and 30D, perimeter 2910 transitions to an inward region 3040 of sidewalls 2902 and 2904 at the lower front portion of the sidewalls. More specifically, the depth of perimeter 2910 decreases and the concavity of the perimeter flattens to form inward region 3040. In other embodiments, concave perimeter 2910 may take the form of a raised perimeter having more orthogonal geometry including linear sections with apexes (one or more) there between. Also, a transition to inward region 3040 may or may not be present.

FIGS. 31A and 31B illustrate front shroud 2630 of shrouding system 2600. As shown, front shroud 2630 includes a top, bottom, left, and right portion. As illustrated in FIG. 31B, front shroud 2630 includes a convex outer surface 3110 that curves outward and slopes downward from the top portion to the bottom portion. FIG. 31C is a top cross-sectional view of front shroud 2630 taken along line 31C-31C shown in FIG. 31A. As illustrated in FIG. 31C, outer surface 3110 includes a convex region 3112 on the left portion and the right portion of front shroud 2630. Each convex region 3112 extends from a side of front shroud 2630 and transitions into a central portion of the front shroud. In other embodiments, convex region 3112 may include orthogonal geometries having linear portions with apexes (one or more) there between.

Configures as such, shrouding system 2600 includes various curved and/or orthogonal surfaces configured to catch, reflect, and/or focus light in a manner so portions of shroud system 2600 appear to include different color tone (i.e., toning) than other portions even though the portions may be manufactured from the same color. For example, manufacture of shrouding system 2600 using a uniform white or pearl color results in both darker and lighter tones of white or pearl to be present through the use of features such as concave perimeter 2910, convex region 3112, and inward region 3040.

FIGS. 32A-32D illustrate a frame 3200 for a conveyance such as a wheelchair according to an embodiment of the present application. As illustrated, frame 3200 includes a rear wheel support member 3206, a left front wheel support member 3202, and a right front wheel support member 3204. Frame 3200 also includes a seat support member 3216, a left rear mounting plate 3212, a right rear mounting plate 3214, and one or more cross members 3208 and 3210 extending between left and right front wheel support members 3202 and 3204.

Figure 32A:
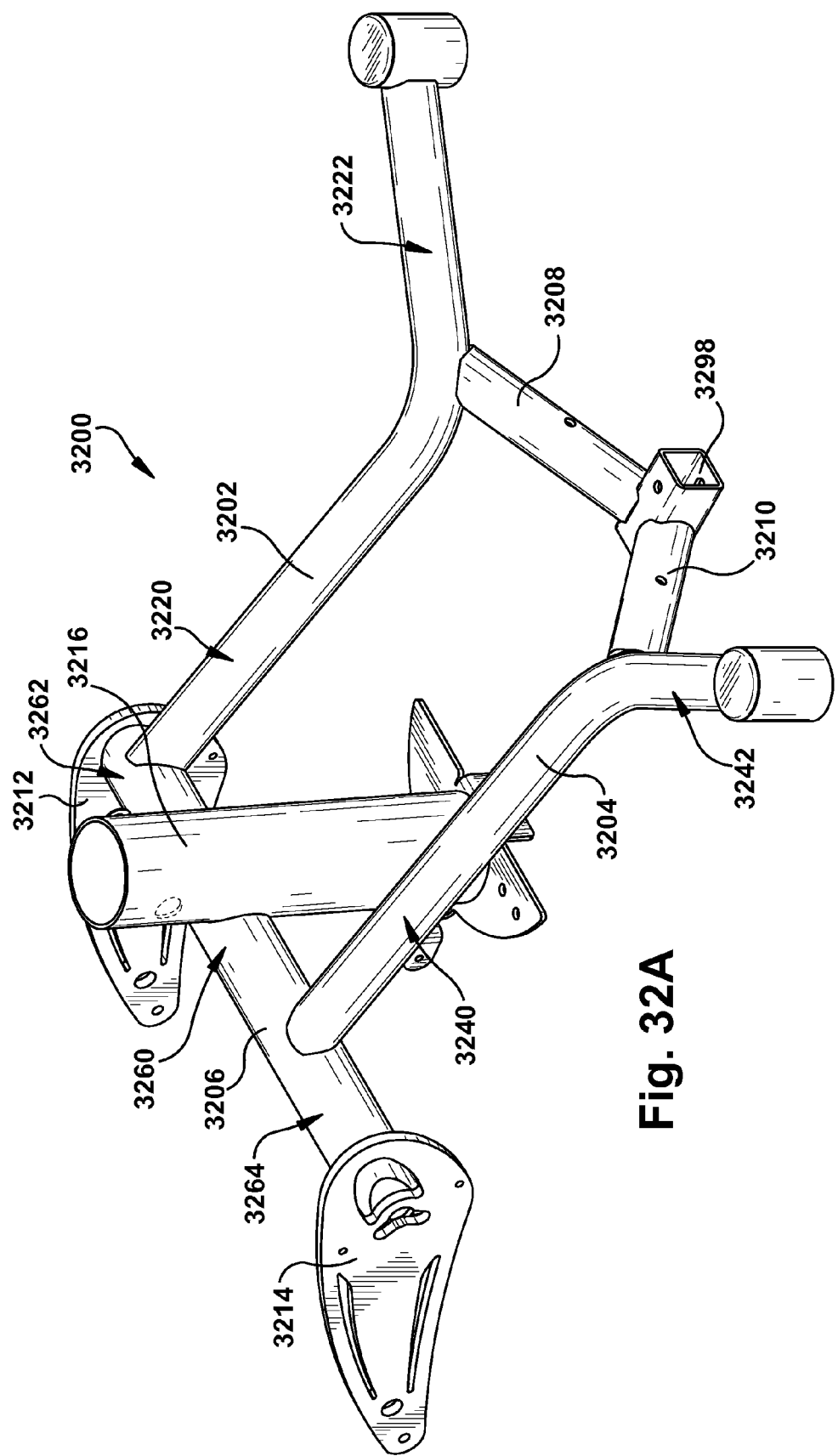
FIGS. 32A-32D are perspective, side elevational, top plan, and front elevational views, respectively, of another embodiment of a frame.
Figure 32B:
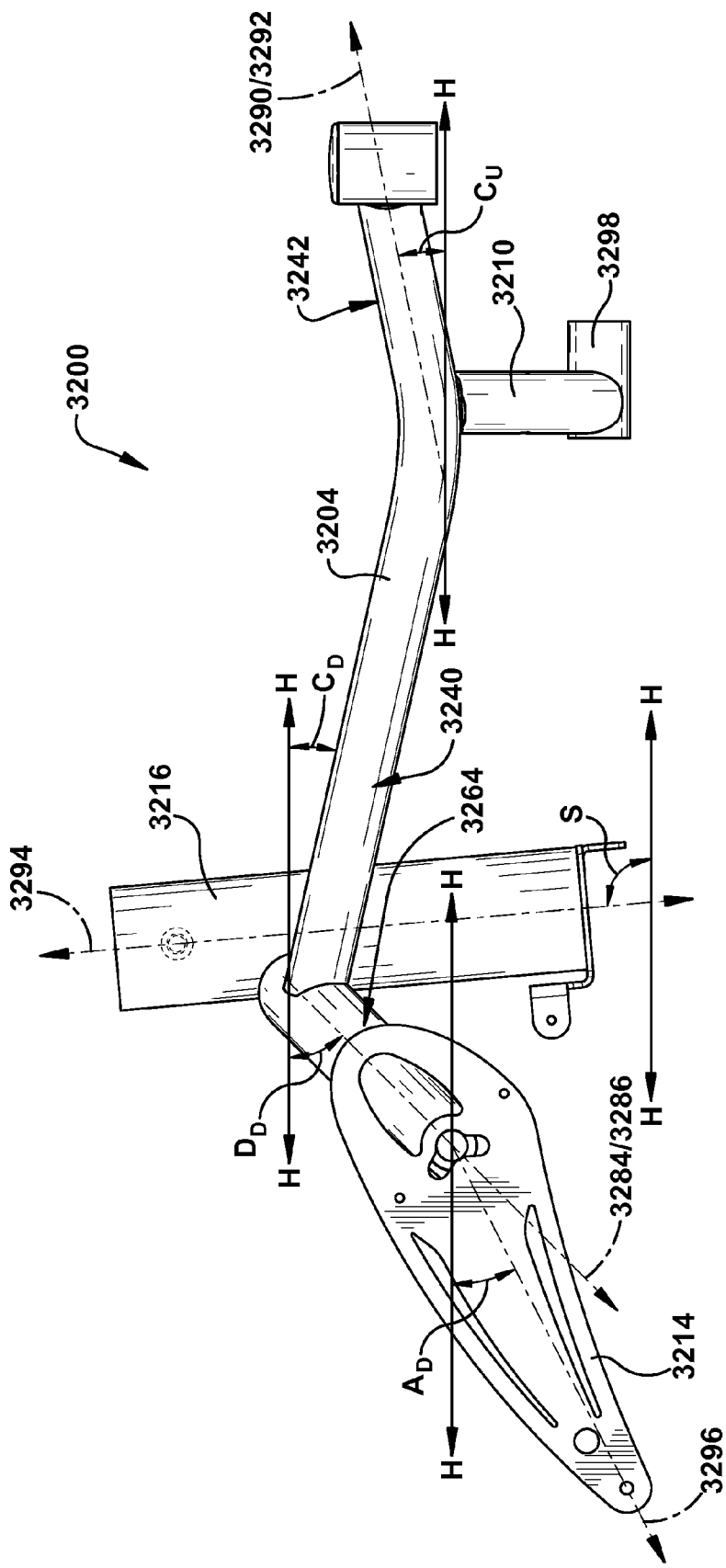
Figure 32C:
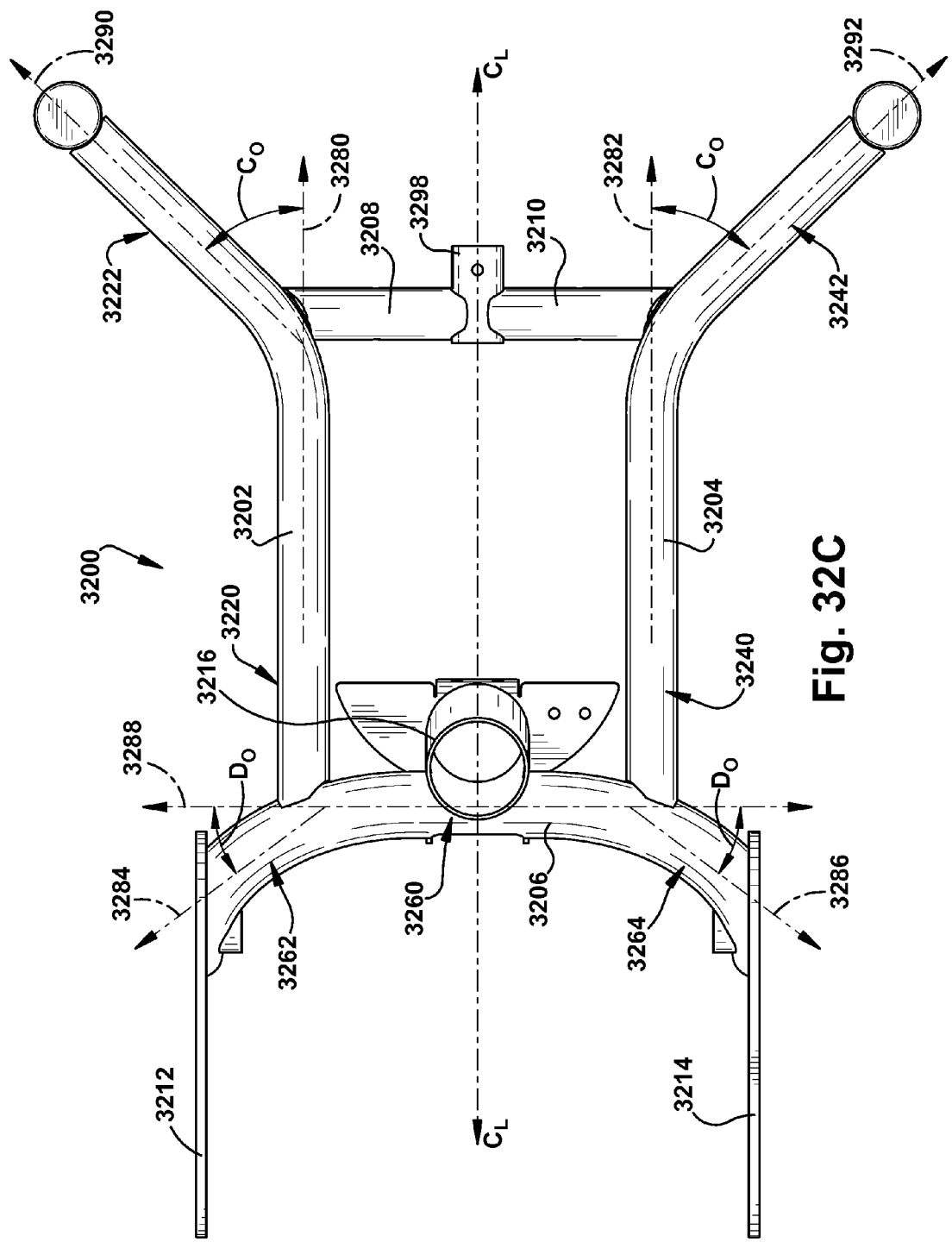

As illustrated in FIG. 32C, frame 3200 is disposed substantially about centerline $C_L$, which represents the centerline of the frame and the conveyance. In particular, the rear wheel support, front wheel supports, seat support, rear mounting plates, and cross members are all symmetrically disposed about centerline $C_L$. As such, in this embodiment, each of these members possess a geometry on one side of the centerline $C_L$ that is a mirror image of the geometry on the other side of the centerline $C_L$.

As illustrated in FIGS. 32A-32D, each front wheel support member 3202 and 3204 includes a first portion 3220 and 3240 that extends forward and downward from rear wheel support member 3206. First portion 3220 and 3240 of each front wheel support member 3202 and 3204 extends downward from rear wheel support member 3206 at an angle $C_D$ relative to horizontal H. As illustrated in FIG. 32B, angle $C_D$ is generally acute and preferably in the range of 5 to 20 degrees, but may have an even larger range depending on the design. In one embodiment, angle $C_D$ is 12.5 degrees. Further, as illustrated in FIG. 32C, a centerline 3280 and 3282 of each first portion 3220 and 3240 of each front wheel support member 3202 and 3204 is substantially parallel to centerline $C_L$ of frame 3200.

Each front wheel support member 3202 and 3204 includes a curved transition from first portion 3220 and 3240 to a second portion 3222 and 3242. Second portion 3222 and 3242 of each front wheel support member 3202 and 3204 extends outward and upward from first portion 3220 and 3240. A centerline 3290 and 3292 of each second portion 3222 and 3242 of each front wheel support member 3202 and 3204 extends upward from first portion 3220 and 3240 at an angle $C_U$ relative to horizontal H. As illustrated in FIG. 32B, angle $C_U$ is generally acute and preferably in the range of 5 to 15 degrees, but may have an even larger range depending on the design. In one embodiment, angle $C_U$ is 11.5 degrees. Centerline 3290 and 3292 of each second portion 3222 and 3242 of each front wheel support member 3202 and 3204 extends outward from first portion 3220 and 3240 at an angle $C_O$ relative to centerline 3280 and 3282 of the first portion. As illustrated in FIG. 32C, angle $C_O$ is generally acute and preferably in the range of 35 to 55 degrees, but may have an even larger range depending on the design. In one embodiment, angle $C_O$ is 45.8 degrees.

As illustrated in FIGS. 32A-32D, rear wheel support member 3206 includes a central portion 3260, a left portion 3262, and a right portion 3264. Left portion and right portions 3262 and 3264 extend downward and outward from central portion 3260 in a rearward direction. Rear wheel support member 3206 includes curved transitions between central portion 3260 and left and right portions 3262 and 3264.

Centerlines 3284 and 3286 of left and right portions 3262 and 3264 of rear wheel support member 3206 extend downward from central portion 3260 at an angle $D_D$ relative to horizontal H. As illustrated in FIG. 32B, angle $D_D$ is generally acute and preferably in the range of 35 to 55 degrees, but may have an even larger range depending on the design. In one embodiment, angle $D_D$ is 45 degrees. Further, centerlines 3284 and 3286 of left and right portions 3262 and 3264 of rear wheel support member 3206 extend outward from central portion 3260 at an angle $D_O$ relative to a centerline 3288 of the central portion. As illustrated in FIG. 32C, angle $D_O$ is generally acute and preferably in the range of 15 to 35 degrees, but may have an even larger range depending on the design. In one embodiment, angle $D_O$ is 25 degrees.

Left and right rear mounting plates 3212 and 3214 extend downward and rearward from left and right portions 3262 and 3264 of rear wheel support member 3206. Centerlines 3296 of left and right rear mounting plates 3212 and 3214 extend downward at an angle $A_D$ relative to horizontal H. As illustrated in FIG. 32B, angle $A_D$ is generally acute and preferably in the range of 15 to 35 degrees, but may have an even larger range depending on the design. In one embodiment, angle $A_D$ is 27 degrees. Further, as illustrated in FIG. 32C, each rear mounting plate 3212 and 3214 is substantially parallel to centerline $C_L$ of frame 3200.

Figure 32D:
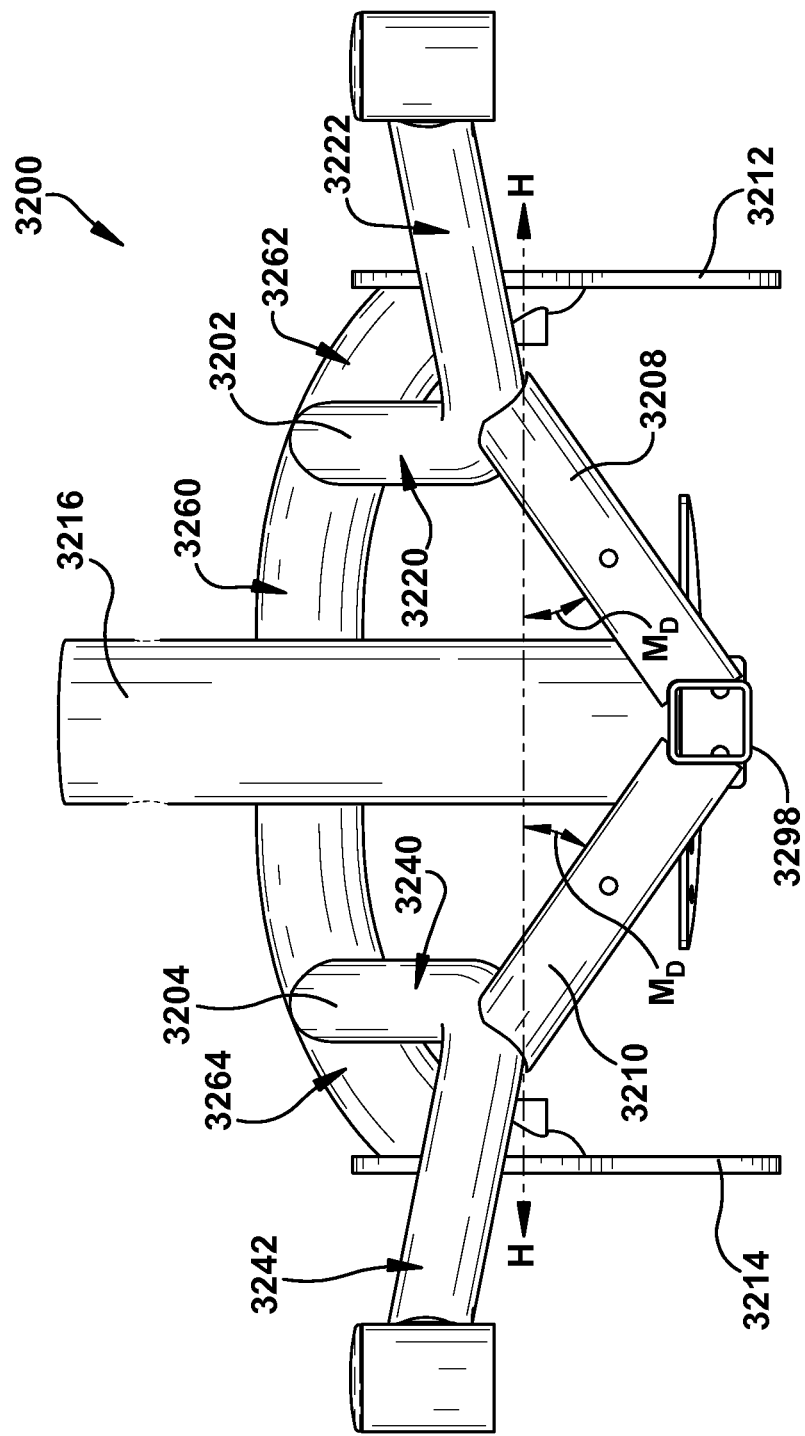

As illustrated in FIGS. 32A-32D, cross members 3208 and 3210 extend between front wheel support members 3202 and 3204. As illustrated in FIG. 32C, cross members 3208 and 3210 extend between second portions 3222 and 3242 of front wheel support members 3202 and 3204 at the curved transition between first portion 3220 and 3240 and the second portion. Cross members 3208 and 3210 extend, downward and inward from front wheel support members 3202 and 3204 to a frame attachment member 3298. Each cross member 3208 and 3210 extends downward at an angle $M_D$ relative to horizontal H. As illustrated in FIG. 32D, angle $M_D$ is generally acute and preferably in the range of 20 to 45 degrees, but may have an even larger range depending on the design. In one embodiment, angle $M_D$ is 35 degrees. Further, as illustrated in FIG. 32C, each cross member 3208 and 3210 is substantially perpendicular to centerline $C_L$ of frame 3200. In some embodiments, cross members 3208 and 3210 are formed as a single member having, for example, a U or V shape when viewed from the front.

As illustrated in FIGS. 32A-32D, seat support member 3216 is coupled to central portion 3260 of rear wheel support member 3206. Seat support member 3216 is held in an upright orientation relative to frame 3200. A centerline 3294 of seat support member 3216 is at an angle S to horizontal H. As illustrated in FIG. 32B, angle S is generally obtuse and preferably in the range of 90 to 110 degrees, but may have an even larger range depending on the design. In one embodiment, angle S is 95 degrees.

It should be understood that the dimension and angle descriptions disclosed herein are subject to variance according to standard tolerances in the art. For example, the angle descriptions included herein can be to a tolerance of +/−½ degree or more.

While a rear wheel drive wheelchair is depicted in many of the drawings of this application, it is to be understood that any one or more of the features disclosed by this application can be used on a wide variety of different types of vehicles. For example, any one or more of the features disclosed in this application can be used on a front wheel drive wheelchair or a mid-wheel drive wheelchair. In a front wheel drive embodiment, the front casters may be located off the ground in their normal position or in contact with the ground in their normal position. In a mid or center wheel drive embodiment, the rear anti-tip wheels may be located off the ground in their normal position or in contact with the ground in their normal position.

The conveyance of the present application may in one embodiment include a transportable configuration. In this embodiment, the conveyance may be disassembled into sub-assemblies or components that are easily individually transportable in, for example, an automobile. The conveyance may be disassembled by removing the seat assembly from the chassis. Further, the drive wheels and batteries may be removed from the chassis. Still further, other components can be additionally or alternatively be removable from the chassis, including the foot plate and casters.

In this manner, these components can be easily stored for transportation and quick re-assembly without the use of tools. To facilitate disassembly and assembly, the conveyance can include any number of mechanisms including pluggable terminals for the batteries, and quick release or spring-loaded pins for the drive wheels and seat assembly. Also, the shrouding can include one or more covers capable of being opened and closed or removed and re-attached, such as to allow removal and insertion of the batteries.

Configured as such, a clean looking, simple, and lightweight chassis structure is provided for a conveyance. The chassis may be configured to be rear wheel drive, mid-wheel drive, or front wheel drive. The rear anti-tip wheels or casters may be positioned on the ground or off the ground. Similarly, the front casters may be positioned on the ground or off the ground. Furthermore, one or more suspension devices or assemblies may be added to the mounting of caster support members, axle support members, and/or anti-tip support members. The one or more suspension devices or assemblies can take the form of springs, spring/shock absorbers, pivoting assemblies, struts, pneumatic piston/cylinder assemblies, four-bar linkage assemblies, and combinations of the foregoing.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the energy source or batteries can include an onboard charger unit, the casters can be coupled to pivot arms via shock absorbing fork assemblies, and the specific locations of the component connections and interplacements can be modified. Still further, while cylindrical or elliptical tubular components have been shown and described herein, other geometries can be used including polygonal (e.g., square, rectangular, triangular, hexagonal, etc.) can also be used. Therefore, the invention, in its broader aspects, is not limited to the specific details, the representative apparatus, and illustrative examples shown and described.

Accordingly, departures can be made from such details without departing from the spirit or scope of the applicant's general inventive concept.

We claim:

1. A wheelchair having a shrouding system comprising:
a rear shroud, a top shroud, and a front shroud configured to at least partially cover a top and front of a wheelchair frame, wherein the top shroud includes a rear portion, a front portion, a left portion, a right portion, a central portion having a concave depression, and a top surface having a convex portion that curves outward and slopes downward from the rear portion to the front portion of the top shroud, and wherein the top surface of the top shroud slopes upward from the left portion and the right portion to the central portion of the top shroud, and wherein the front shroud includes a top portion, a bottom portion, and an outer surface having a convex portion that curves outward and slopes downward from the top portion to the bottom portion of the front shroud; and
a lower shroud configured to at least partially cover a left, right, bottom, and rear of the wheelchair frame, wherein the lower shroud includes a left side wall, a right side wall, a rear wall, and a bottom, and wherein each side wall includes a top portion, a bottom portion, a front portion, and a rear portion, and wherein each side wall extends rearward from the front portion to the rear portion of the side wall and curves inward to transition to the rear wall, and wherein each side wall extends downward from the top portion to the bottom portion of the side wall and curves inward to transition to the bottom.

2. The wheelchair of claim 1, wherein the depression includes a rear wall and a bottom, and wherein the rear wall extends downward from the rear portion of the top shroud at an acute angle to a vertical axis and then curves to transition to the bottom of the depression, and wherein the bottom of the depression extends from the rear wall of the depression substantially parallel to a horizontal axis and transitions to the front portion of the top shroud.

3. The wheelchair of claim 1, wherein the depression includes a left side wall, a right side wall, and a bottom, and wherein the top surface of the top shroud curves downward to form a convex transition to the left side wall and the right side wall of the depression, and wherein the left side wall and the right side wall of the depression extend downward from the top surface of the top shroud at an acute angle to a vertical axis and then curve to transition to the bottom of the depression.

4. The wheelchair of claim 1, wherein each side wall of the lower shroud comprises a convex outer surface that curves outward from the front portion to the rear portion of the side wall.

5. The wheelchair of claim 1, wherein each side wall of the lower shroud includes a concave perimeter that curves inward and extends from the rear portion to the front portion of the side wall.

6. The wheelchair of claim 5, wherein the depth of the perimeter increases as the perimeter extends from the rear portion to the front portion of each side wall of the lower shroud.

7. The wheelchair of claim 5, wherein the width of the perimeter decreases as the perimeter extends from the rear portion to the front portion of each side wall of the lower shroud.

8. The wheelchair of claim 5, wherein the perimeter transitions to an inward region at the front portion of each side wall of the lower shroud.

9. The wheelchair of claim 1, wherein the lower shroud includes one or more openings and one or more convex portions that at least partially surround the one or more openings.

10. The wheelchair of claim 1, wherein the bottom of the lower shroud includes an opening configured to at least partially expose a component of the wheelchair frame.

11. The wheelchair of claim 1, wherein the front shroud includes a left portion and a right portion, and wherein the outer surface of the front shroud includes a convex region on the left portion and the right portion of the front shroud.

12. A wheelchair having a shrouding system comprising:
a rear shroud, a top shroud, and a front shroud configured to at least partially cover a top and front of a wheelchair frame, wherein the top shroud includes a rear portion, a front portion, a central portion having a concave depression, and a top surface having a convex portion that curves outward and slopes downward from the rear portion to the front portion of the top shroud, and wherein the depression includes a rear wall and a bottom, and wherein the rear wall extends downward from the rear portion of the top shroud at an acute angle to a vertical axis and then curves to transition to the bottom of the depression, and wherein the bottom of the depression extends from the rear wall of the depression substantially parallel to a horizontal axis and transitions to the front portion of the top shroud, and wherein the front shroud includes a top portion, a bottom portion, and an outer surface having a convex portion that curves outward and slopes downward from the top portion to the bottom portion of the front shroud; and
a lower shroud configured to at least partially cover a left, right, bottom, and rear of the wheelchair frame, wherein the lower shroud includes a left side wall, a right side wall, a rear wall, and a bottom, and wherein each side wall includes a top portion, a bottom portion, a front portion, and a rear portion, and wherein each side wall extends rearward from the front portion to the rear portion of the side wall and curves inward to transition to the rear wall, and wherein each side wall extends downward from the top portion to the bottom portion of the side wall and curves inward to transition to the bottom.

13. The wheelchair of claim 12, wherein the depression includes a left side wall and a right side wall, and wherein the top surface of the top shroud curves downward to form a convex transition to the left side wall and the right side wall of the depression, and wherein the left side wall and the right side wall of the depression extend downward from the top surface of the top shroud at an acute angle to the vertical axis and then curve to transition to the bottom of the depression.

14. The wheelchair of claim 12, wherein each side wall of the lower shroud comprises a convex outer surface that curves outward from the front portion to the rear portion of the side wall.

15. The wheelchair of claim 12, wherein each side wall of the lower shroud includes a concave perimeter that curves inward and extends from the rear portion to the front portion of the side wall.

16. The wheelchair of claim 15, wherein the depth of the perimeter increases as the perimeter extends from the rear portion to the front portion of each side wall of the lower shroud.

17. The wheelchair of claim 15, wherein the width of the perimeter decreases as the perimeter extends from the rear portion to the front portion of each side wall of the lower shroud.

18. The wheelchair of claim 15, wherein the perimeter transitions to an inward region at the front portion of each side wall of the lower shroud.

19. The wheelchair of claim 12, wherein the lower shroud includes one or more openings and one or more convex portions that at least partially surround the one or more openings.

20. The wheelchair of claim 12, wherein the bottom of the lower shroud includes an opening configured to at least partially expose a component of the wheelchair frame.

21. The wheelchair of claim 12, wherein the front shroud includes a left portion and a right portion, and wherein the outer surface of the front shroud includes a convex region on the left portion and the right portion of the front shroud.

\* \* \* \* \*